United States Patent
Dulcetti Filho

(10) Patent No.: US 9,377,006 B2
(45) Date of Patent: Jun. 28, 2016

(54) VERTICAL WIND TURBINE WITH ARTICULATED BLADES

(76) Inventor: Flávio Francisco Dulcetti Filho, Belém (BR)

( * ) Notice: Subject to any disclaimer, the term of this patent is extended or adjusted under 35 U.S.C. 154(b) by 881 days.

(21) Appl. No.: 13/636,669

(22) PCT Filed: Jun. 24, 2010

(86) PCT No.: PCT/BR2010/000200
§ 371 (c)(1),
(2), (4) Date: Oct. 4, 2012

(87) PCT Pub. No.: WO2011/116440
PCT Pub. Date: Sep. 29, 2011

(65) Prior Publication Data
US 2013/0039761 A1   Feb. 14, 2013

(30) Foreign Application Priority Data
Mar. 23, 2010 (BR) .................................. 1000815

(51) Int. Cl.
*F03D 3/06*   (2006.01)
*F03D 3/02*   (2006.01)
*F03D 11/04*   (2006.01)

(52) U.S. Cl.
CPC *F03D 3/068* (2013.01); *F03D 3/02* (2013.01); *F03D 11/04* (2013.01); *F05B 2240/218* (2013.01); *F05B 2260/503* (2013.01); *Y02E 10/728* (2013.01); *Y02E 10/74* (2013.01)

(58) Field of Classification Search
CPC ........... F03D 3/00; F03D 3/005; F03D 3/061; F03D 3/067; F03D 3/068; F05B 2240/218
USPC ........................................... 416/41, 117, 119
See application file for complete search history.

(56) References Cited

U.S. PATENT DOCUMENTS

| | | | | |
|---|---|---|---|---|
| 13,268 A | * | 7/1855 | Morgan | F03D 3/00 416/117 |
| 2,170,911 A | * | 8/1939 | Raulerson | F03D 3/068 244/134 D |
| 8,382,435 B2 | * | 2/2013 | Deeley | F03D 3/068 415/4.2 |
| 2004/0265127 A1 | | 12/2004 | Noble | |
| 2009/0066088 A1 | | 3/2009 | Liang | |

FOREIGN PATENT DOCUMENTS

| | | | | |
|---|---|---|---|---|
| BA | EP 1580425 A2 | * | 9/2005 | ............. F03D 3/068 |
| CN | 201351575 Y | | 11/2009 | |
| IL | WO 2009153772 A1 | * | 12/2009 | ............. F03D 3/068 |
| WO | WO-02033253 A3 | | 8/2002 | |
| WO | WO-2006136117 A1 | | 12/2006 | |
| WO | WO-2008003802 A1 | | 1/2008 | |

* cited by examiner

*Primary Examiner* — Richard Edgar
(74) *Attorney, Agent, or Firm* — Birch, Stewart, Kolasch & Birch, LLP

(57) ABSTRACT

A vertical wind turbine to catch the wind force characterized by its system of aerodynamic panels are provided with blades fixed into horizontal axis that open and close simultaneously and symmetrically upward and downward due the gears like the butterfly wings rotated by 90° of its normal position, it is like opens an umbrella horizontally to receive on one side the wind buoyancy or pressure and in the other side close by the action of the wind. The top and bottom blades works as counterweight one to another both to open and close (flatness) which makes your weight null in relation to the effort of wind to open or close them independent of the self-weight of the blades what propitiate the maximum use of the wind force in the traction side without loss to the return of the blades to the traction position driving a vertical axis.

14 Claims, 54 Drawing Sheets

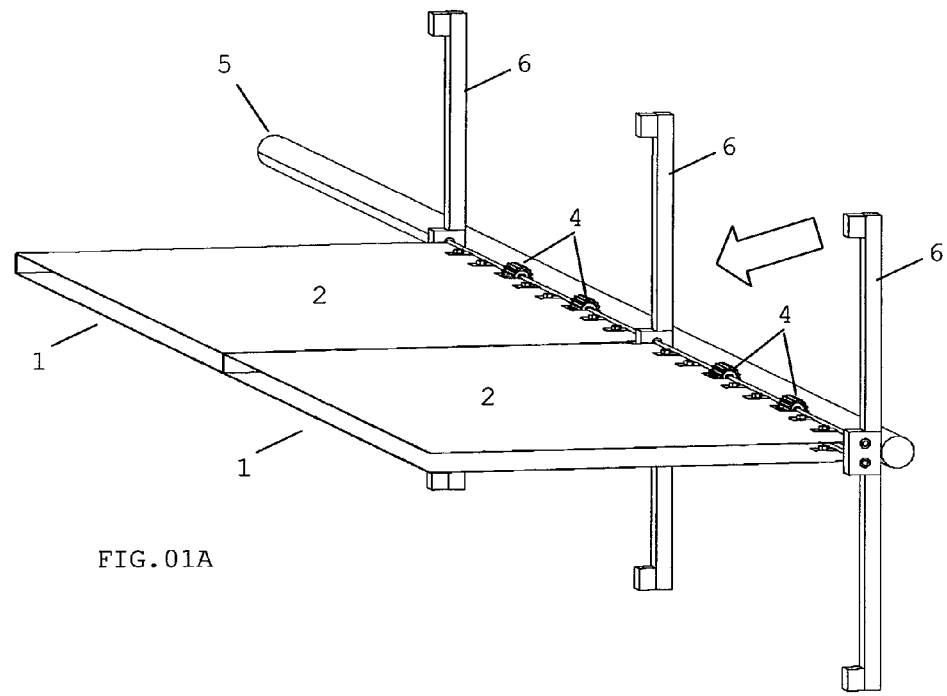
FIG.01A
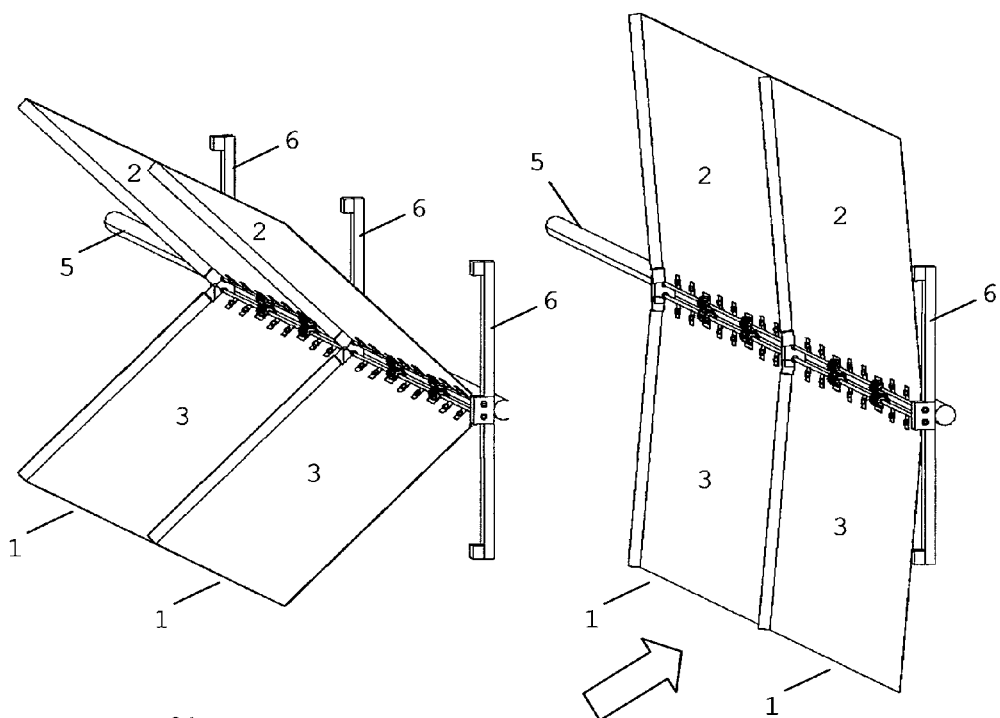
FIG.01B
FIG.01C

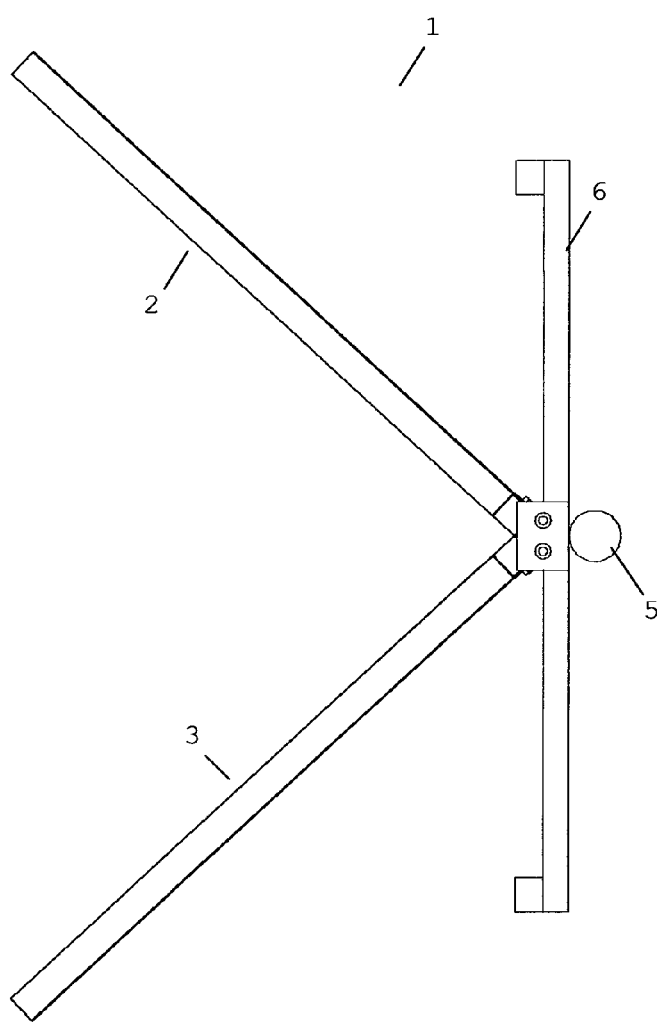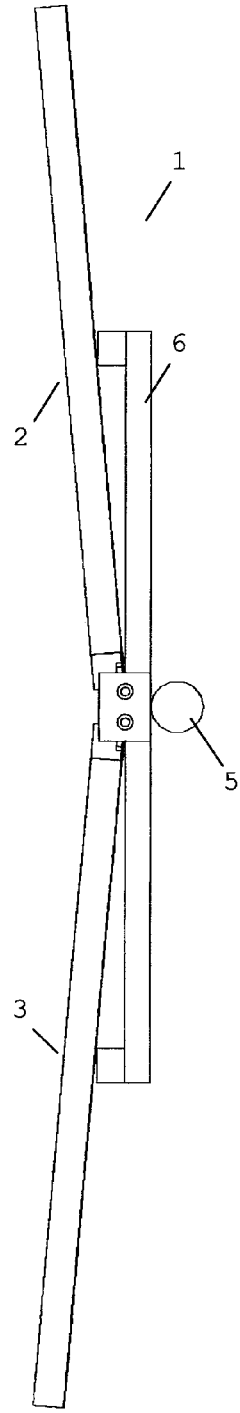
FIG.03A
FIG.03B

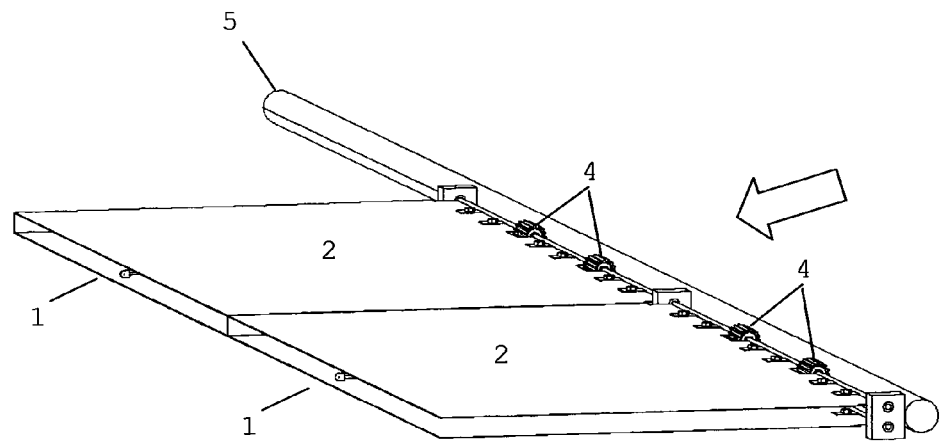
FIG.04A
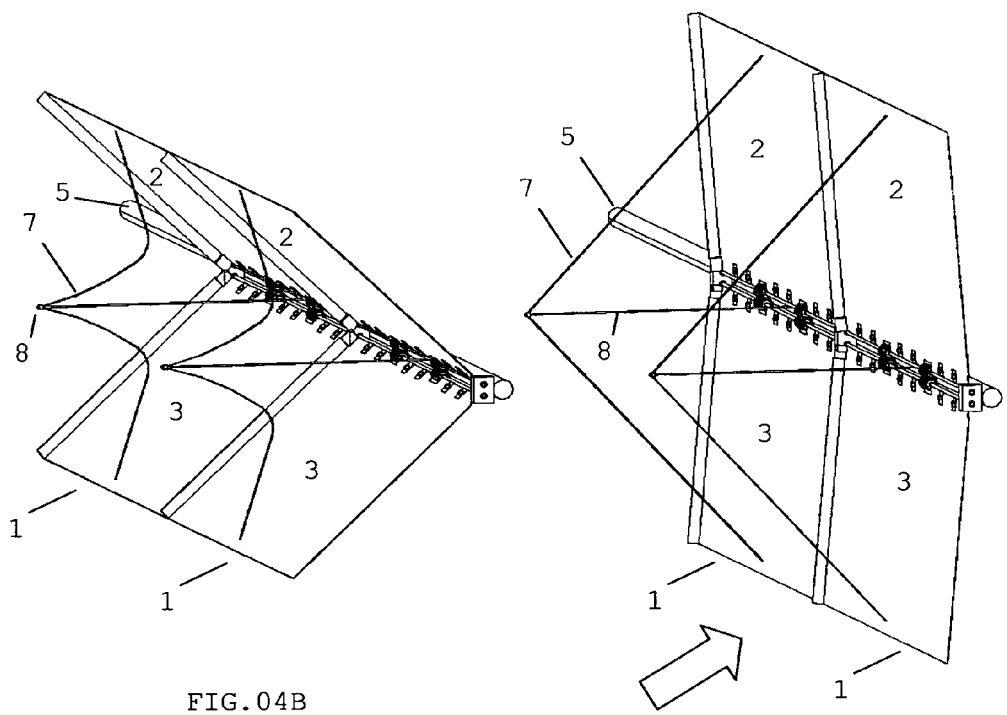
FIG.04B
FIG.04C

SENTIDO DO VENTO

VERTICAL WIND TURBINE WITH ARTICULATED BLADES

FIELD OF THE INVENTION

The present invention, as a vertical wind turbine, is applied in the electric power generation by transforming the wind energy into rotational mechanical energy in a controlled way, starting equipments for electric power generation or hydraulic pumps, as well as rotors in general, or anything that can be moved rotationally by the wind force.

STATE OF THE ART

The traditional windmills are characterized by having propellers which rotate vertically in parallel to the equipment sustaining post, and directly connected to the generator axis or by shells which rotate in the horizontally direction perpendicular to the post, connected to a vertical rotational axis.

In the case of the propellers, they revolve solely by a component (fraction) of the wind force resultant that, by the angular step variation, provides a perpendicular rotation in relation to the wind direction.

The aerodynamic surfaces of the blade propeller besides profiting only one component of the wind force, have very small area compared to the circle described by its movement and this configuration cannot increase the yield using multiple propellers to boost the same axis in a catchment area of wind per square meter due to aerodynamic interaction and structural constraints since propellers have great length, are build with heavy materials and are merely fixed in only one point into a spinner and still need to be moved to the control of the step.

The propellers require relatively strong winds, for example 8 m/s, for its operation and when the winds are very strong the propellers come under "Stol" stopping the turbine.

The propellers were developed primarily for producing the air mass displacement, i.e. to move the wind and not to be moved by the wind, situation where they are inefficient because the resulting from the work of the wind is expressed by the force on area and propellers are thin with small areas of catch.

In the case of shells, the problem is more serious, because they have the same aerodynamic surface in your front and back sides only with the different drag coefficients reason by why the resulting rotational force is extremely small which further reduces the efficiency of this method of catch the force of the wind.

The turbines that transform the speed of the wind into mechanical rotation of patent the applications filed internationally under the numbers PCT/BR2006/000260 and PCT/2008/000218 revolve by the resulting of the force between the difference of force obtained in the traction side produced by the wind on the upright panel and locked in his traction stoppers, and the force lost with the panel wind drag that will be raised by the pressure of the wind at its back to flat the opposite side.

Thus, in the present conception when the aerodynamic panel reaches the position where the wind beats in its back, how much lighter it is in relation to the wind force to raise the panel and flat it bigger will be the force gain obtained in the upright panel that receives the wind in its front face.

By this situation this system, for its perfect functioning, it needs one of the following options:

a) That the panels be constructed with lightweight materials, and, preferably, be rectangular panels with low high compared with its width in order to reduce the wind effort needed to raise them, once, approximately, a half of the panel weight shall be transmitted to the hinges support and the other half of the panel weight will be raised by the pressure of the wind to be flatted.

b) In the case that lightweight materials cannot be used so that resist for long periods, the panels can be provided with counterweights or springs capable of making them lighter in relation to the effort of wind to flat them and preferably limiting the height in relation with the width to minimize the effort to flat the panels.

As an example, consider a wind of 4 m/s which is equivalent with approximately a 1 kg/m2 force on the panel. Then, if the self-weight of the panels is 2 kg/m2 and this panel doesn't have springs or counterweights to reduce their weight to flat the panels, the system would be stopped without rotating, as if the two sides, the traction side and the opposite side, were locked.

Faced with this situation, we have small panels compared width heights, becoming necessary for the cases of greater power, the use of a greater number of sets of crosses and arms which makes the turbine slightly more costly.

Due the panel works only under the horizontal arm, when it exits the horizontal or flat position to the upright or vertical position and arrives at the stopper, it produces an twisting force on the arm (or horizontal axis), which requires greater robustness in the structure of the arm making the turbine little more expensive.

In order to solve the problems cited above was developed the present vertical wind turbine that presents an aerodynamic panels system capable of providing large catchment areas of the wind force into only one tower and that uses simple and cheaper materials for its construction and which has no aerodynamic and structural limitations to expand the necessary capacity of power required in a single tower and has no aerodynamic panels mono supported and also do not require great wind effort due to the weight of the aerodynamic turbine panels both to flat them in the opposite side of the wind direction, as to open them in a vertical position in the traction side, i.e., the wind effort to the operation of these aerodynamic panels independent of the mass or the self-weight of the material which the panels are built.

The aerodynamic panels will always have its weight, to open them or close them in relation to the wind force, near to zero.

As the panels can be produced with materials more robust, the durability problem was also simpler solved.

The new aerodynamic panels system also solved the problem of the twist force in the turbine arms when the panels are in its traction position (vertical), because they work with two blades moving in opposite directions and in a synchronized way nullifying the twist force in the arms (or horizontal axes).

SUMMARY OF THE INVENTION

The present vertical wind turbine has as main feature be constituted by various aerodynamic panels that are opened being in an upright position by the exclusive action of the wind in their front face producing a spin movement around the vertical axis pivot and that be closed by the action of the wind at their back face during the contrary wind course producing the lowest possible drag.

Thus, there are two distinct sides in relation to the wind direction. One is the buoyancy or traction side (panels open forming like a wall) and the other side is the flattening inactive or drag side (panels closed with minimum drag being only the attack edge surface of the horizontal axis in the opposite direction against the wind).

The panels are composed by two aerodynamic surfaces that are open simultaneously and symmetrically one upwards and the another downwards by the action of wind in their front face and that are closed simultaneously and symmetrically from the bottom to the top and from the top to the bottom, by the action of the wind at their back as they were a single aerodynamic horizontal surface.

Each Panel is composed of two blades, each one attached to a horizontal axis with bearings at the ends, and between the two parallel horizontal axes near each other there are one or more gears, depending on the size of the axis, to link the movement of the upper blade with the lower blade doing that the blades open and close with symmetrical movement, with the goal of the lower blade when moving by the action of the wind goes down and opening almost to the vertical position, and serve as a counterweight to the top blade that is opening and rising symmetrically with the down blade by the action of the gears between the axis.

Similarly when the plate is moving to the side on which the wind reaches its back, the upper blade when it is down to close, the upper blade serves as a counterweight to the lower blade that is rising symmetrically for the two blades meet each other forming almost as a single blade horizontally to not cause aerodynamic drag in the inactive side or flatted side.

The blades fixed into horizontal axes open and close like butterfly wings as a butterfly turned in 90 degrees, or like an umbrella opened horizontally when receive in one side the buoyancy produced by the wind force and in the other side be closed by the action of the wind.

The aerodynamic blade surfaces can, if necessary, have an angulation on its borders, so as to allow them to open when they enter in traction cycle (active cycle) and close when enter in the flatten cycle (inactive cycle) to obtain the full recovery of the wind force in the 180 degrees of the traction cycle and in the 180 degrees of the inactive cycle.

The blades, both upper and lower, may contain, in the centre of its extremities, opposite to the horizontal axes, electromagnetic coils that are energized by a supervision and control system to maintain the blades horizontally or flatted regardless of the wind direction in order to prevent situations of storm or even to stop the turbine for maintenance.

The blades can contain, in its vertex aperture angle (meeting point between the two blades), a canvas or rubber flexible jacket in order to reduce the wind escape through its rotating fixing horizontal axis. In cases of major wingspan, in which the structure of the panels fixation arms be opened against the wind direction and closed in the wind direction, it will not be necessary the use of flexible jackets, since that the own arm will exert the function of collaborating in take the wind force in the desired rotation direction.

The panels are fixed to the cross let arms which rotates on a vertical axis or on a vertical structure.

To set the rotation direction of the turbine, if the panels are positioned in their open condition on the right side of the vertical axis, the turbine will rotate in a counter-clockwise sense, because these panels will be close to the left side of the vertical axis to be flatted or horizontally. And when the panels are placed to open on the left of the vertical axis the turbine rotates in the clockwise sense.

Once programmed the turbine rotation direction it will remain in the same rotation direction regardless of the wind direction.

Each horizontal arm or axis may receive one or more sets of aerodynamic traction panels. Each Panel is composed by two blades, one upper blade (2) moves in a ¼ circle course from the horizontal position to upwards and the inferior blade (3) moves in a ¼ circle course from the horizontal position to down symmetrically with the upper blade (2).

This system has no structural or aerodynamic limits to the horizontal arms or axis size, to the quantity of panels and to the number of levels of crossarms with panels.

Each panel composed by two aerodynamic blades is exclusively moved by the action of the wind and doesn't have any mechanical system of interdependence between the panels in the same arm or between panels from the traction side and the inactive side or horizontally side.

The big advantage of this system, type synchronized via gearing butterfly, is that the panels both to open as to be closed independent of their mass (weight) and material that are constructed, because they have always zero weight in relation to the work of the wind force to open them or close them due also to the function as counter-weight of each panel blade, resulting in the maximum use of wind force practically with zero percent of loss of the buoyancy obtained in the traction side in relation to the inactive side (only the area equivalent to the attack edge of the inactive side flatted or closed will produce a despicable drag).

This means that winds with low speeds will already produce a considerable gap between the buoyancy obtained in the traction side and the loss almost zero in the drag side, i.e., with a little wind speed the system rotates and comes into operation, which is beneficial too to the regions that have low-speed winds, because this system is low cost construction compared to the systems currently used and has no limits to expand the catchment area to compensate the reduction of the wind speed.

These panels may have a control of the wind catchment area in each one of the blades from a set of aerodynamic panels with the simple sliding of a second blade sliding over the other in both upper and lower plate symmetrically to slide through the command of a servo motor on each panel blade open or close roles growing and decreasing the wind catchment area of each panel blade aerodynamic enabling the speed control and the torque of the turbine in areas where the wind speed varies greatly.

This vertical wind turbine captures the wind force in any direction not requiring equipment, sensors, windsock, engines, etc to redirect it to the wind direction.

Another advantage is that when the system opens by the wind pressure, by having symmetric surfaces, it not produces a twist in the support arm or horizontal axis.

The panels, when it opens symmetrically, due the work of the gears between them, with a counterweight effect, they became restricted almost in a vertical position through rubber stops fixed on bars attached to their arms to up and to down, or through elastic rope passing on a central axis that are between the panels with a pulley which gives passage rope which is fixed at the ends of the panels thus limiting the maximum opening, which also helps avoid noises when the blades reach its end of the course.

The present invention may have several embodiments according to the energy production capacity desired.

In order to better describe the invention and its possible embodiments follows the description of the drawings and a detailed description of the invention based on the embodiments.

DESCRIPTION OF THE FIGURES

FIGS. 01A, 01B and 01C—perspective views of the movement evolution of the aerodynamic panels with limiter system implemented by backstop. In the FIG. 01A the aerodynamic panels are fully closed. In the FIG. 01B the aerodynamic panels are 50% open. In the FIG. 01C the aerodynamic panels are fully open, demonstrating that the backstops are limiting its openness.

FIGS. 03A and 03B—lateral views of the movement evolution of the aerodynamic panels with limiter system implemented by backstop. In the FIG. 03A the aerodynamic panels are 50% open. In the FIG. 03B the aerodynamic panels are fully open, demonstrating that the backstops are limiting its openness.

FIGS. 04A, 04B and 04C—perspective views of the movement evolution of the aerodynamic panels with limiter system implemented by cables. In the FIG. 04A the aerodynamic panels are fully closed. In the FIG. 04B the aerodynamic panels are 50% open. In the FIG. 04C the aerodynamic panels are fully open, demonstrating that the cables are limiting its openness.

FIG. 10—detailed view of the support axis of the limiting cables of the aerodynamic panels course showing the functioning of the pullies by where the cables pass trough.

DETAILED DESCRIPTION OF THE INVENTION

Figure 2A:
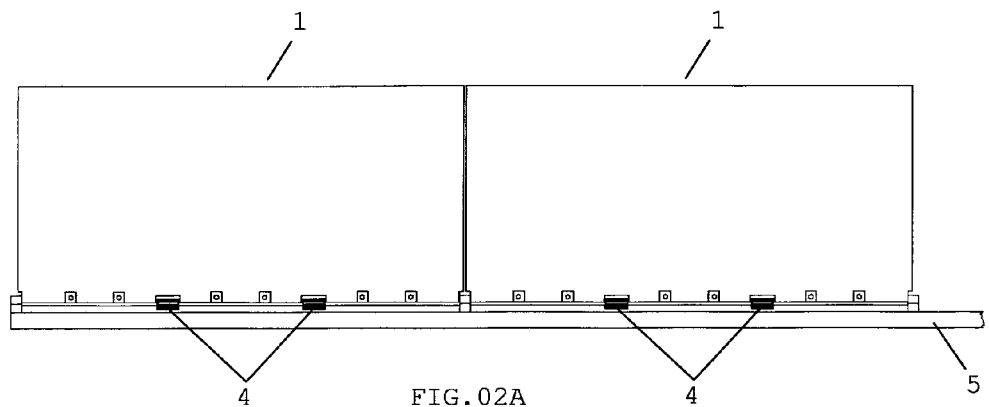
FIGS. 02A, 02B, and 02C—superior views of the movement evolution of the aerodynamic panels with limiter system implemented by backstop. In the FIG. 02A the aerodynamic panels are fully closed. In the FIG. 02B the aerodynamic panels are 50% open. In the FIG. 02C the aerodynamic panels are fully open, demonstrating that the backstops are limiting its openness.
Figure 2B:
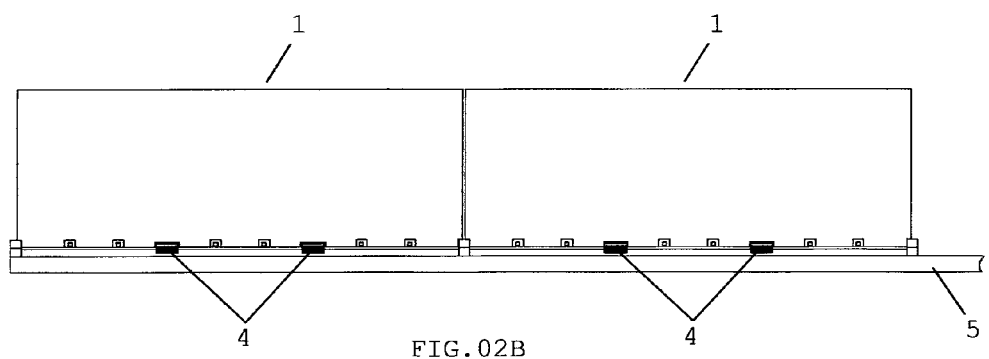
Figure 2C:
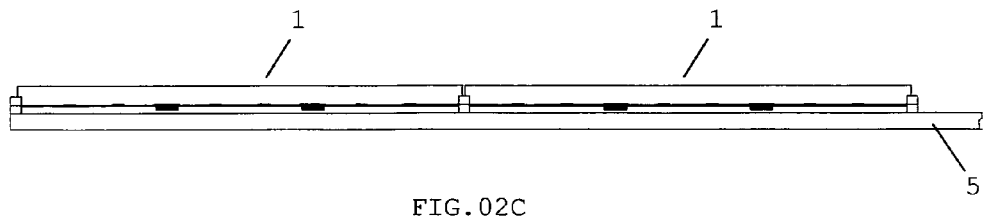
Figure 5A:
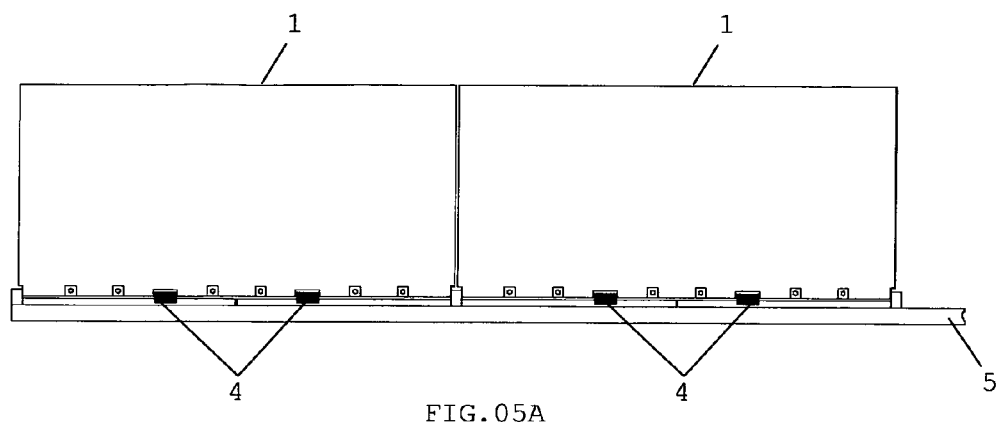
FIGS. 05A, 05B, and 05C—superior views of the movement evolution of the aerodynamic panels with limiter system implemented by cables. In the FIG. 05A the aerodynamic panels are fully closed. In the FIG. 05B the aerodynamic panels are 50% open. In the FIG. 05C the aerodynamic panels are fully open, demonstrating that the cables are limiting its openness.
Figure 5B:
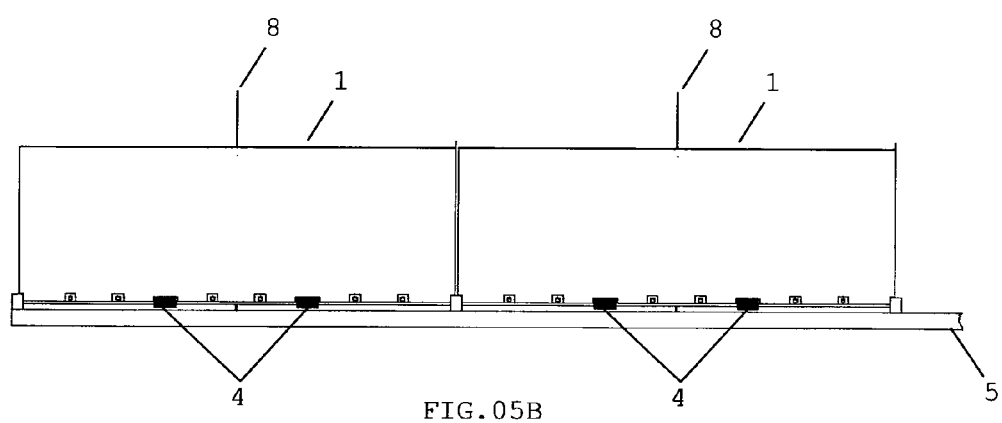
Figure 5C:
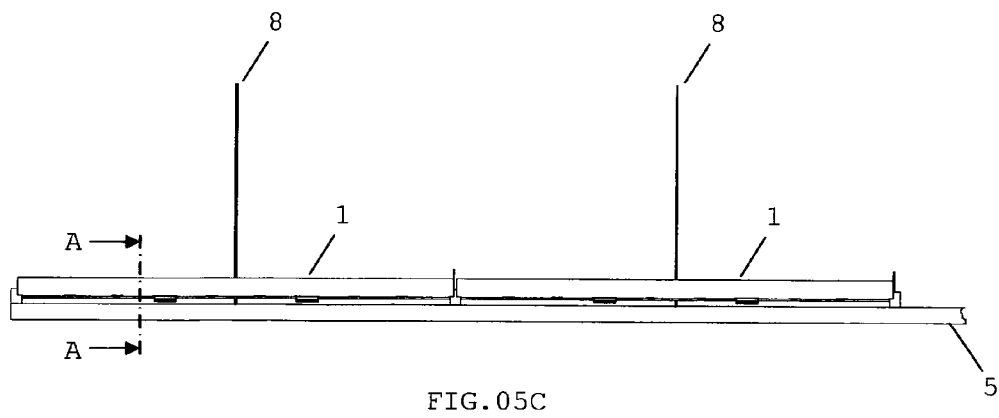
Figures 6A, 6B:
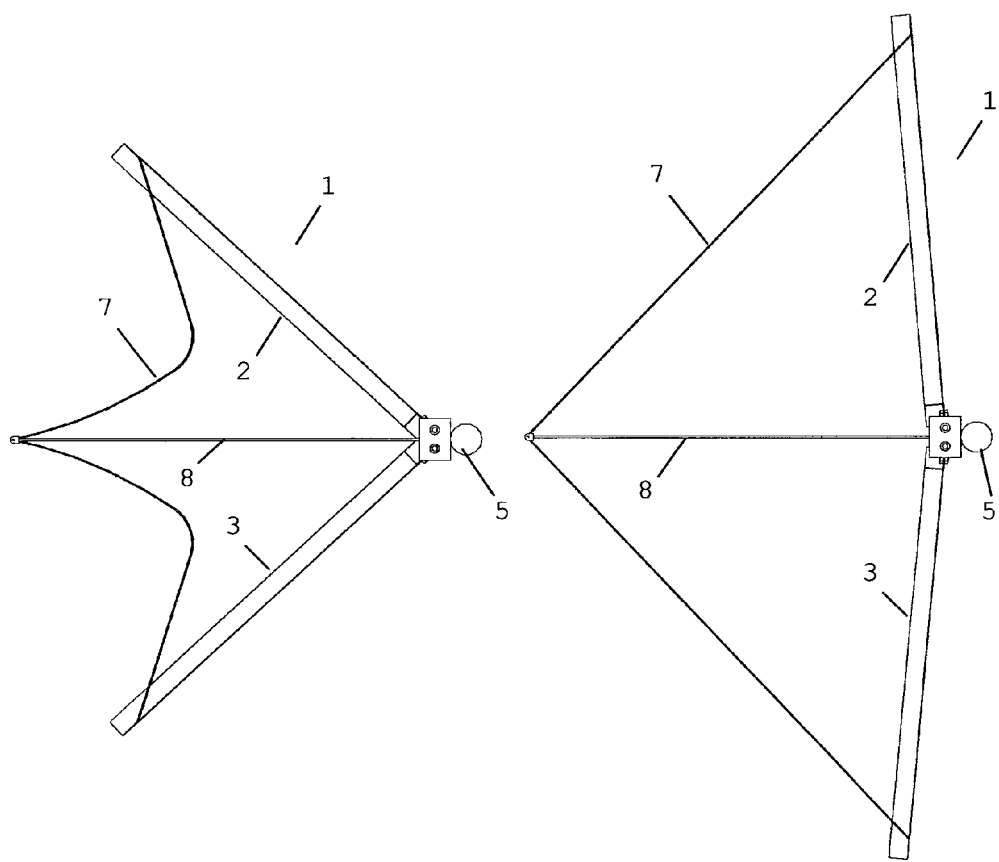
FIGS. 06A and 06B—lateral views of the movement evolution of the aerodynamic panels with limiter system implemented by cables. In the FIG. 06A the aerodynamic panels are 50% open. In the FIG. 06B the aerodynamic panels are fully open, demonstrating that the cables are limiting its openness.

For a better understanding of the present invention will be described below five possible ways of implementing or embodiments, however, the invention is not limited to the drawings and the embodiments below.

All embodiments have as a common element the aerodynamic panels system (1) with two symmetric boards, a top one (2) and other bottom (3), with interconnected movement by gears (4) that allow a synchronous movement between the blades (2) and (3). The FIGS. 01 to 13 illustrate the aerodynamic panels (1) and their variations of limiting of the course movement of the plates.

FIGS. 01A to 01C, 02A to 02C and 03A to 03C show the aerodynamic panel (1) elements and its movement dynamics and how it is fixed to an axis or a horizontal arm (5).

In the FIG. 01C the aerodynamic panels (1) are receiving the wind in its front face and, with this, the blades (2) and (3) shall be in a vertical position. In this case the blades (2) and (3) are supported in the backstops (6) that limit the end of the course of the blades (2) and (3). The arrow indicates the direction of the wind.

In this position the aerodynamic panels (1) pushed by the wind force drive the vertical wind turbine around its vertical axis. The side of the turbine where the panels are in the open position is called as the active side or traction side.

In the FIG. 01A the aerodynamic panels (1) are receiving the wind in their back face and, with this, the blades (2) and (3) shall be in the horizontal position or flattened. In this case the blades (2) and (3) are fully closed avoiding create drag or resistance for the wind. The arrow indicates the direction of the wind.

In this position the aerodynamic panels (1), closed by the wind force, remain horizontally until they back to the position to receive at least one wind force component on their front face. The side of the turbine, where the panels are in the closed position, is called as inactive side or drag side.

The FIGS. 04A to 04C, 05A to 05C and 06A to 06C also demonstrate the elements of the aerodynamic panel (1) and its movement dynamics and how it is fixed to an axis or a horizontal arm (5), however, in this configuration the movement restrictions of the blades is done through cables (7) that are set at the ends of the upper blades (2) and bottom blades (3) and pass through a pulley at the end of the axis (8).

Figure 7:
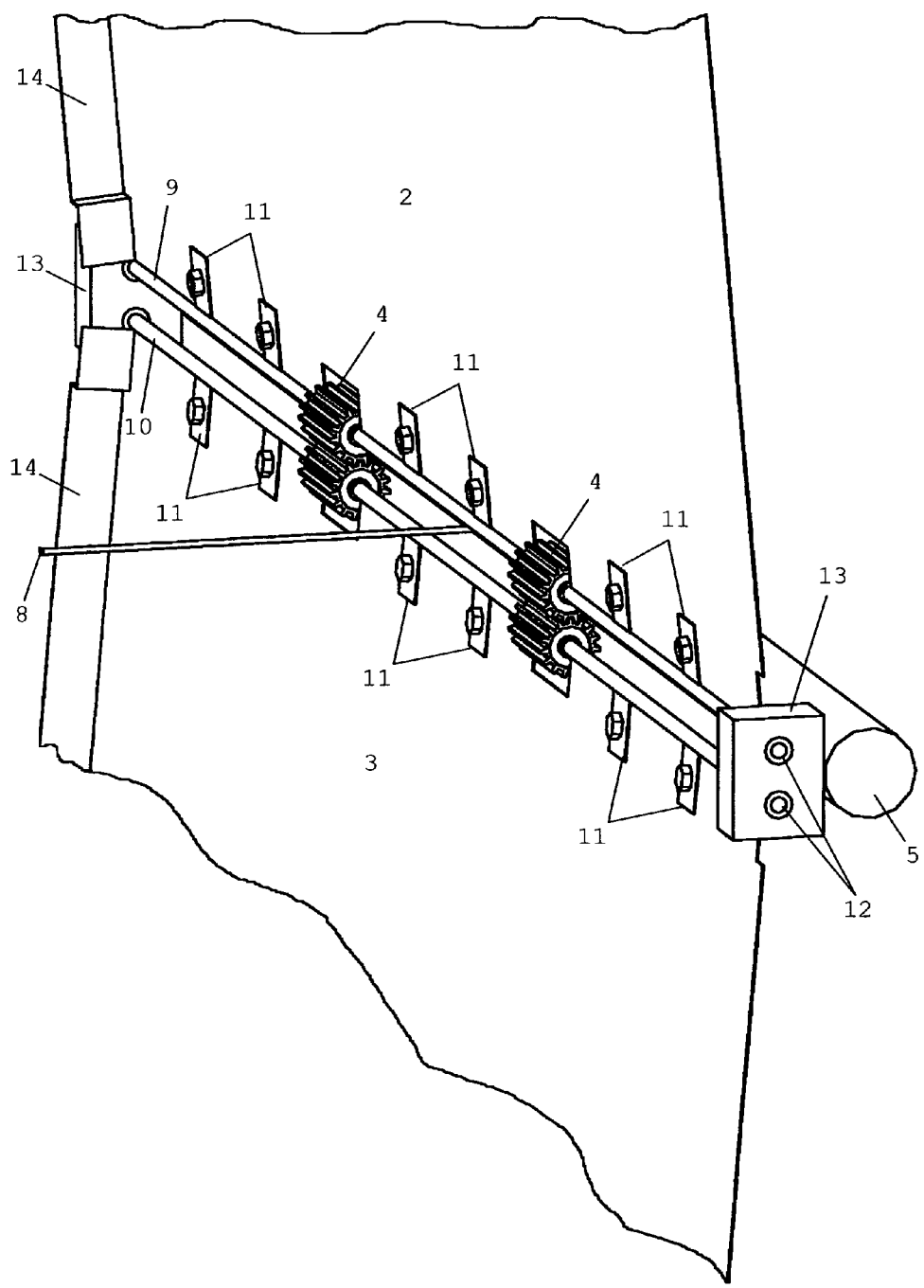
FIG. 07—perspective detailed view of the aerodynamic panels with limiter system by cables demonstrating the gears and the central axis responsible for support the cables.
Figure 8:
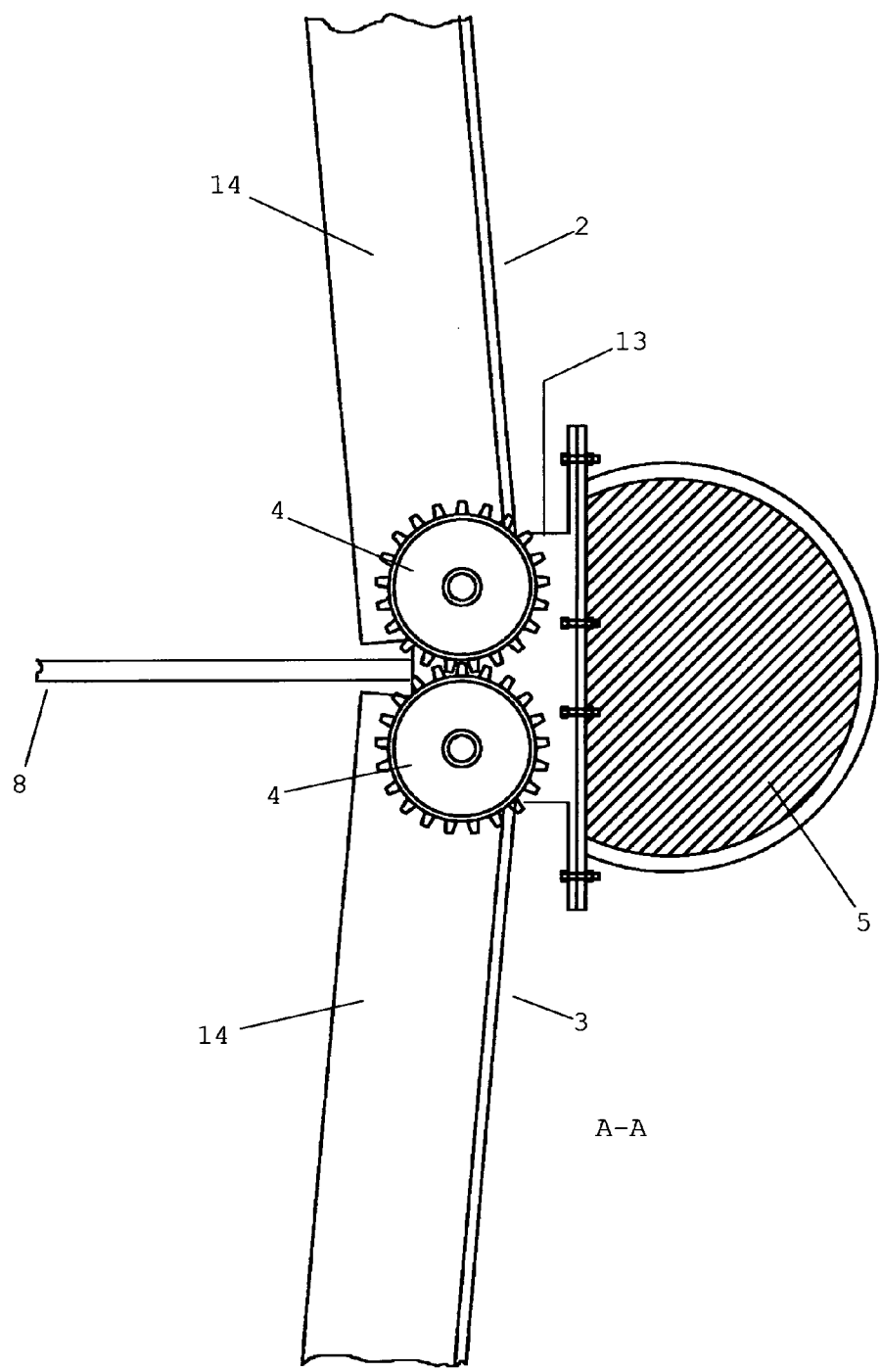
FIG. 08—lateral view of the AA cut in the FIG. 05C with the gears details.
Figure 9:
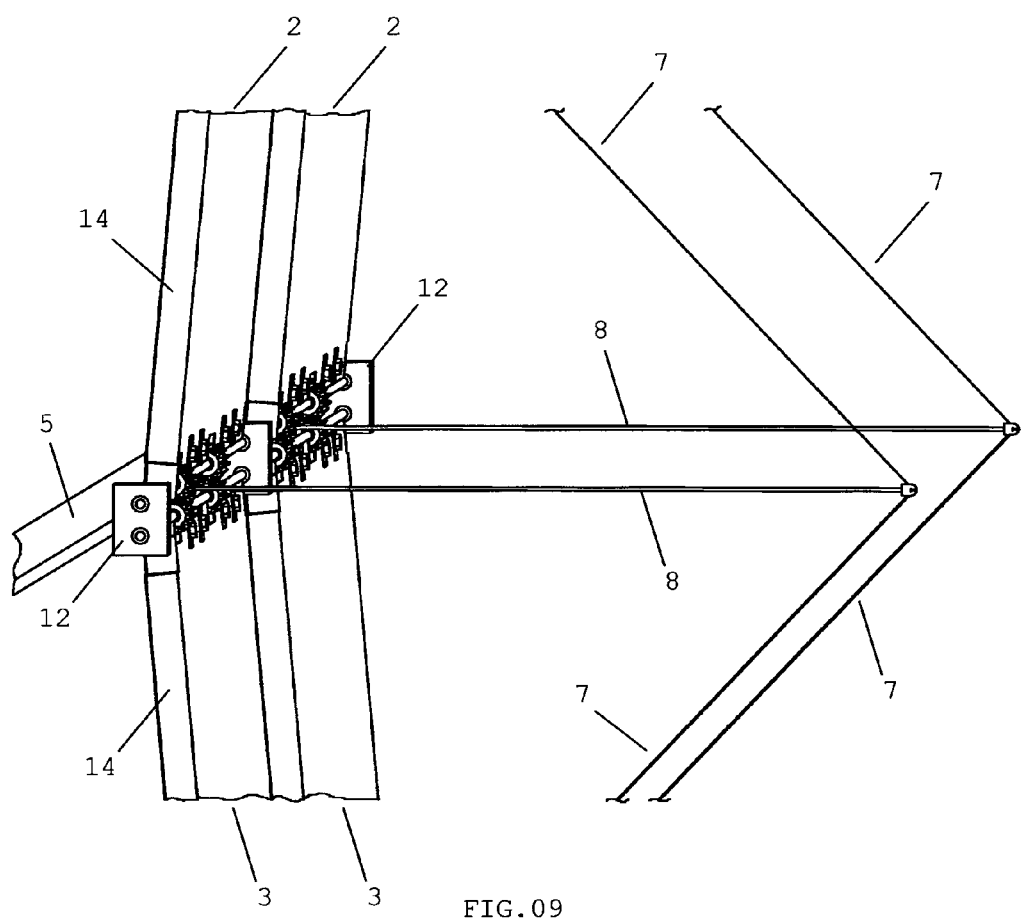
FIG. 09—right lateral perspective view of the aerodynamic panels with limiting system by cables demonstrating the gears and the central axis responsible for support the cables.

The FIGS. 07, 08 and 09 show in detail the aerodynamic panel. The blades (2) and (3) are with their movements synchronized through the gears (4). Although it not illustrated in the figures, the gears can be involved by an oil box so as to improve the sync between the gears (4) and cancel the noise generated by the contact between the gears (4).

The gears (4) are linked to the parallel axis (9) and (10) of the superior blades (2) and bottom blades (3) respectively. The blades are also linked to these two axis (9) and (10) through securing tabs (11).

At the ends of the axis (9) and (10) are placed bearings (12) responsible by the free rotation of the blades (2) and (3). These bearings are accommodated in the sidebars (13).

The sidebars (13) have the function to include and support the bearings (12) as well as fix the blades (2) and (3) of the aerodynamic panel (1) on the shaft or horizontal arm (5).

Between the axis (9) and (10) leave the axis (8) by where the movement limiting cables (7) of the blades (2) pass.

On the right side of the blades (2) and (3) there is a tab (14) responsible by preventing that, when the blades are closed, a wind entering laterally into the aerodynamic panel be capable to open the blades and create a drag on the inactive rotation side or drag of the turbine, which would reduce or cancel the turbine efficiency.

Figure 10A:
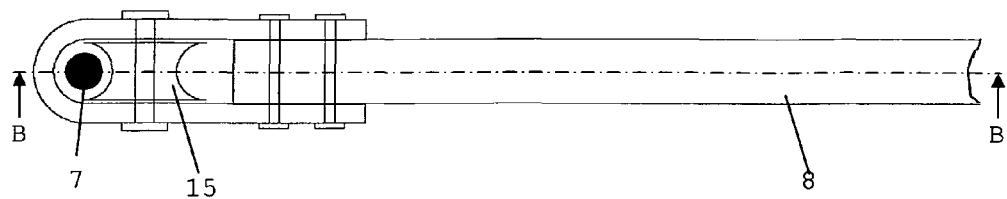
FIG. 10A is a top view of the axis.
Figure 10B:
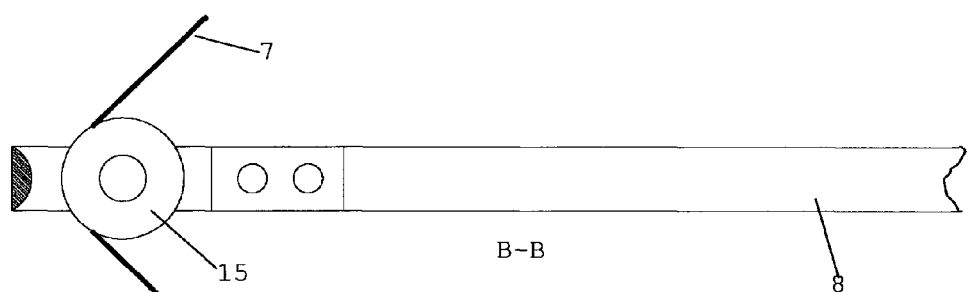
FIG. 10B is a view of the BB cut of the axis.
Figure 10C:
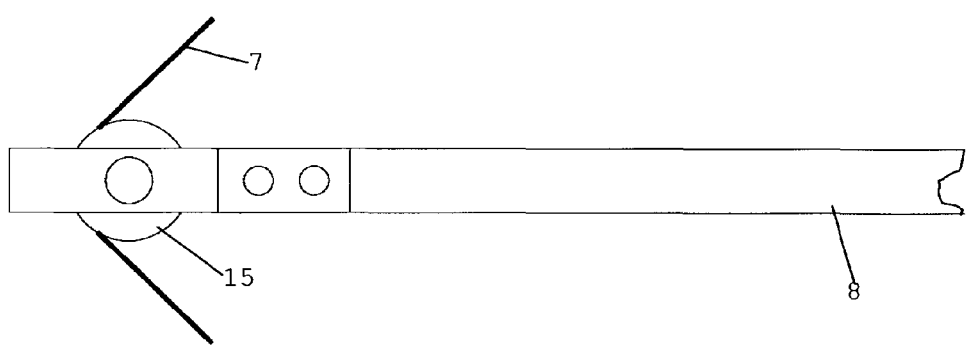
FIG. 10C is a lateral view of the axis.
Figure 11:
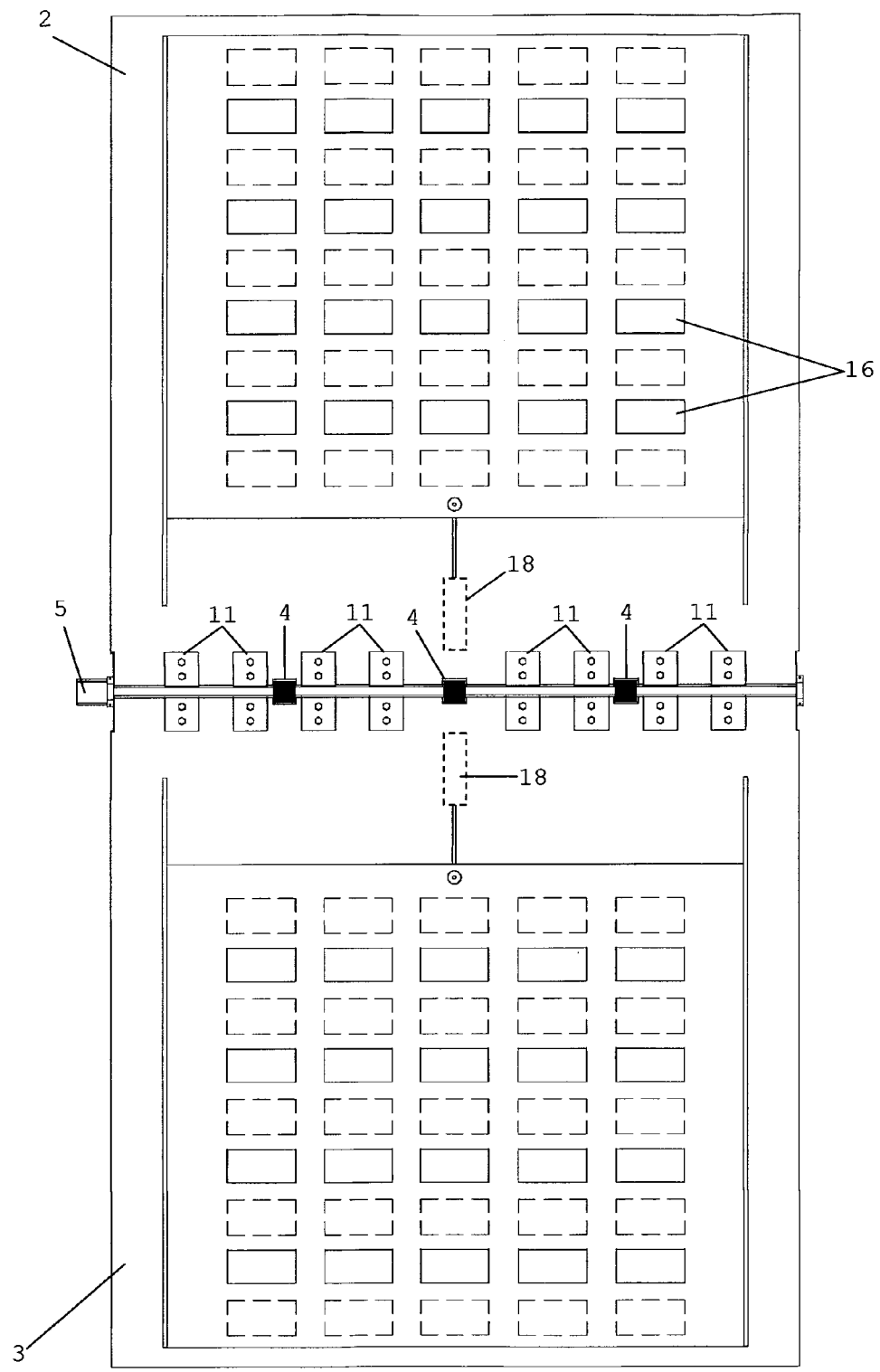
FIG. 11—front view of the aerodynamic panels fully open showing the option of the panels to have holes that can be opened and closed by means of a plate powered by servo-motors thereby changing the catchment area of wind force and enabling the control of the turbine rotation.
Figure 12:
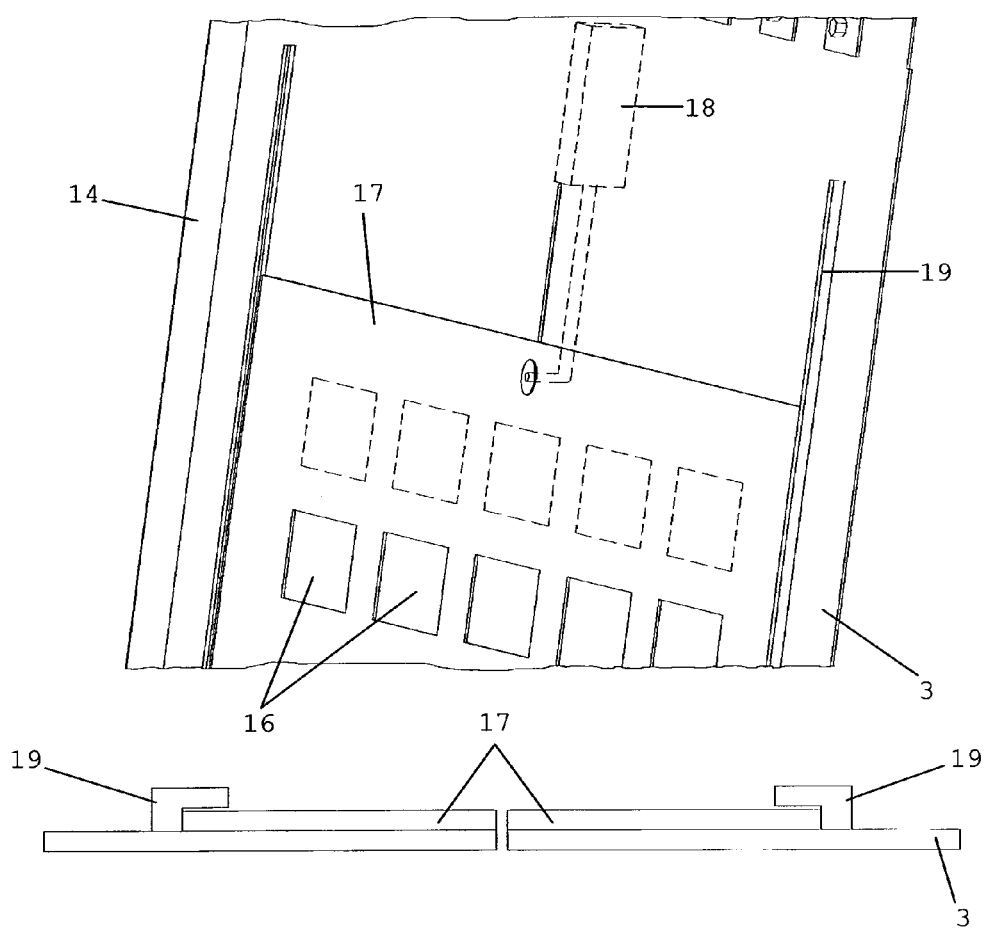
FIG. 12—superior detailed perspective view of the aerodynamic panel showing the option of the panels to have holes that can be opened and closed by means of a plate powered by servo-motors thereby changing the catchment area of wind force and enabling the control of the turbine rotation. This figure demonstrates how a plate sliding behind the panel allowing open and close the holes.
Figure 13:
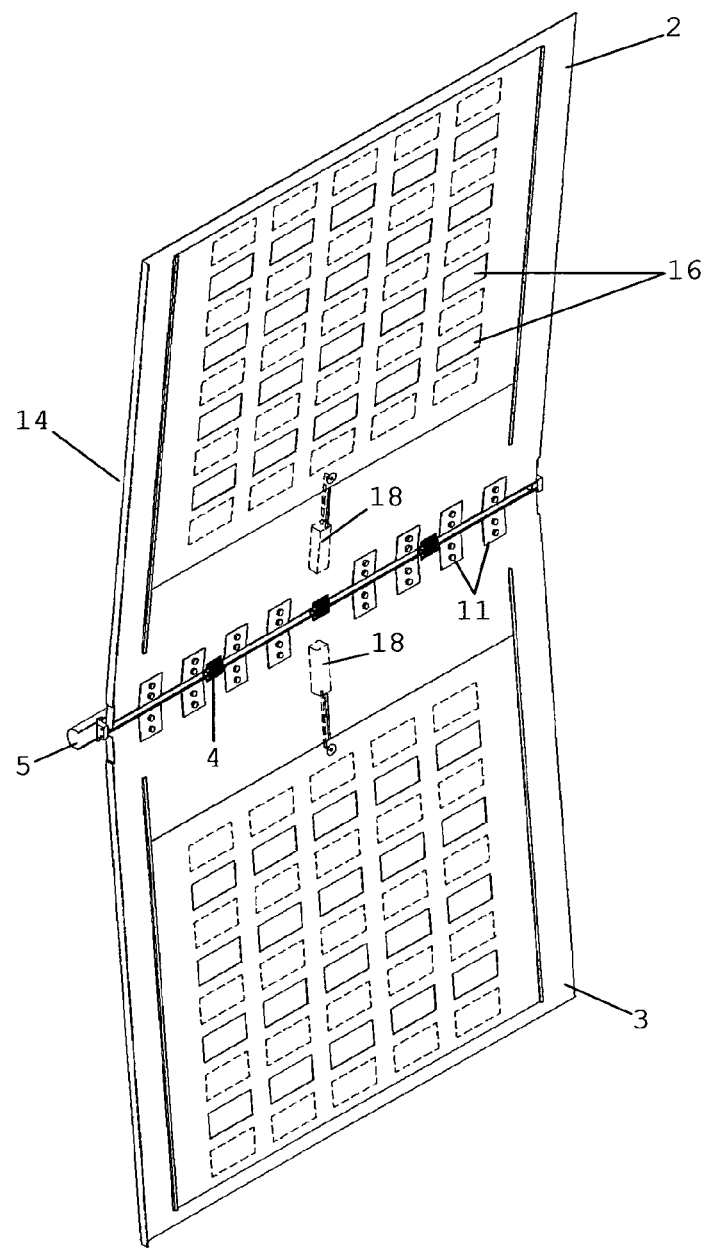
FIG. 13—perspective view of the aerodynamic panels fully open showing the option of the panels to have holes that can be opened and closed by means of a plate powered by servo-motors thereby changing the catchment area of wind force and enabling the control of the turbine rotation.

The FIGS. 10A, 10B and 10C illustrate the details from the axis (8) end where a pulley (15) is responsible by leave the cables (7) move freely tracking the movement of the blades (2) and (3).

Optionally the upper blade (2) and bottom blade (3) can be equipped with holes (16) that open and close by the sliding movement of a plate (17) that has the same holes (16) that the blades (2) and (3), and when the plate (17) is in the correct position, the holes (16) of the plate (17) coincide with the holes of the blades (2) and (3) allowing that increase or decrease the wind force catchment area and the possible control of the speed of the turbine depending on the variation of wind force.

The plates (17) are powered by servomotors (18) that are controlled by a control unit that controls the entire turbine. The movement of the plates (17) is guided by rails (19) in "L" format.

First Embodiment

In the smallest embodiment, illustrated in the FIGS. 14 to 20, is provided a small system with a tubular axis (20) of small caliber to be fixed at the top of a mast or post (21). On this axis rotates a hollow cylindrical cover (22) through bearings (23) and (24) provided with at least one level of crosses (25), where each cross has four metal axis or arms (5) with 90° between them in which shall be fixed at least one aerodynamic panel (1) for each axis or arm.

The hollow cylindrical cover (22) occupies an extension equivalent to two thirds of the size of the tubular axis (20) and has on its basis a pulley (26) that will operate a small generator (27) that is set on the tubular axis (20) just below of the hollow cylindrical cover (22).

Optionally, the blades (2) and (3) may contain in its vertex of the open angle (meeting point between the two blades) a canvas or rubber flexible cover (28) in order to reduce the fugue of the wind through its rotating fixing horizontal axis (9) and (10).

Figure 14:
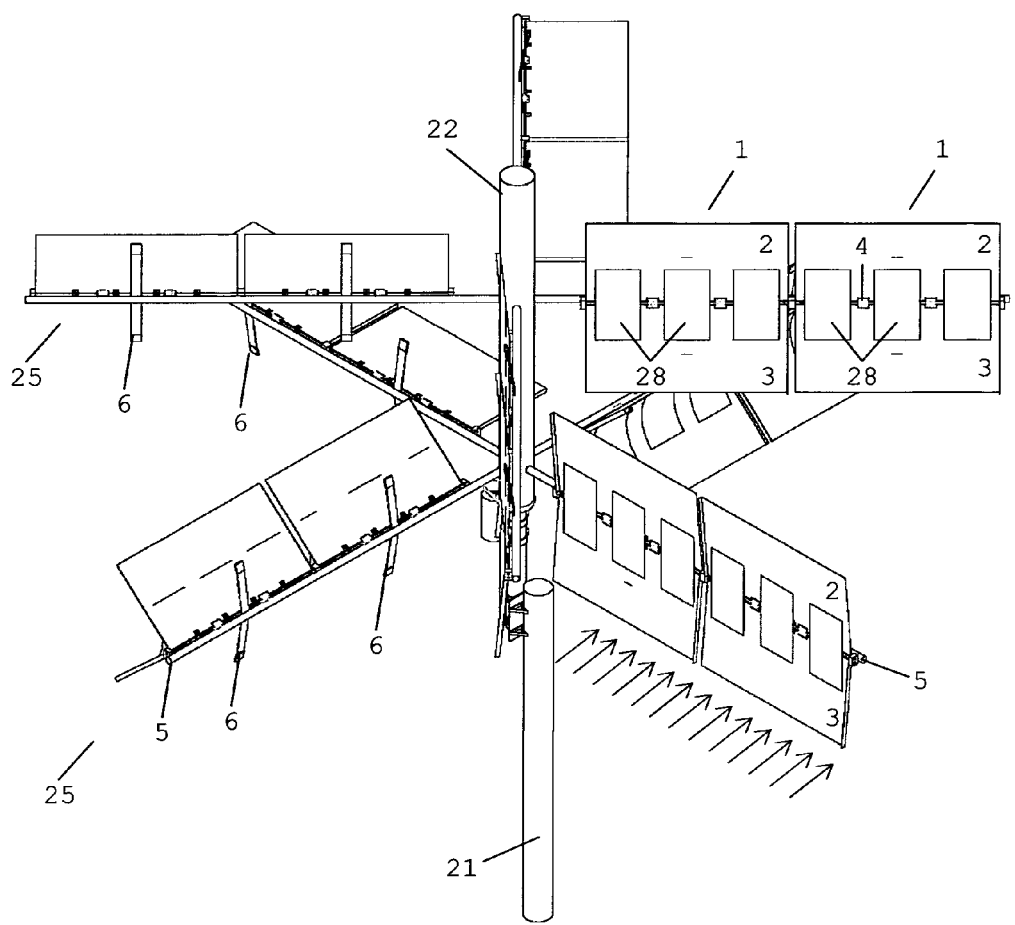
FIG. 14—perspective view of the first embodiment of the vertical wind turbine where this system is coupled to a lamp-post and has a generator in its basis to the energy production. The aerodynamic panels are using the course limitation through backstops. The arrows show the wind direction.
Figure 15:
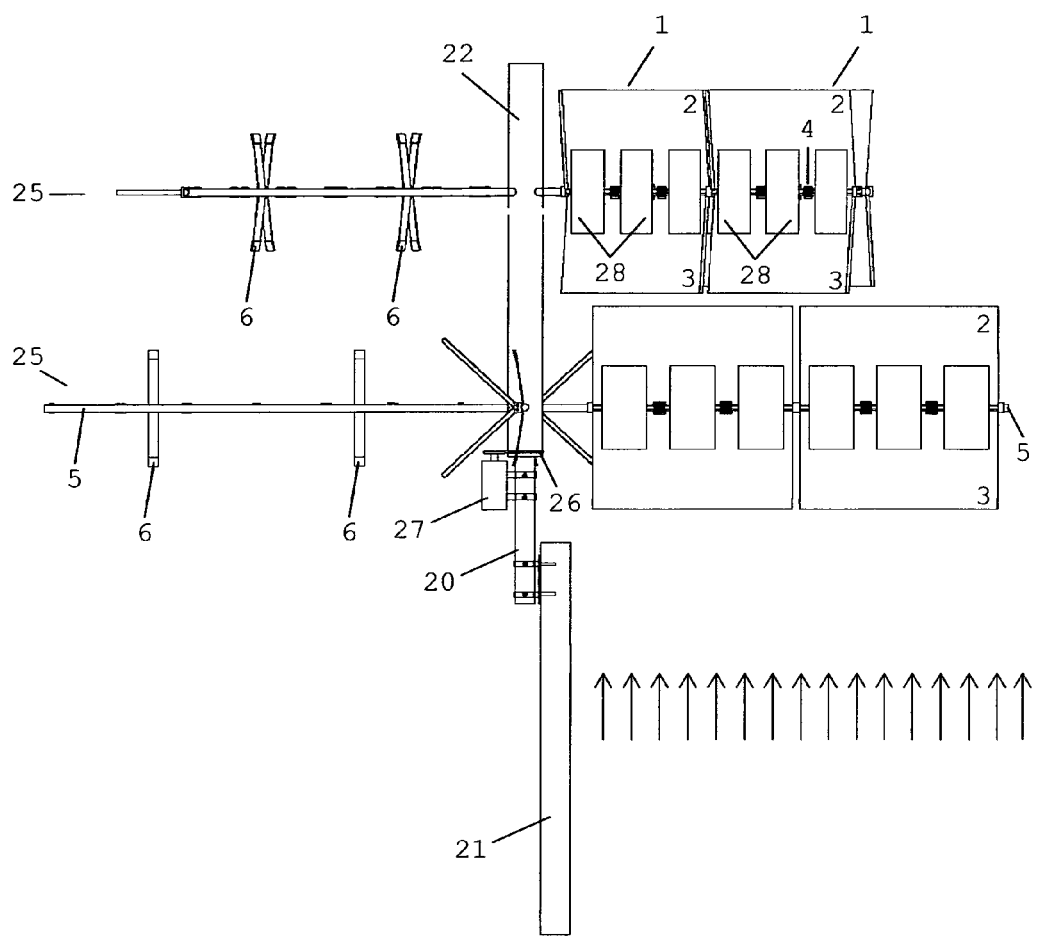
FIG. 15—front view of the first embodiment of the vertical wind turbine where this system is coupled to a lamppost and has a generator in its basis to the energy production. The aerodynamic panels are using the course limitation through backstops. The arrows show the wind direction.
Figure 16:
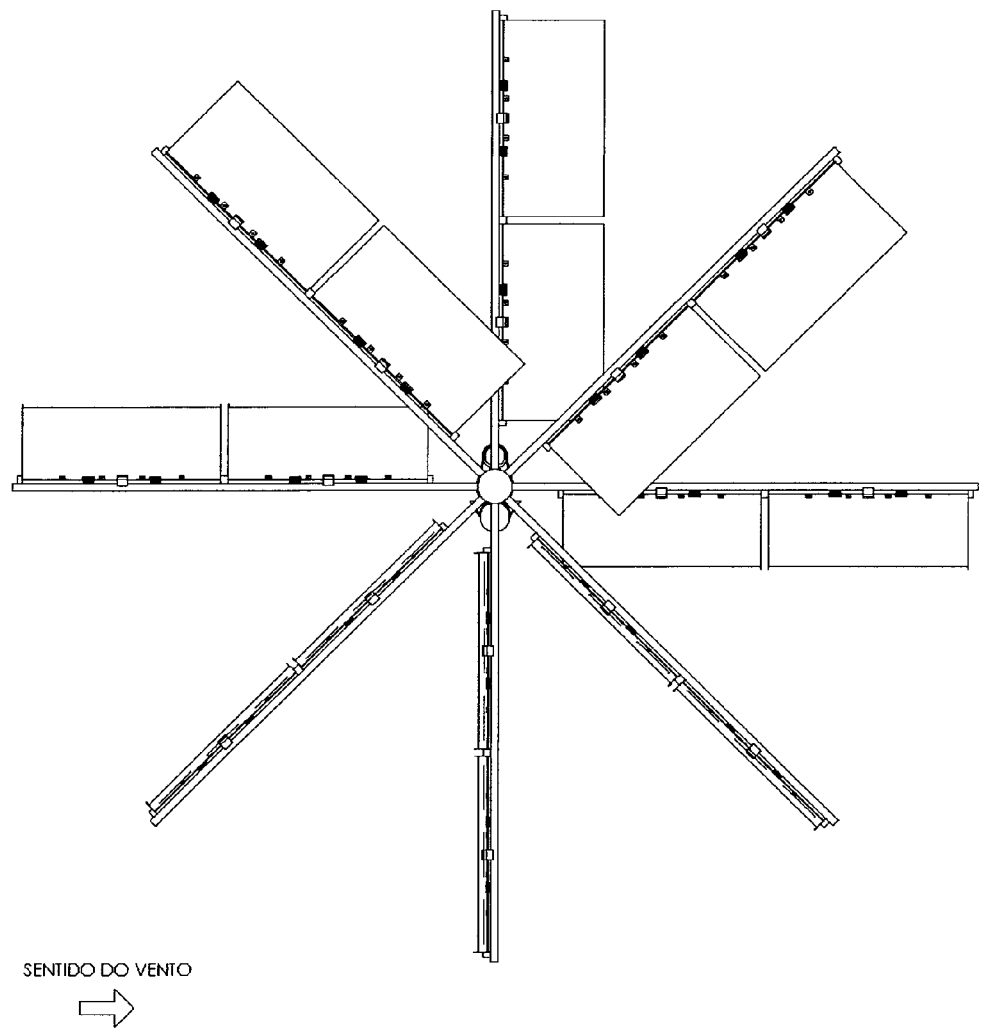
FIG. 16—superior view of the first embodiment of the vertical wind turbine where this system is coupled to a lamppost and has a generator in its basis to the energy production. The aerodynamic panels are using the course limitation through backstops. The arrows show the wind direction.
Figure 17:
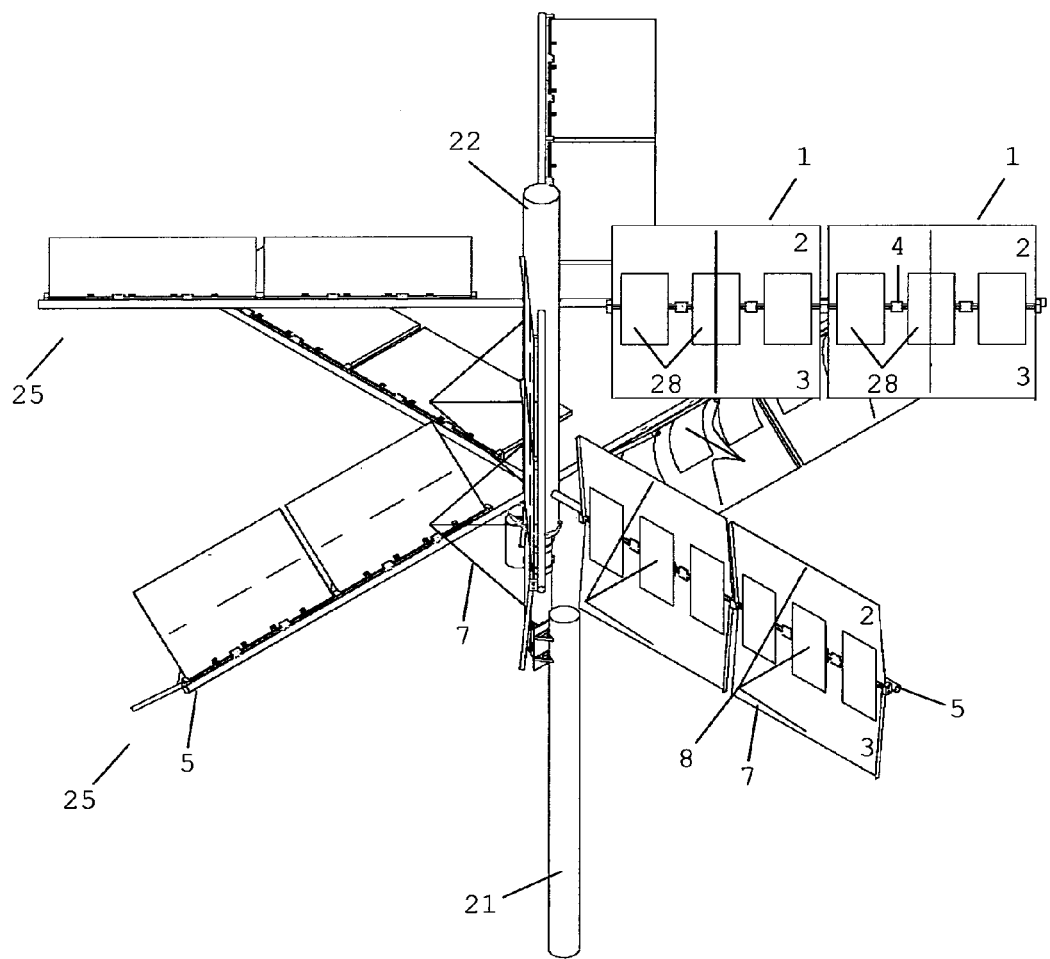
FIG. 17—perspective view of the first embodiment of the vertical wind turbine where this system is coupled to a lamppost and has a generator in its basis to the energy production. The aerodynamic panels are using the course limitation through cables. The arrows show the wind direction.
Figure 18:
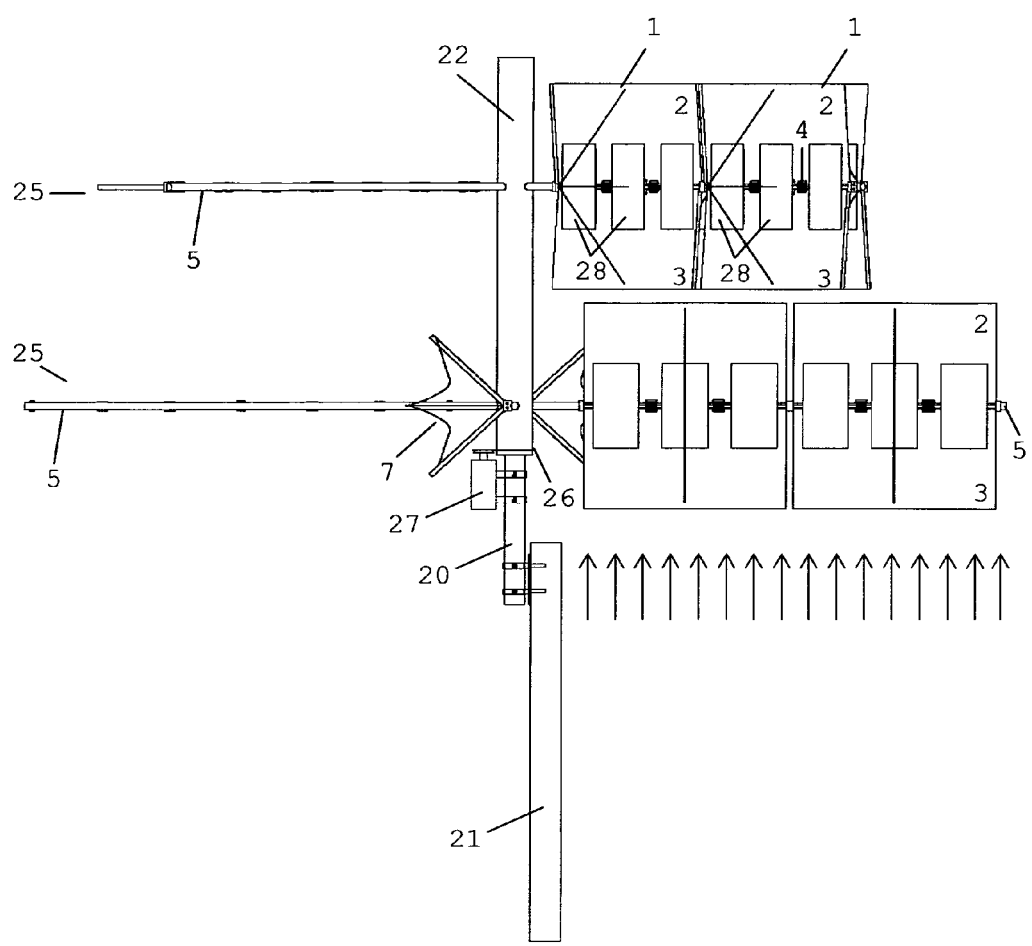
FIG. 18—front view of the first embodiment of the vertical wind turbine where this system is coupled to a lamppost and has a generator in its basis to the energy production. The aerodynamic panels are using the course limitation through cables. The arrows show the wind direction.
Figure 19:
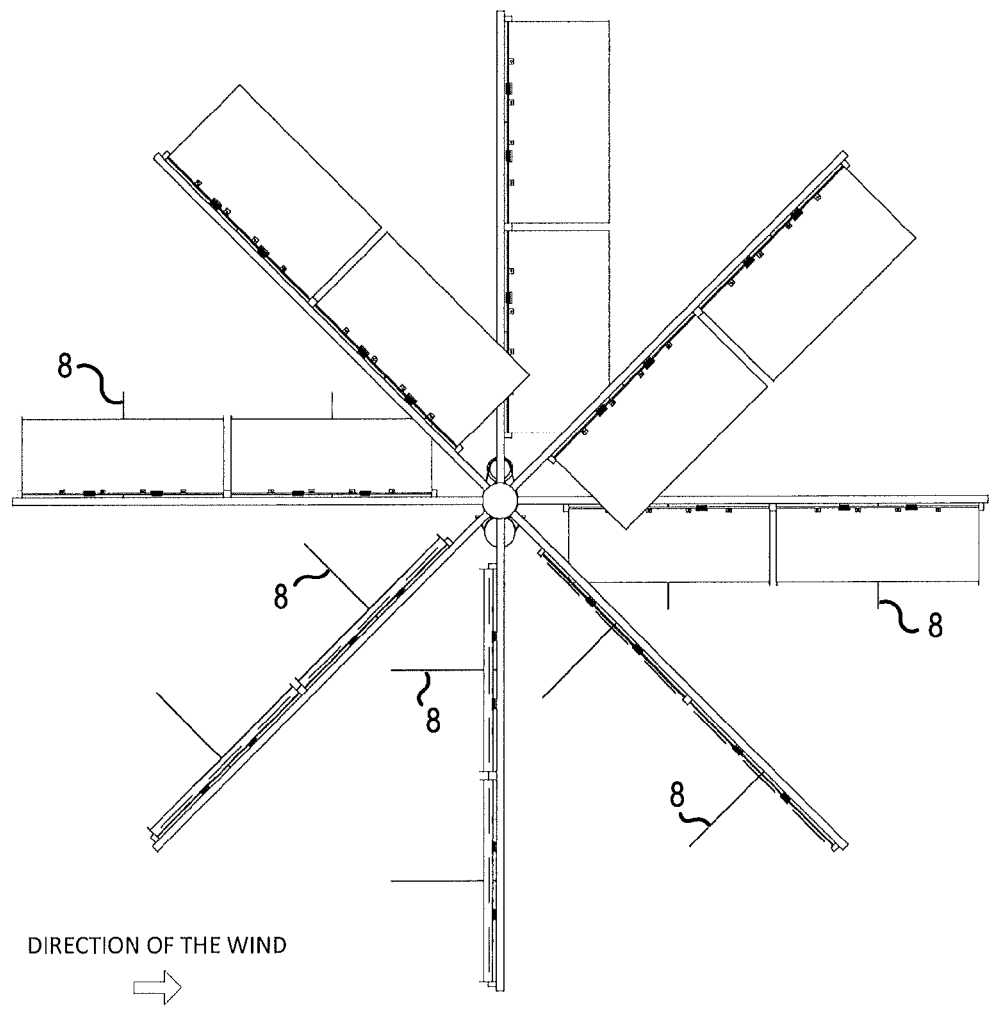
FIG. 19—superior view of the first embodiment of the vertical wind turbine where this system is coupled to a lamppost and has a generator in its basis to the energy production. The aerodynamic panels are using the course limitation through cables. The arrows show the wind direction.
Figure 20:
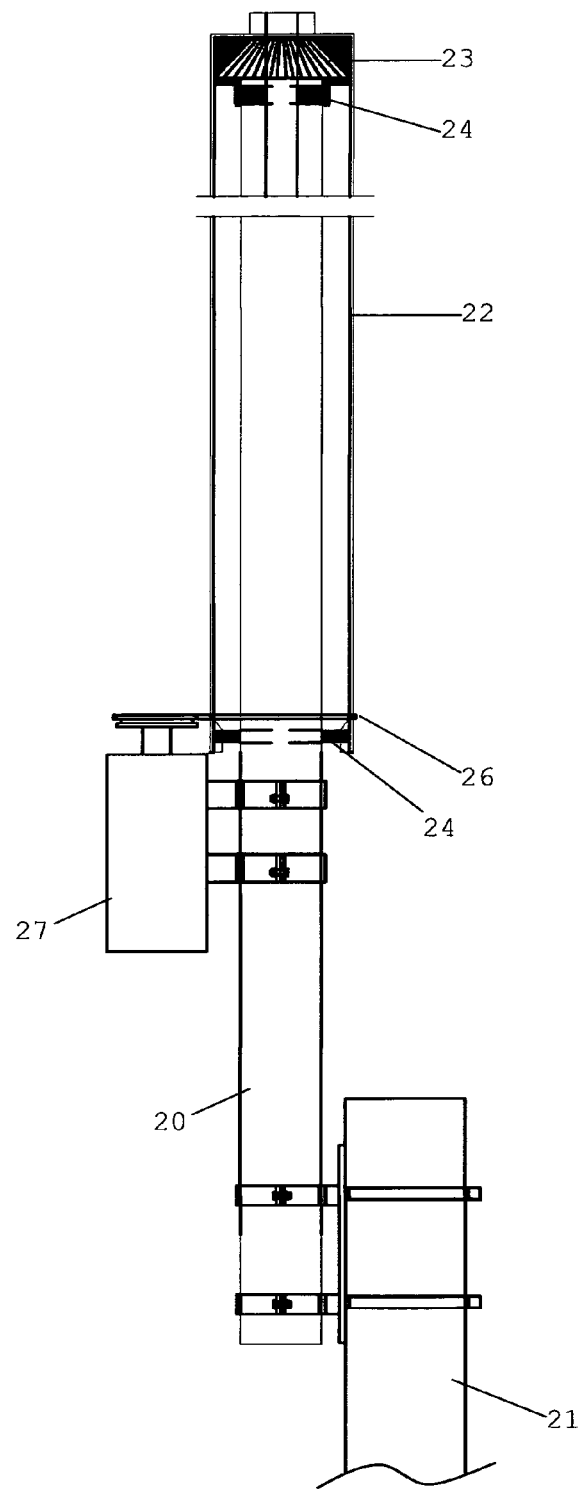
FIG. 20—cut front view of the first embodiment of the vertical wind turbine detailing the rotary hollow cylindrical cover.
Figure 21:
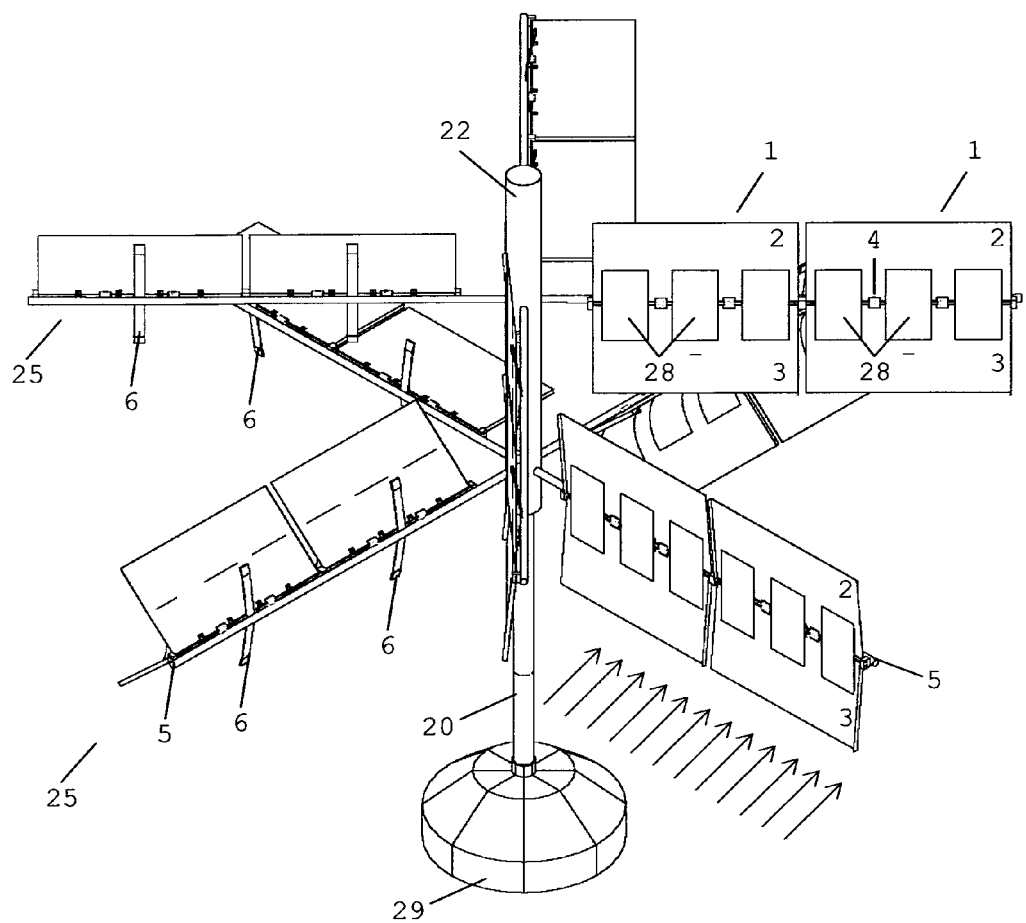
FIG. 21—perspective view of the second embodiment of the vertical wind turbine. The aerodynamic panels are using the course limitation through backstops. The arrows show the wind direction.
Figure 22:
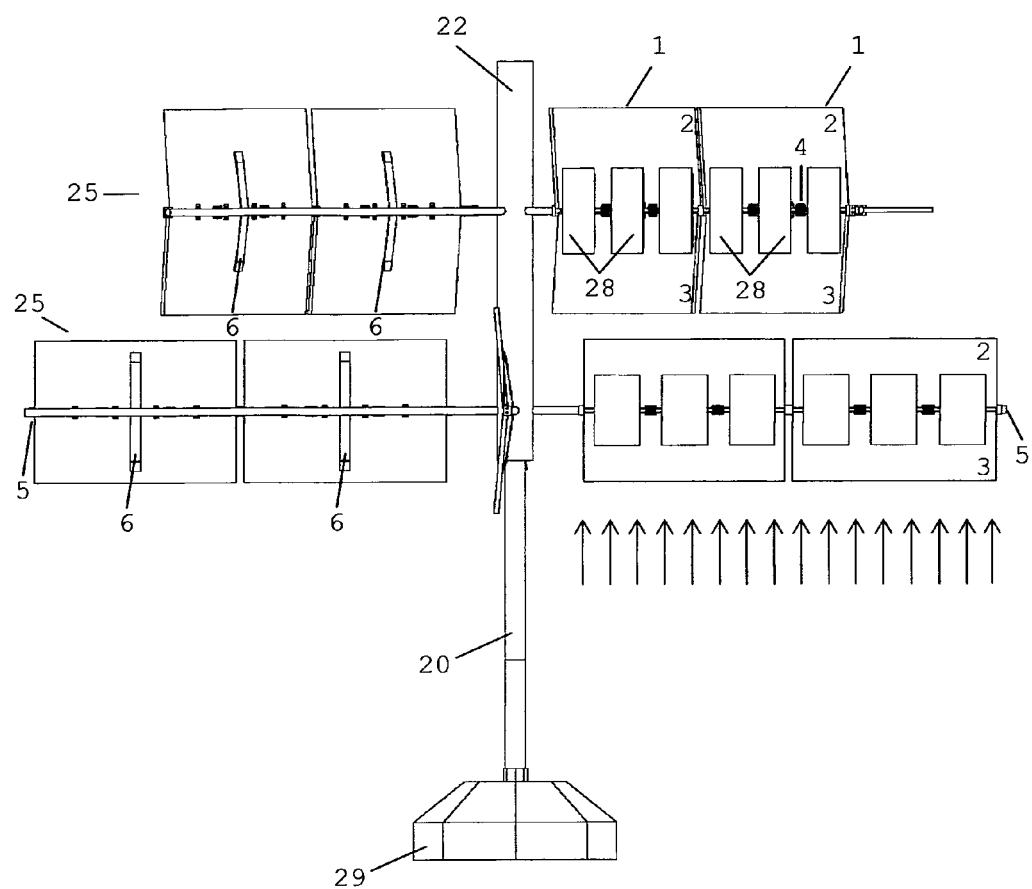
FIG. 22—front view of the second embodiment of the vertical wind turbine. The aerodynamic panels are using the course limitation through backstops. The arrows show the wind direction.
Figure 23:
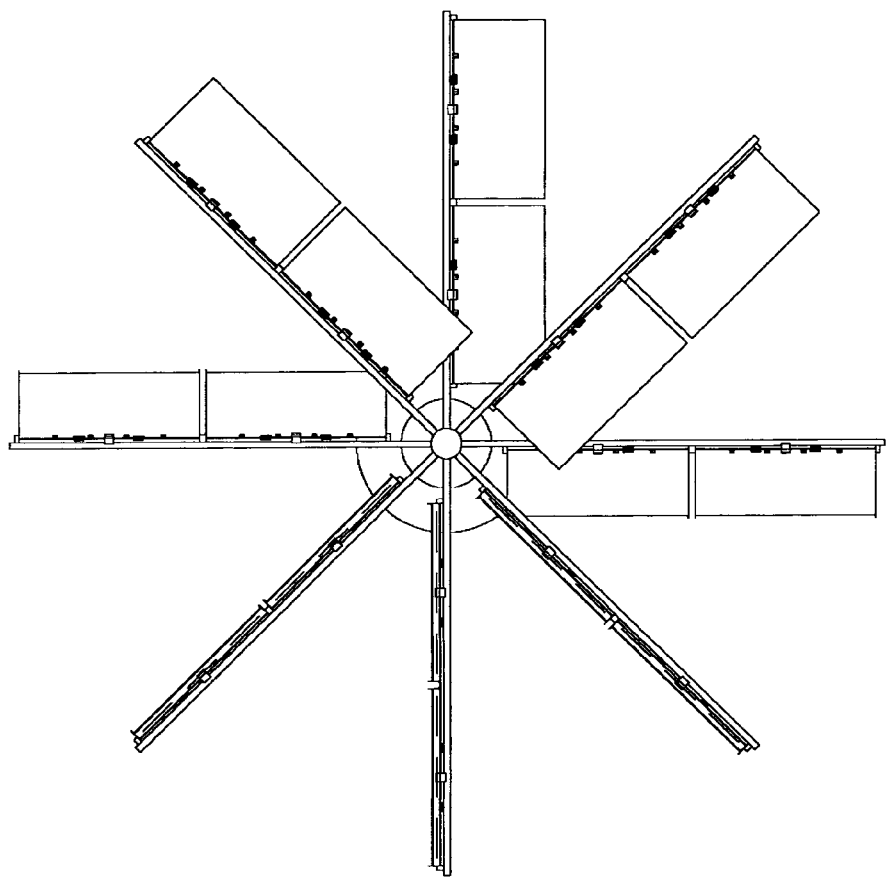
FIG. 23—superior view of the second embodiment of the vertical wind turbine. The aerodynamic panels are using the course limitation through backstops. The arrows show the wind direction.
Figure 23:
Figure 24:
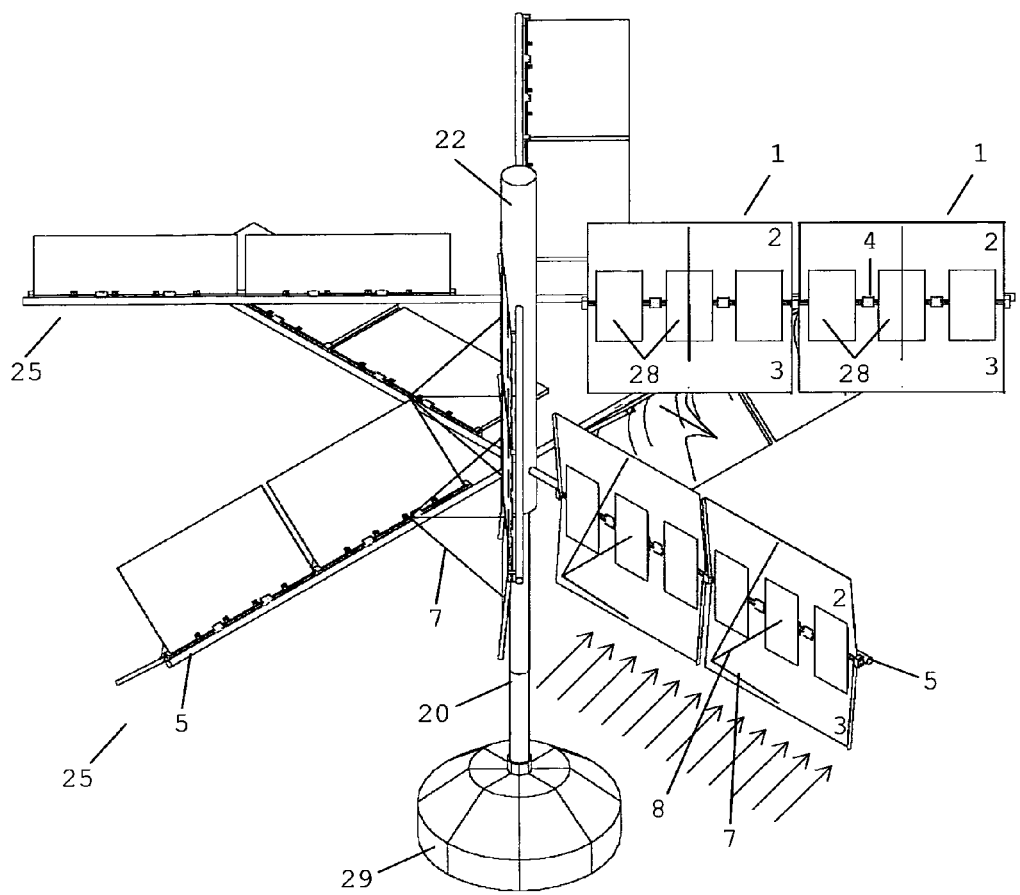
FIG. 24—perspective view of the second embodiment of the vertical wind turbine. The aerodynamic panels are using the course limitation through cables. The arrows show the wind direction.
Figure 25:
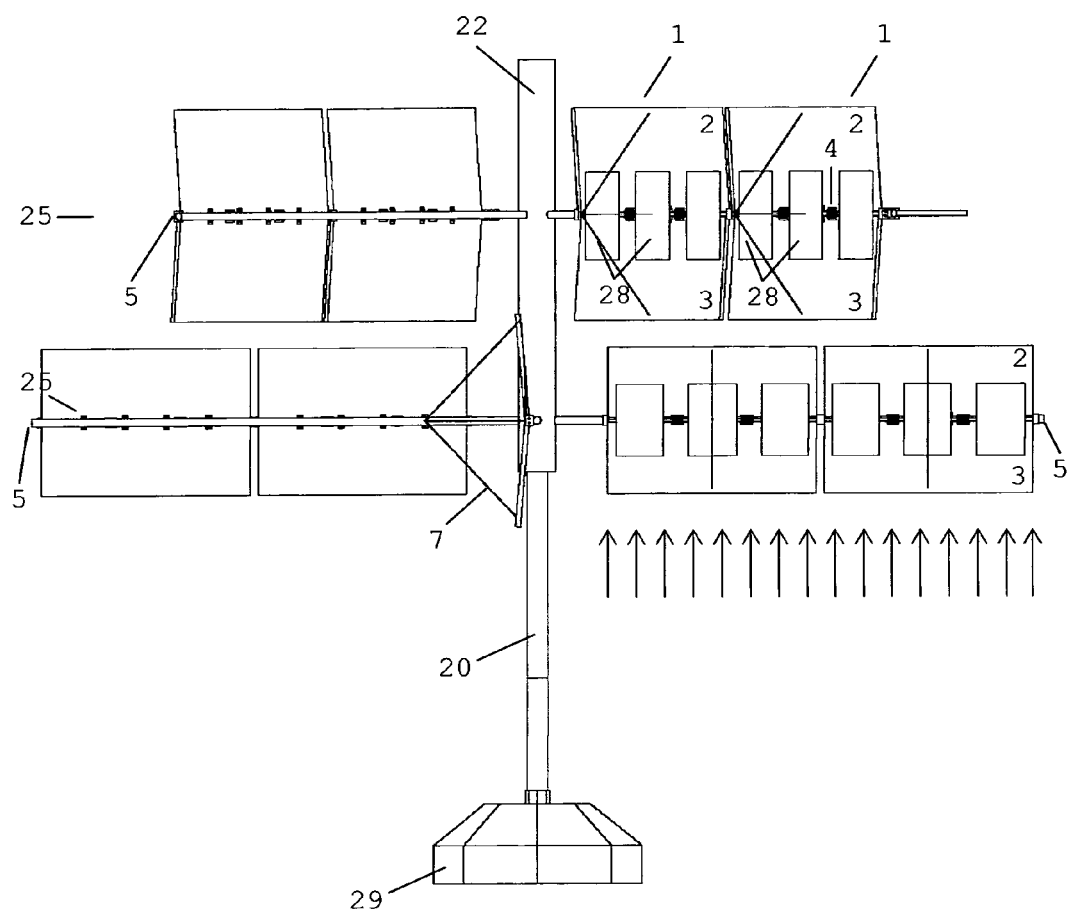
FIG. 25—front view of the second embodiment of the vertical wind turbine. The aerodynamic panels are using the course limitation through cables. The arrows show the wind direction.
Figure 26:
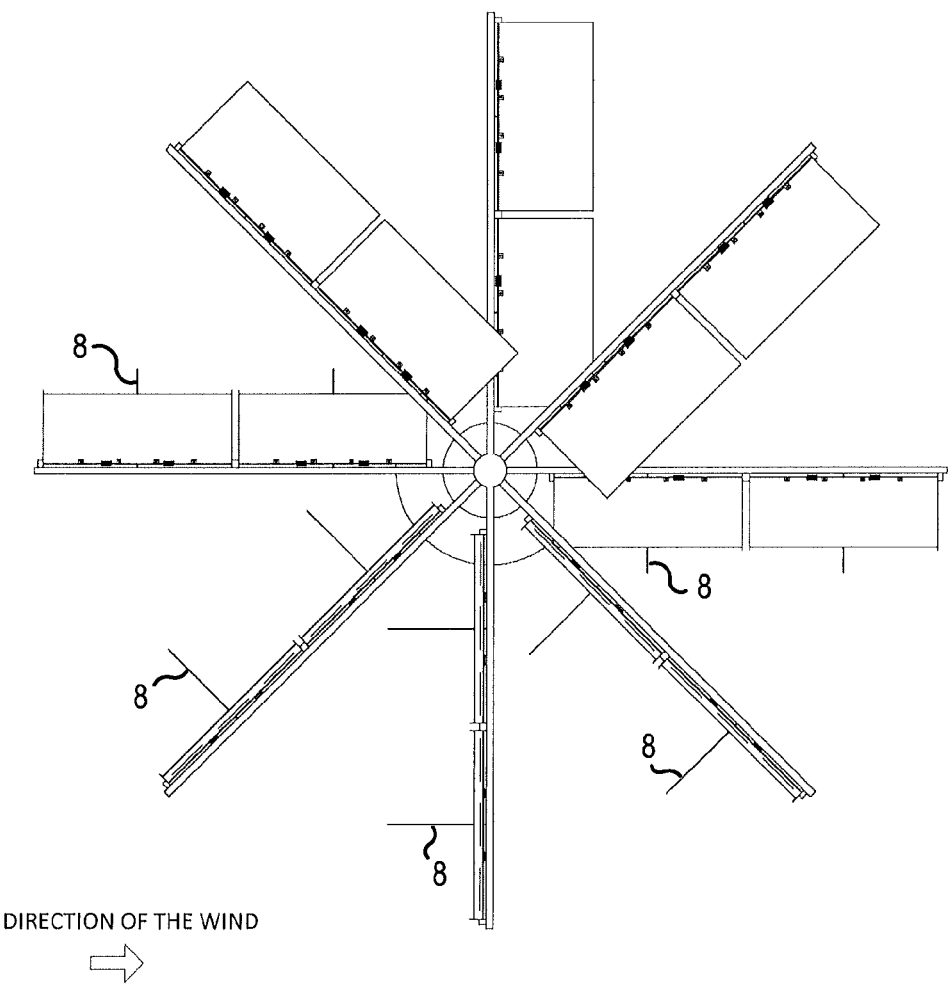
FIG. 26—superior view of the second embodiment of the vertical wind turbine. The aerodynamic panels are using the course limitation through cables. The arrows show the wind direction.
Figure 27:
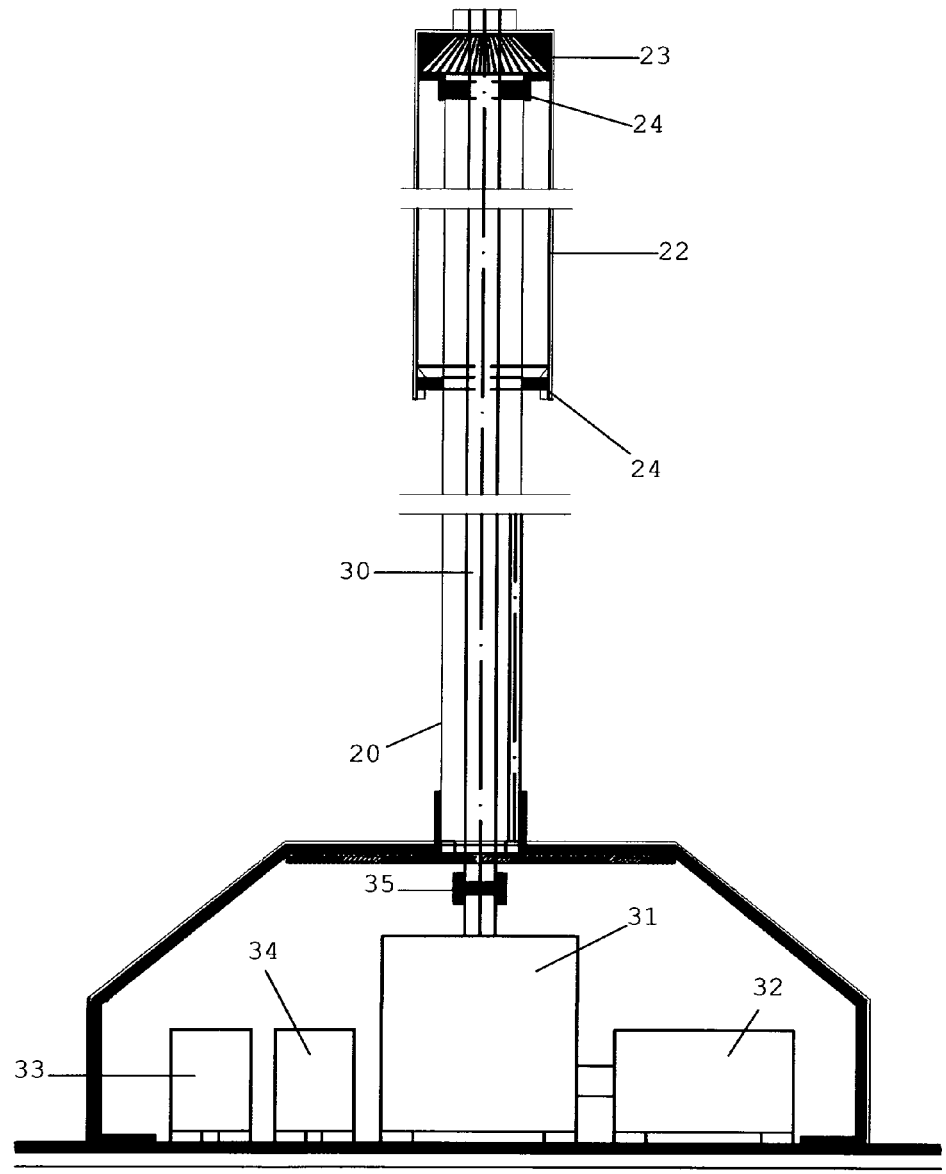
FIG. 27—lateral cut view of the second embodiment of the vertical wind turbine. Show the details of the hollow cylindrical cover, post and the elements inside the base that represents the electrical power generator set.
Figure 28:
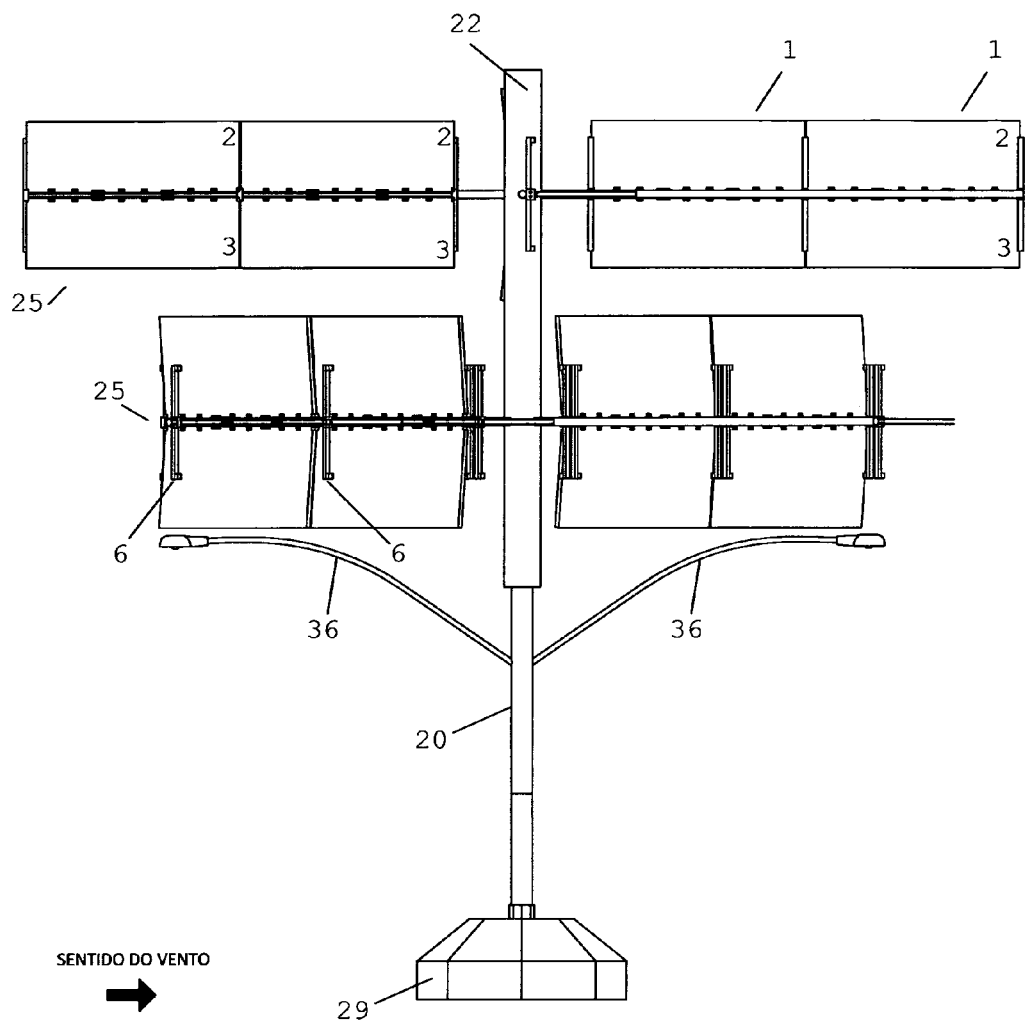
FIG. 28—front view of the second embodiment of the vertical wind turbine equipped with fixtures. The aerodynamic panels are using the course limitation through backstops. The arrows show the wind direction.
Figure 29:
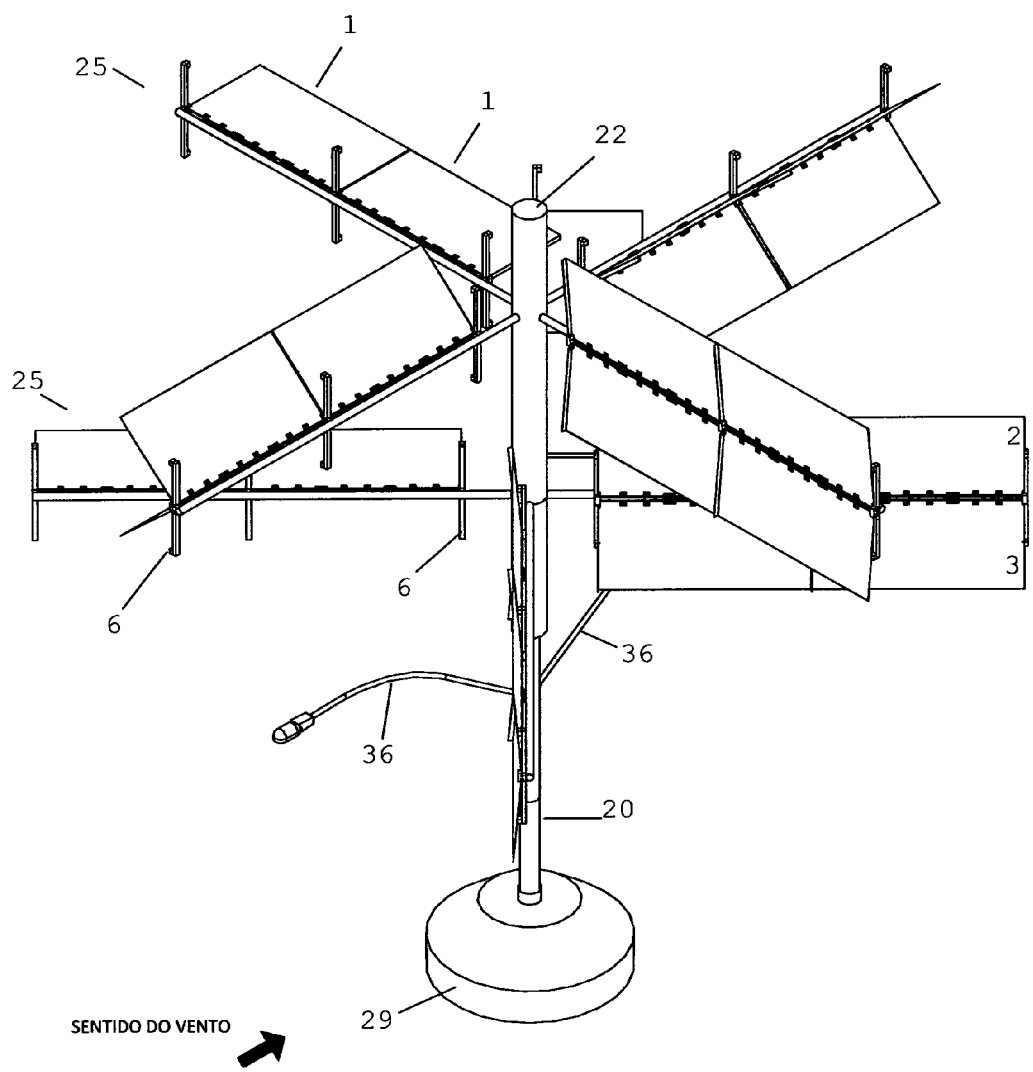
FIG. 29—perspective view of the second embodiment of the vertical wind turbine equipped with fixtures. The aerodynamic panels are using the course limitation through backstops. The arrows show the wind direction.
Figure 30:
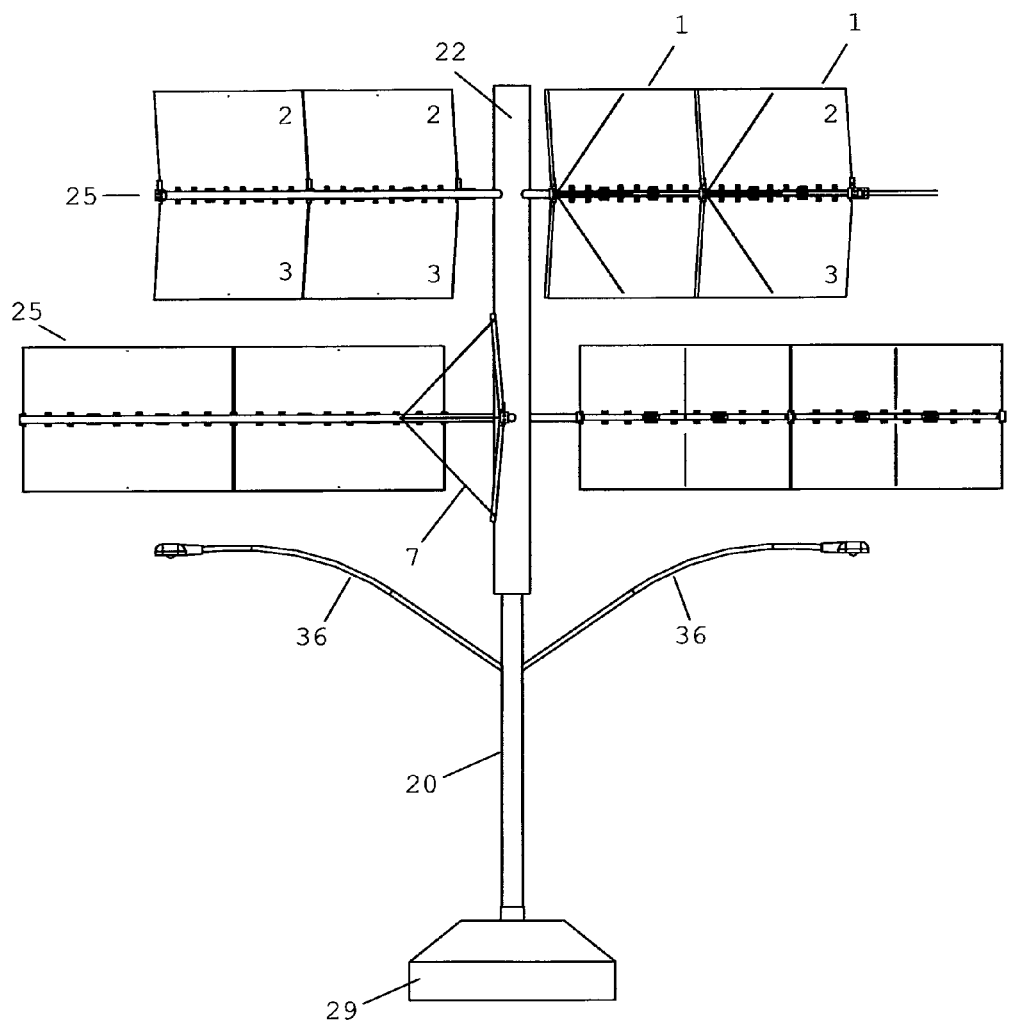
FIG. 30—front view of the second embodiment of the vertical wind turbine equipped with fixtures. The aerodynamic panels are using the course limitation through cables. The arrows show the wind direction.
Figure 31:
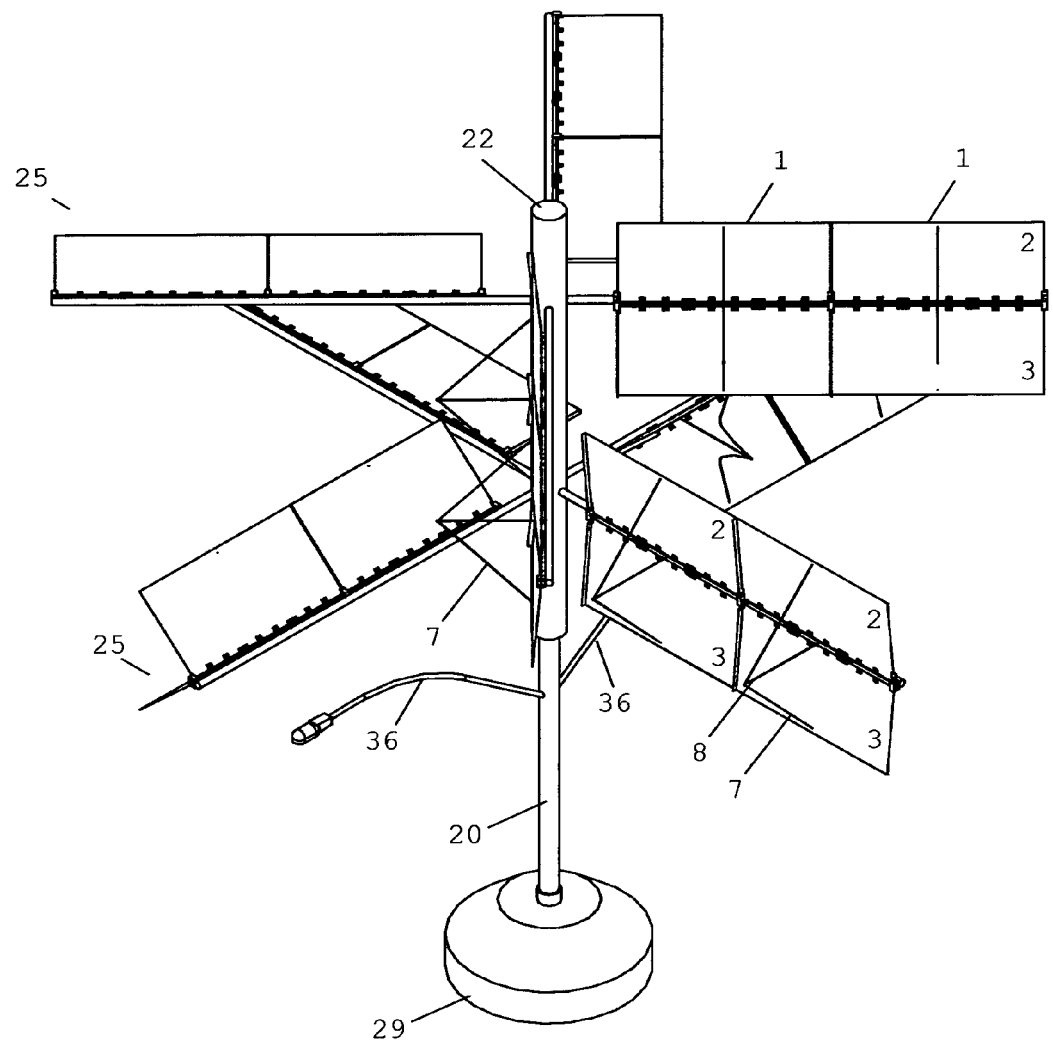
FIG. 31—perspective view of the second embodiment of the vertical wind turbine equipped with fixtures. The aerodynamic panels are using the course limitation through cables. The arrows show the wind direction.
Figure 32:
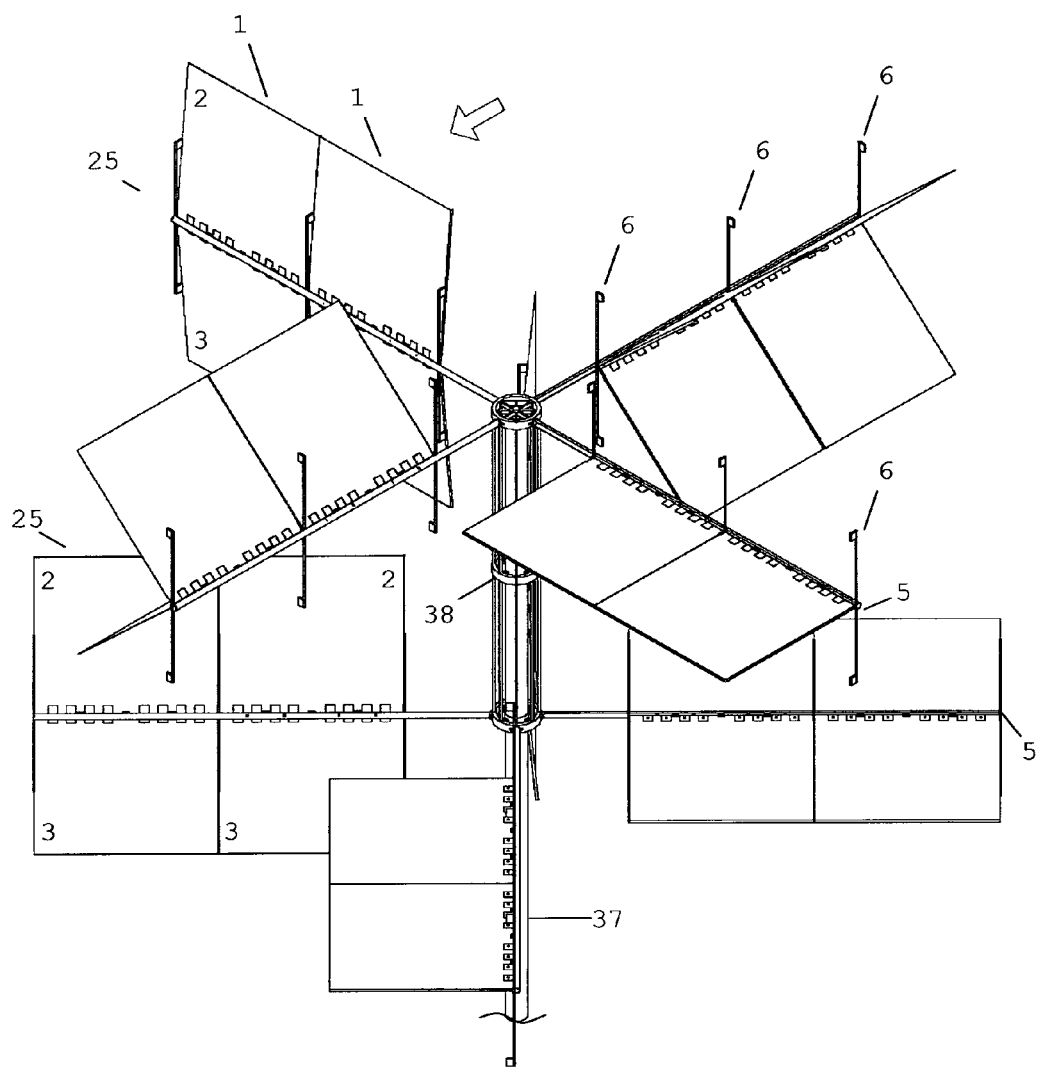
FIG. 32—perspective view of the third embodiment of the vertical wind turbine.
Figure 33:
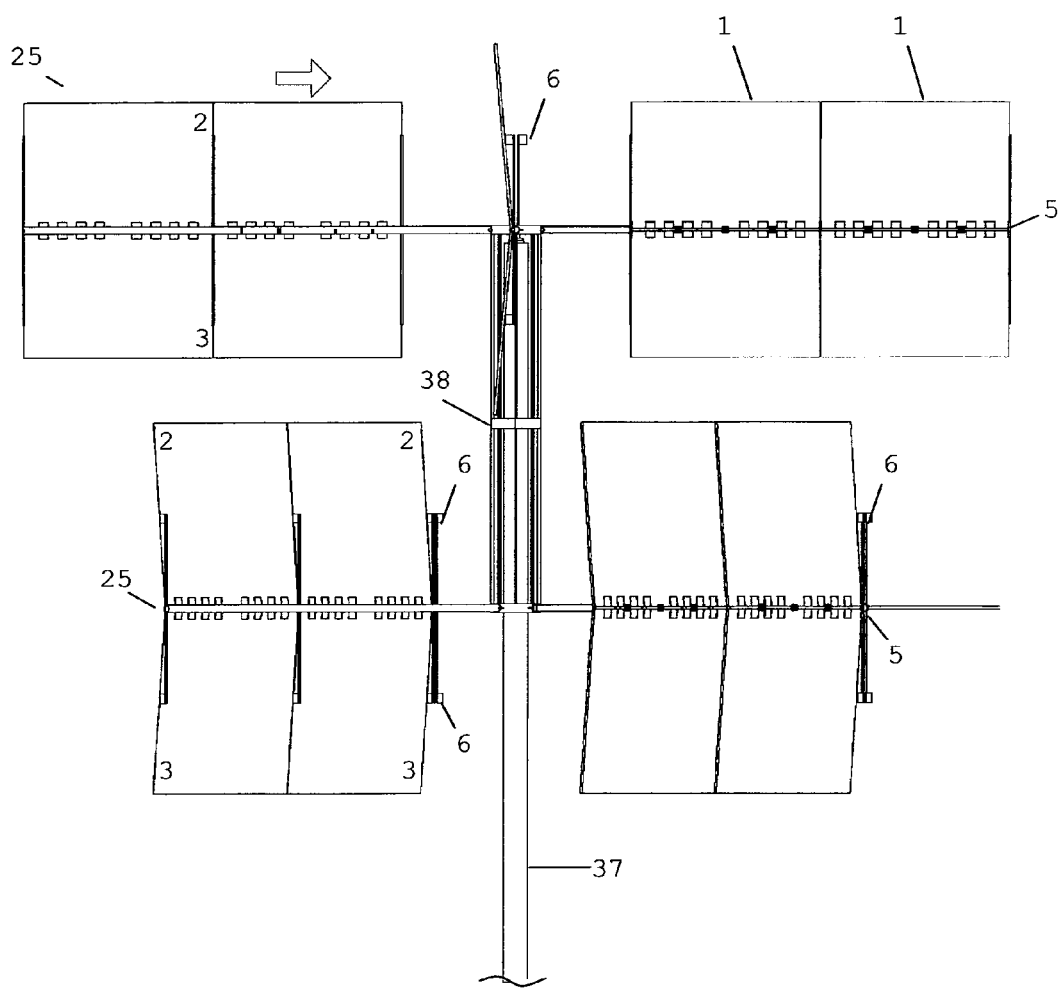
FIG. 33—front view of the third embodiment of the vertical wind turbine with the final course of the aerodynamic panels limited through cables.
Figure 34:
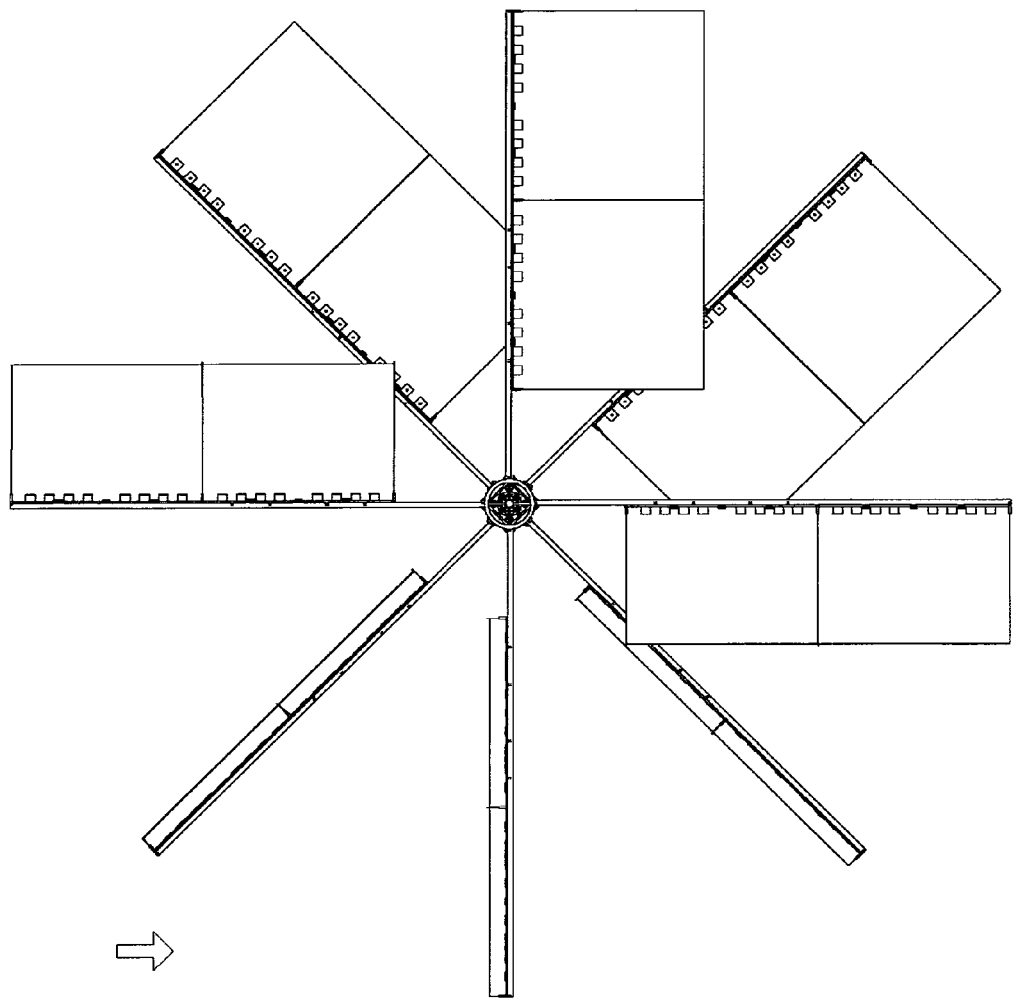
FIG. 34—superior view of the third embodiment of the vertical wind turbine with the energy generation made by a generator placed at the top of the central post.
Figure 35:
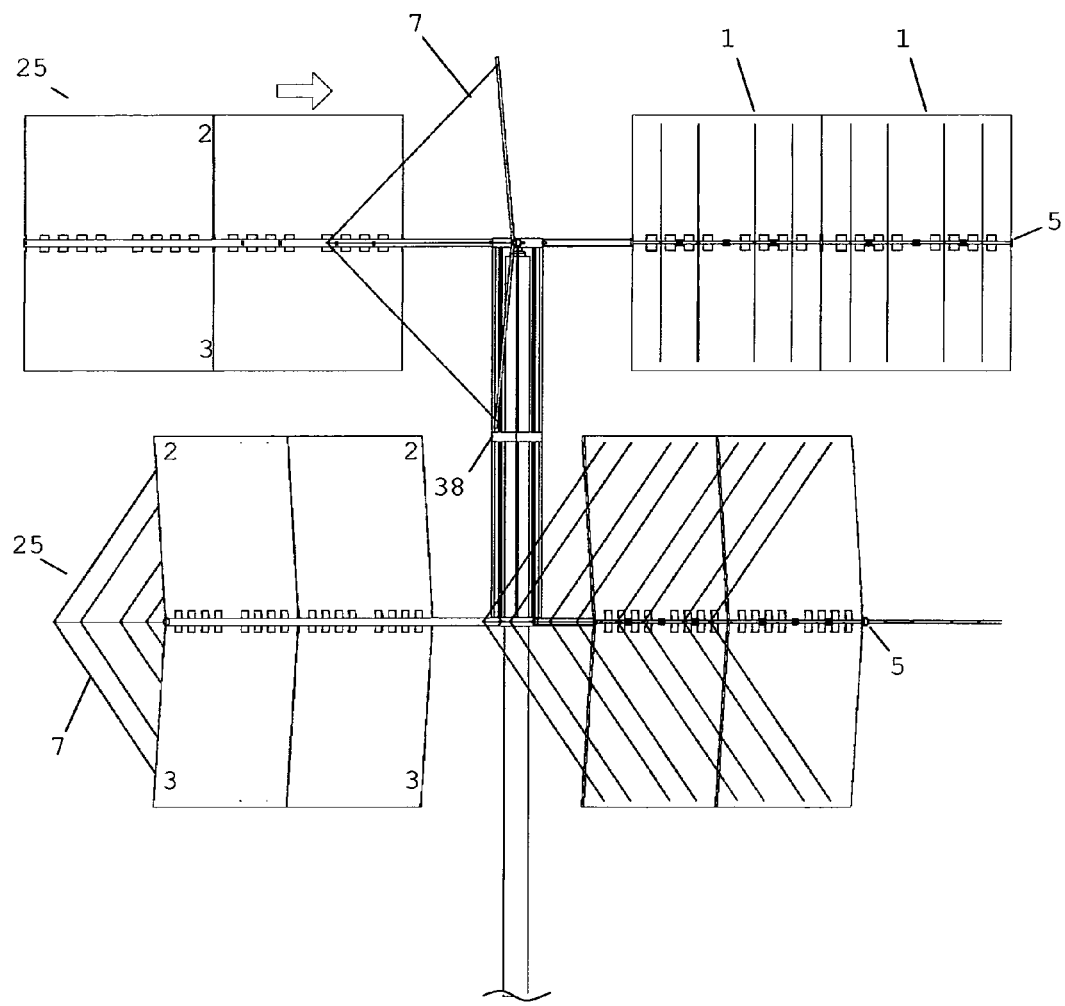
FIG. 35—cut front view of the third embodiment of the vertical wind turbine demonstrating the internal structure of the central post, the rotary structure and the rotary axis.
Figure 36:
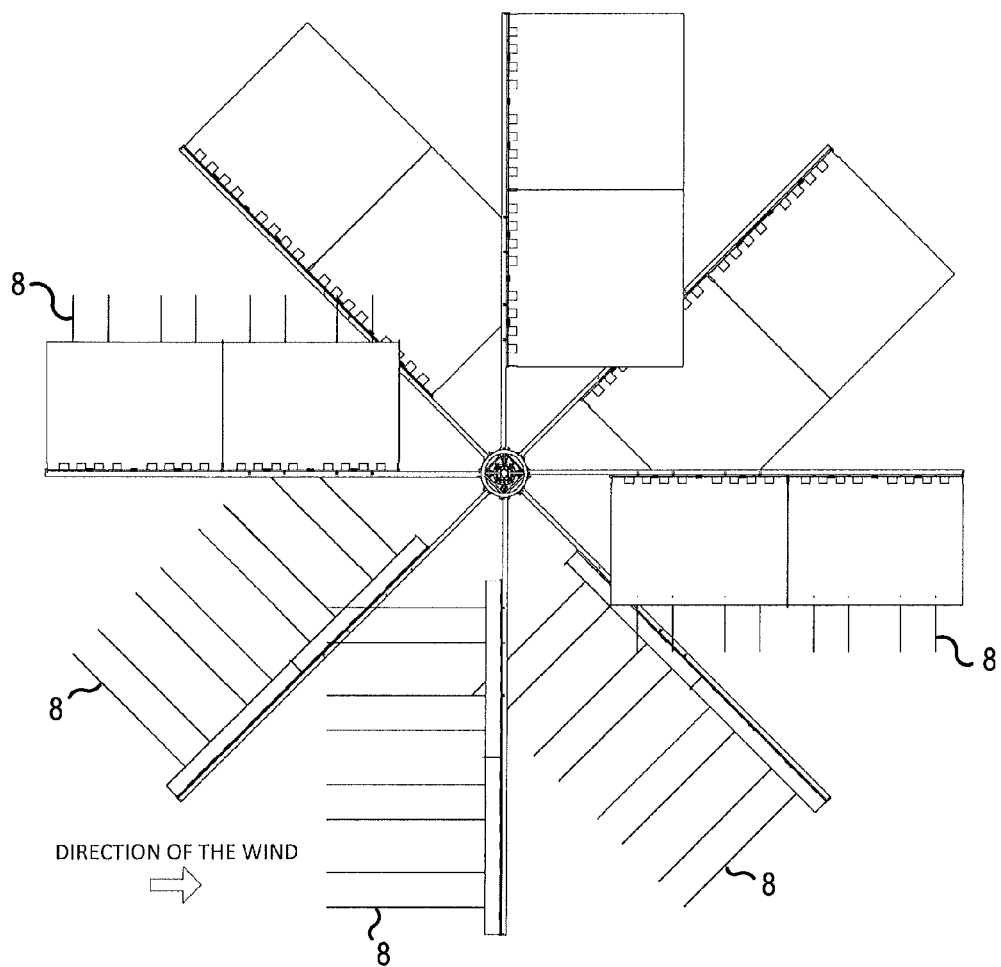
FIG. 36—superior view of the third embodiment of the vertical wind turbine with the energy generation made by a generator placed at the base of the central post powered by the rotary axis which transmits the rotation to a generator through a multiplier box.
Figure 37:
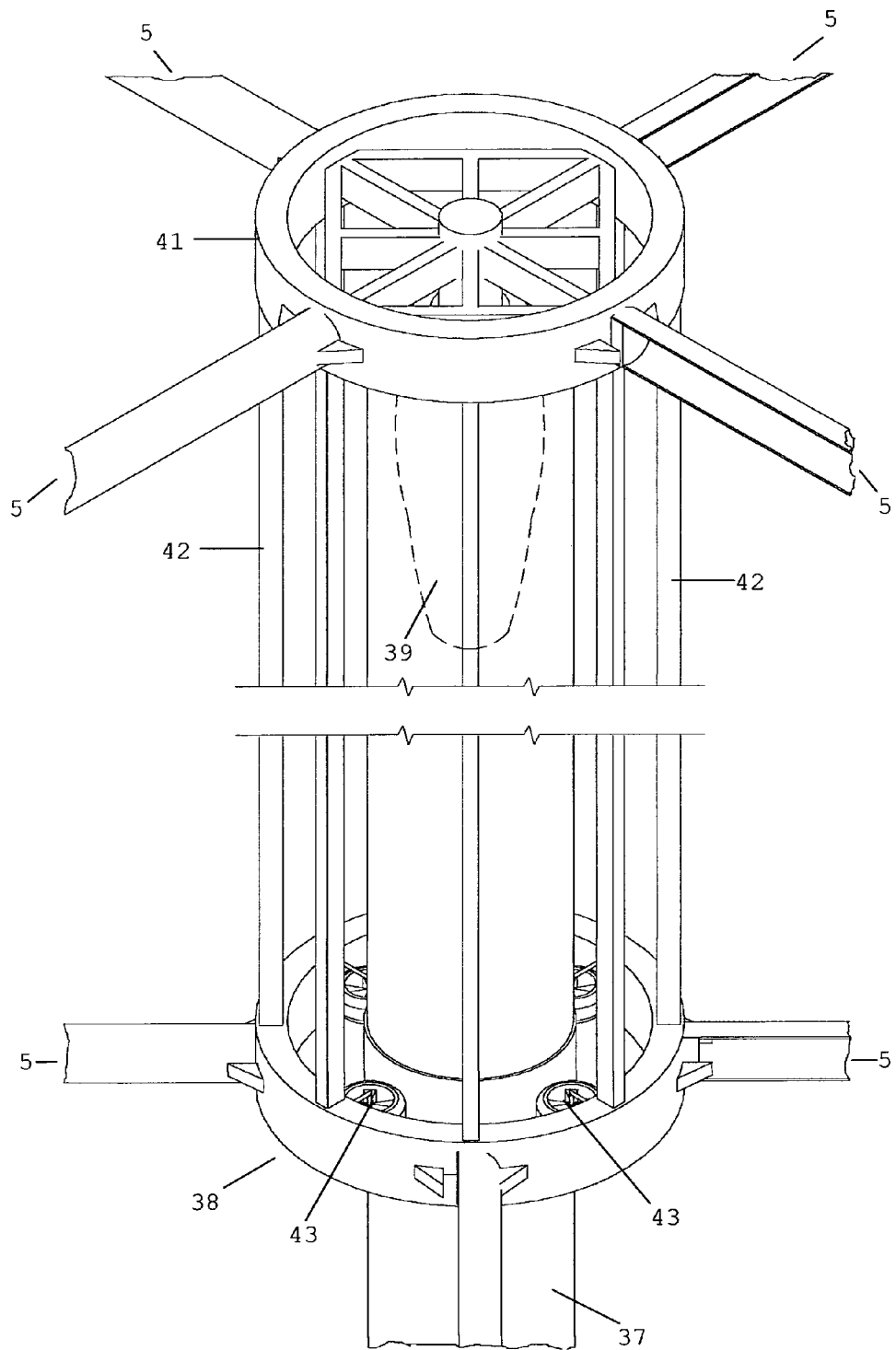
FIG. 37—detailed perspective view of the third embodiment of the vertical wind turbine with the energy generation made by a generator placed at the top of the central post.
Figure 38:
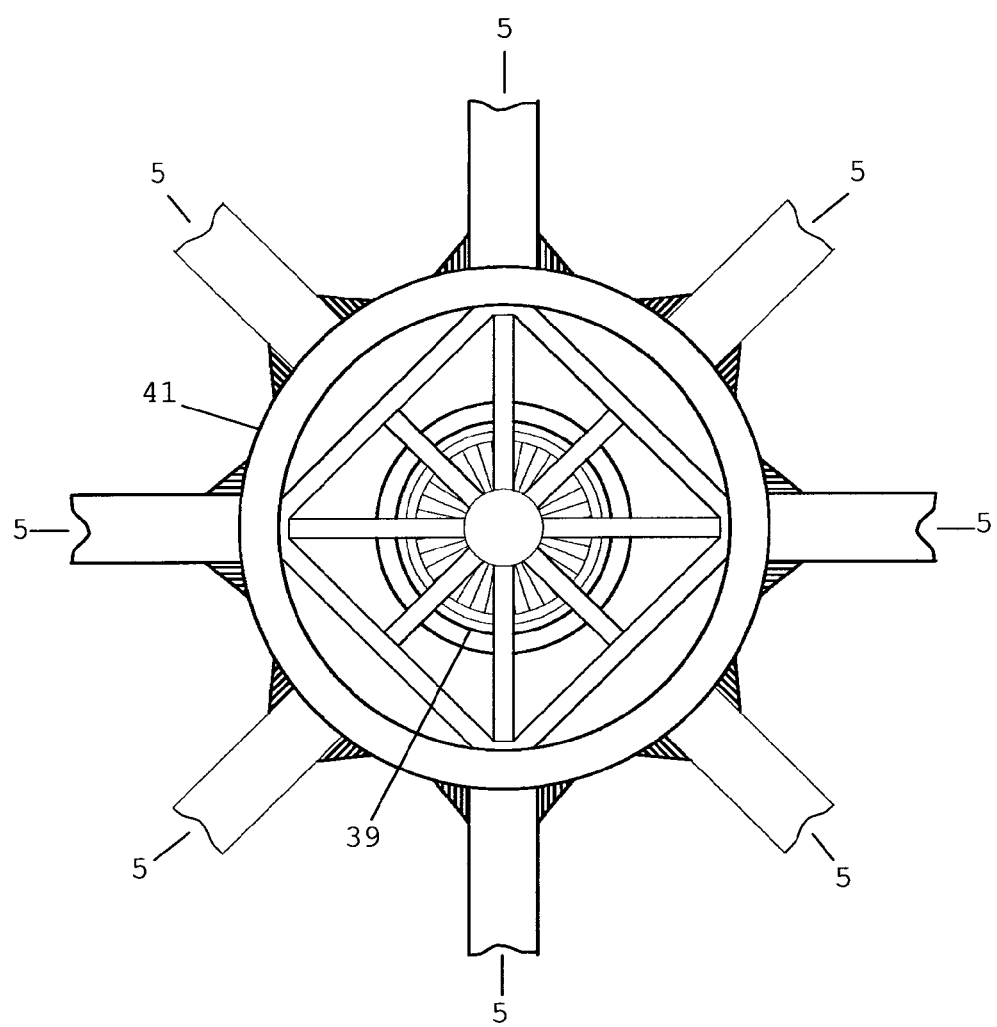
FIG. 38—superior view of the third embodiment of the vertical wind turbine with the final course of the panels limited by the backstops system.
Figure 39:
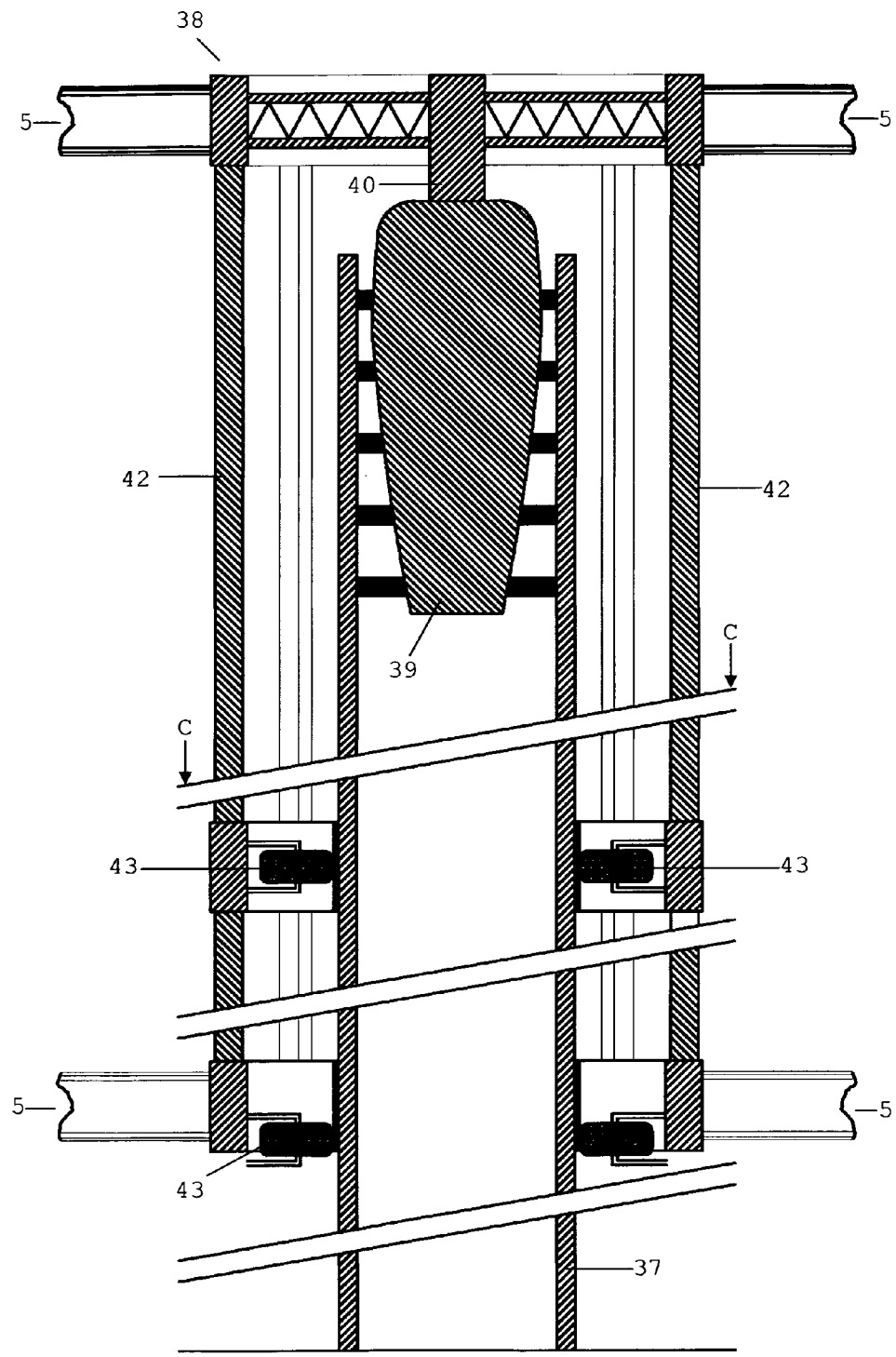
FIG. 39—cut front view of the third embodiment of the vertical wind turbine demonstrating the internal structure of the central post, the rotary structure and the generator.
Figure 40:
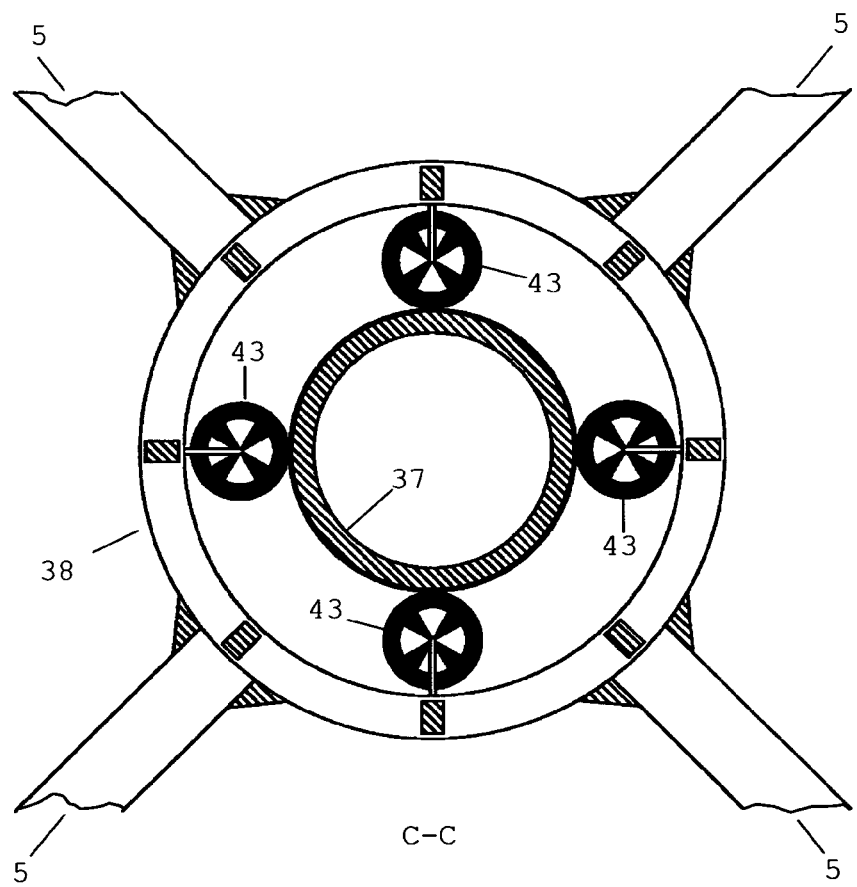
FIG. 40—detail and cut superior view of the third embodiment of the vertical wind turbine. It is shown the rotary structure, the central post, the wheels and the horizontal arms of the aerodynamic panels.
Figure 41:
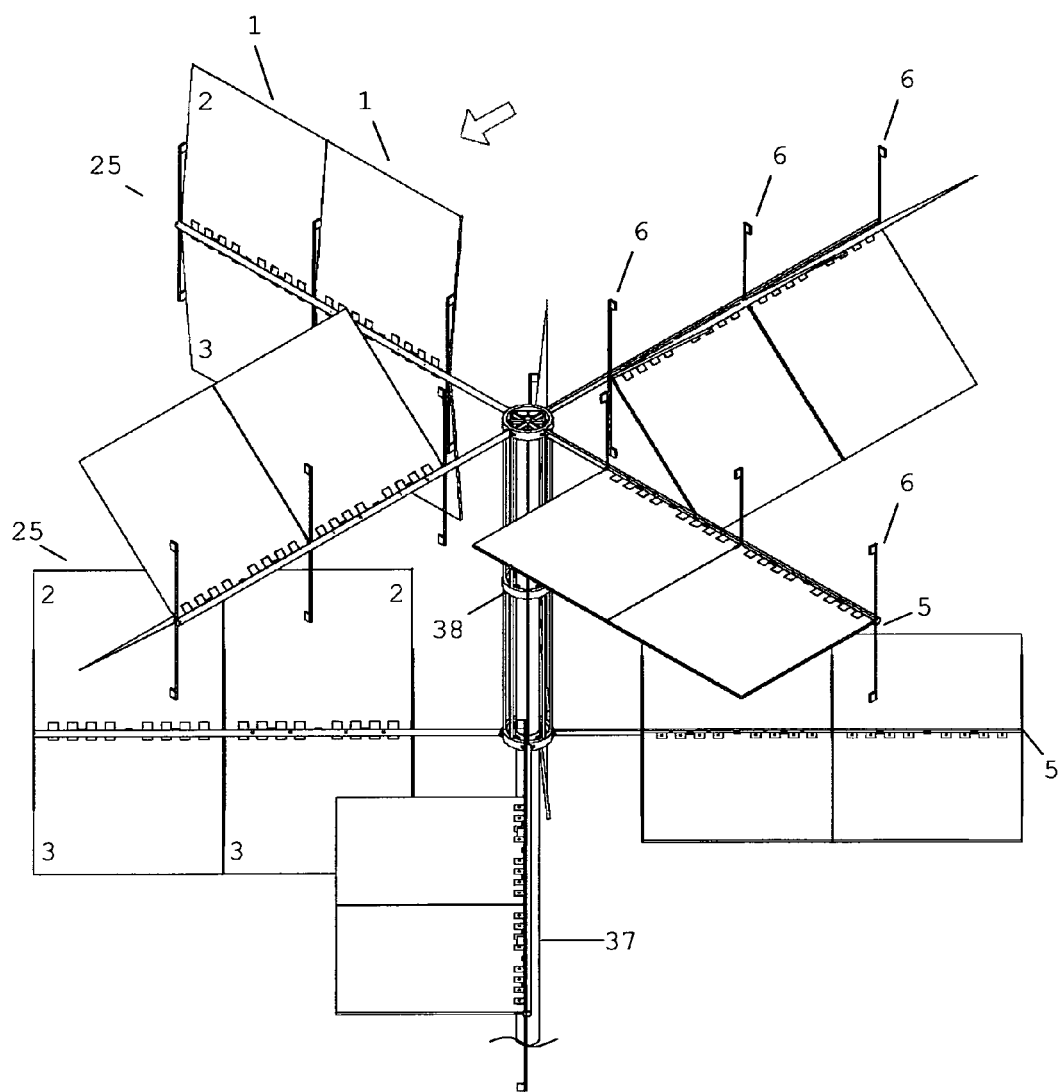
FIG. 41—perspective view of the fourth embodiment of the vertical wind turbine with the energy generation made by a generator placed at the base of the central post and the final course of the panels limited by the backstops system.
Figure 42:
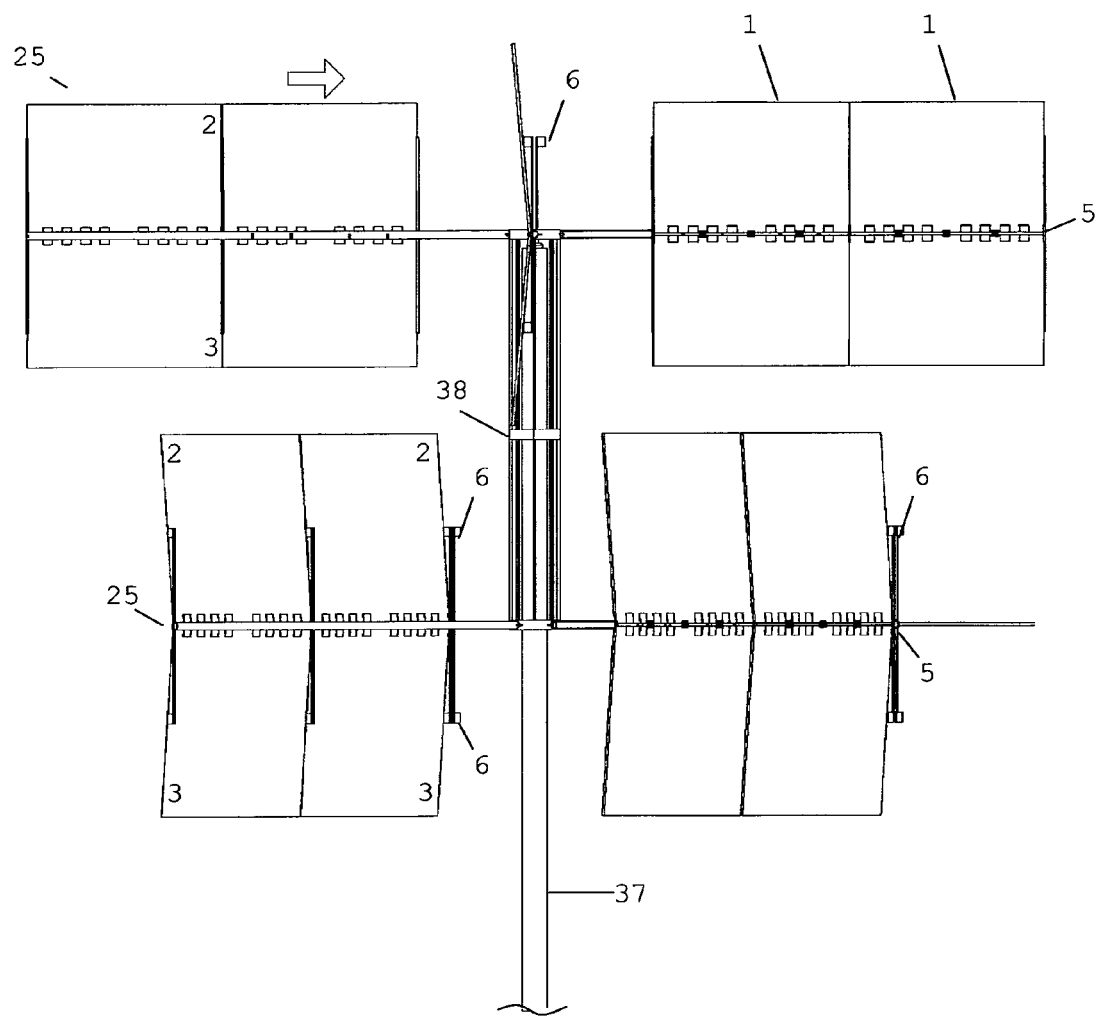
FIG. 42—front view of the fourth embodiment of the vertical wind turbine with the energy generation made by a generator placed at the base of the central post and the final course of the panels limited by the backstops system.
Figure 43:
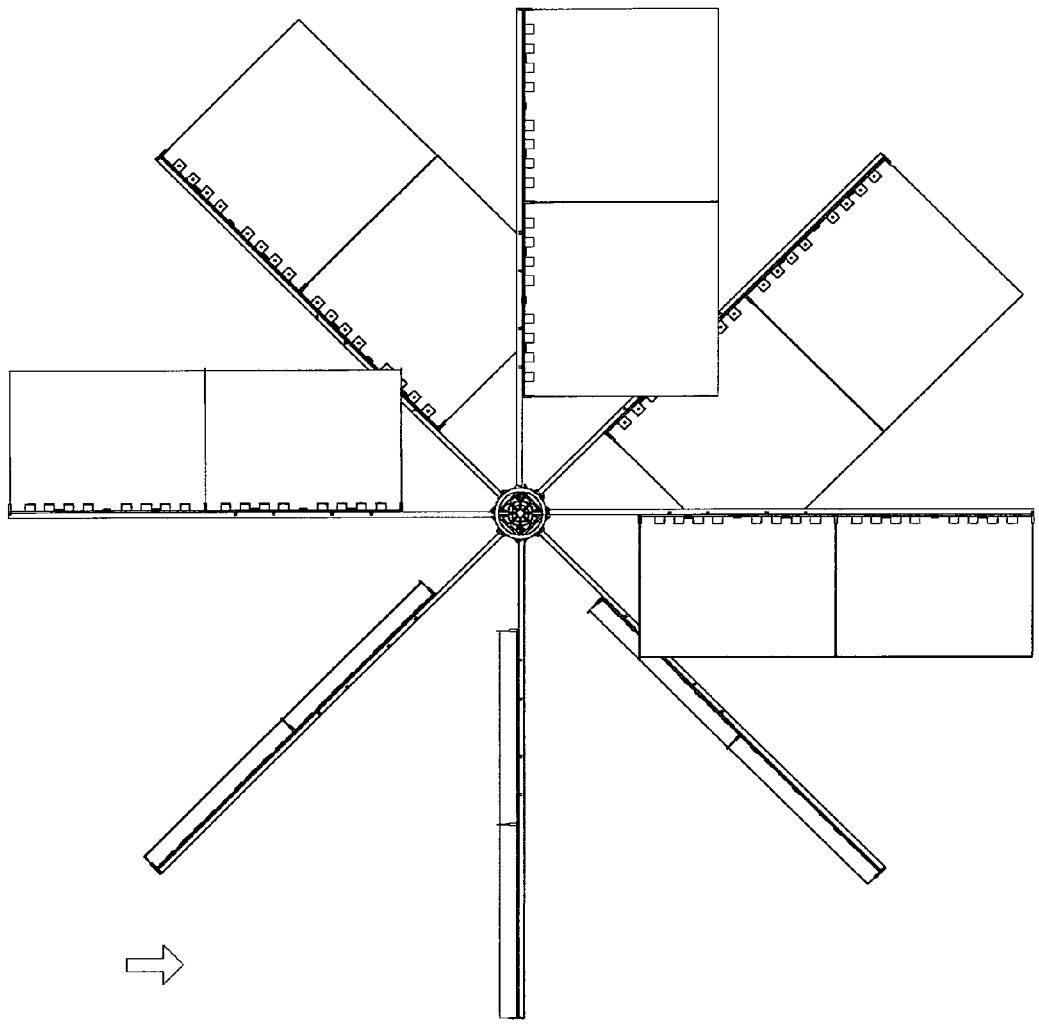
FIG. 43—superior view of the fourth embodiment of the vertical wind turbine with the energy generation made by a generator placed at the base of the central post and the final course of the panels limited by the backstops system.
Figure 44:
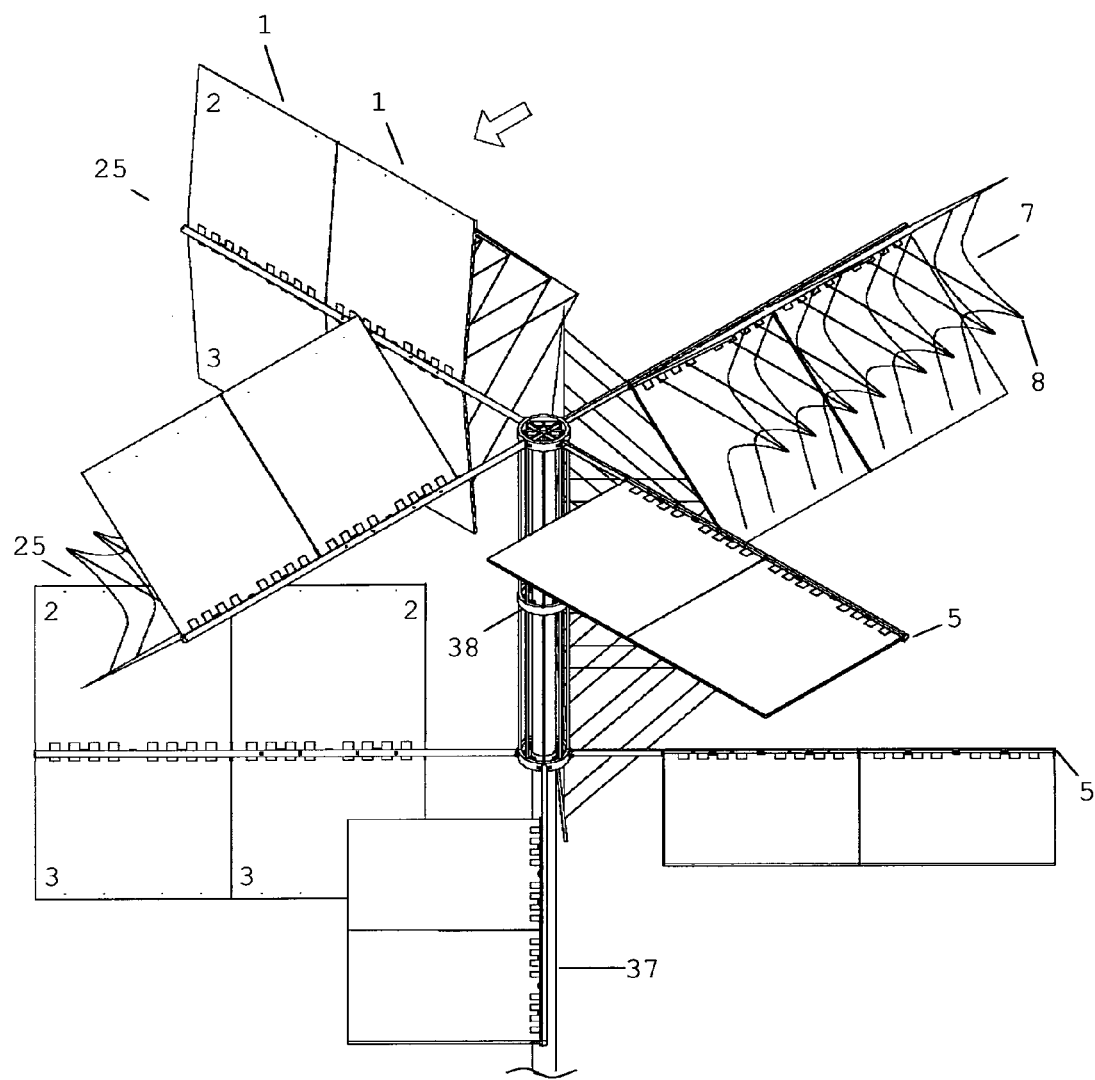
FIG. 44—perspective view of the fourth embodiment of the vertical wind turbine with the energy generation made by a generator placed at the base of the central post and the final course of the panels limited by the cables system.
Figure 45:
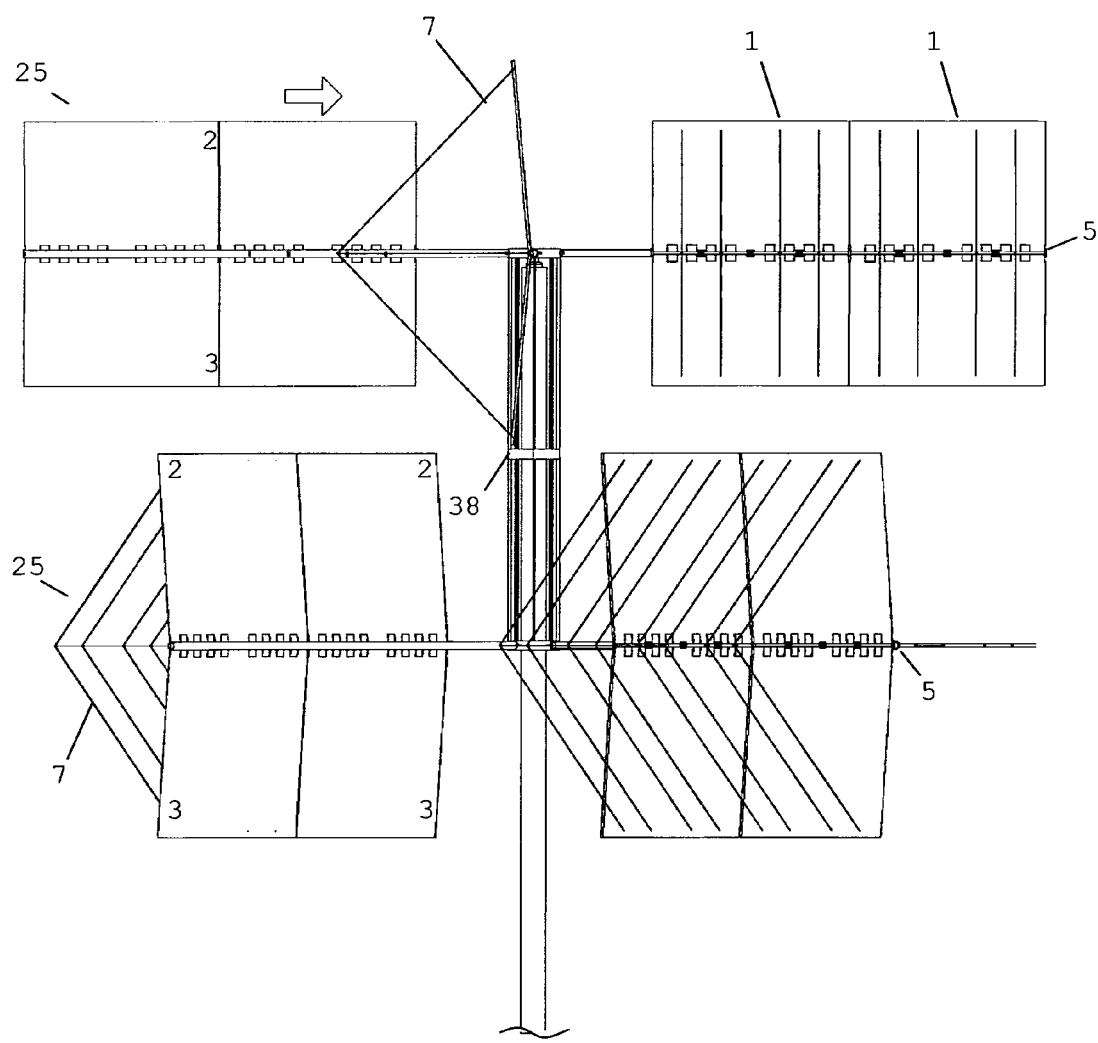
FIG. 45—front view of the fourth embodiment of the vertical wind turbine with the energy generation made by a generator placed at the base of the central post and the final course of the panels limited by the cables system.
Figure 46:
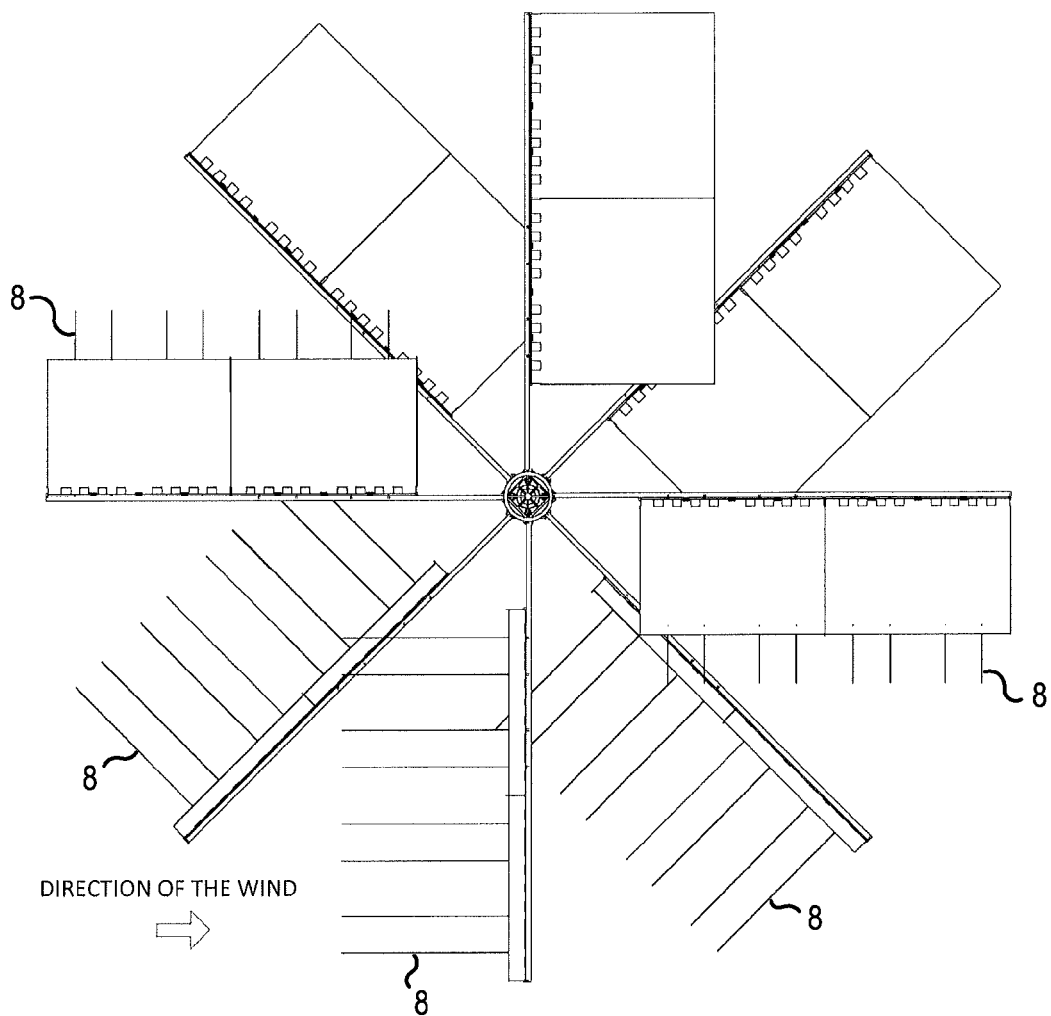
FIG. 46—superior view of the fourth embodiment of the vertical wind turbine with the energy generation made by a generator placed at the base of the central post and the final course of the panels limited by the cables system.
Figure 47:
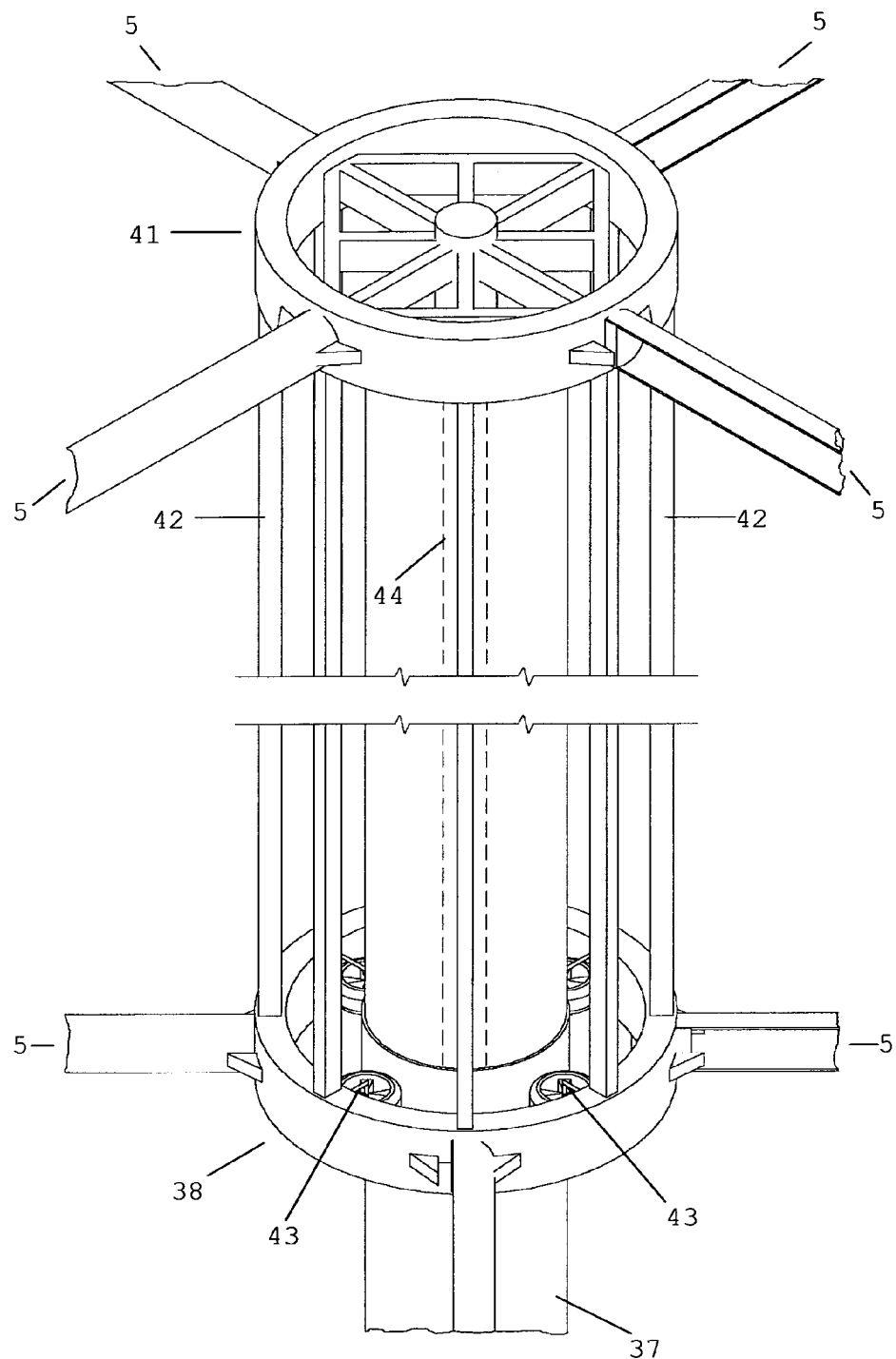
FIG. 47—detailed perspective view of the mobile structure of the fourth embodiment of the vertical wind turbine with the energy generation made by a generator placed at the base of the central post and the final course of the panels limited by the backstops or cables system.
Figure 48:
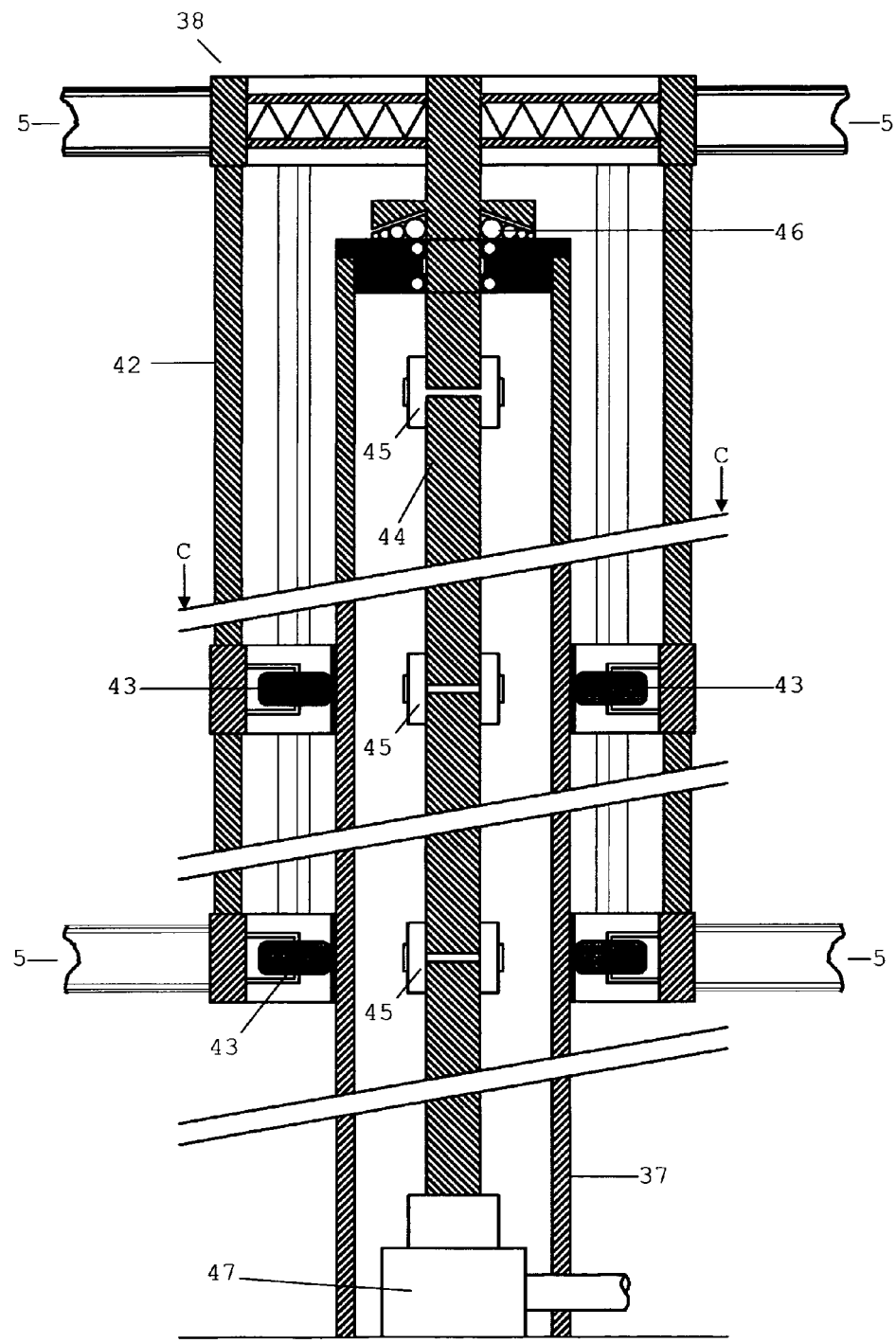
FIG. 48—front view of the mobile structure of the fourth embodiment of the vertical wind turbine with the energy generation made by a generator placed at the base of the central post and the final course of the panels limited by the backstops or cables system.
Figure 49:
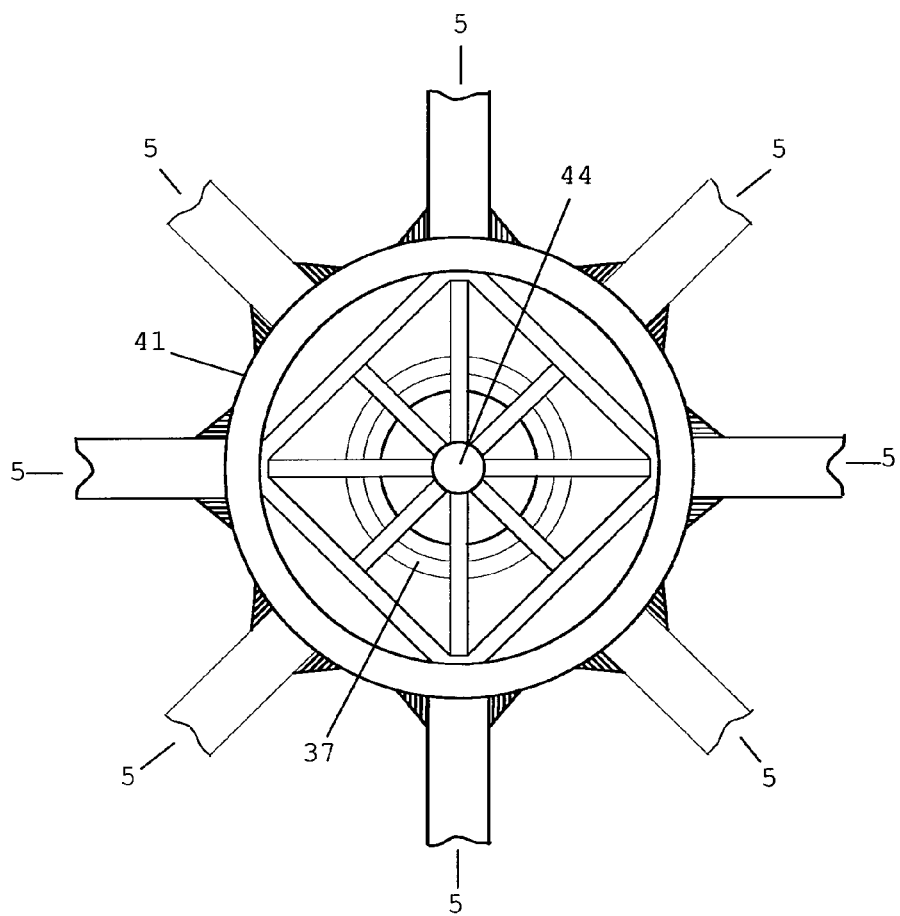
FIG. 49—superior view of the mobile structure of the fourth embodiment of the vertical wind turbine with the energy generation made by a generator placed at the base of the central post and the final course of the panels limited by the backstops or cables system.
Figure 50:
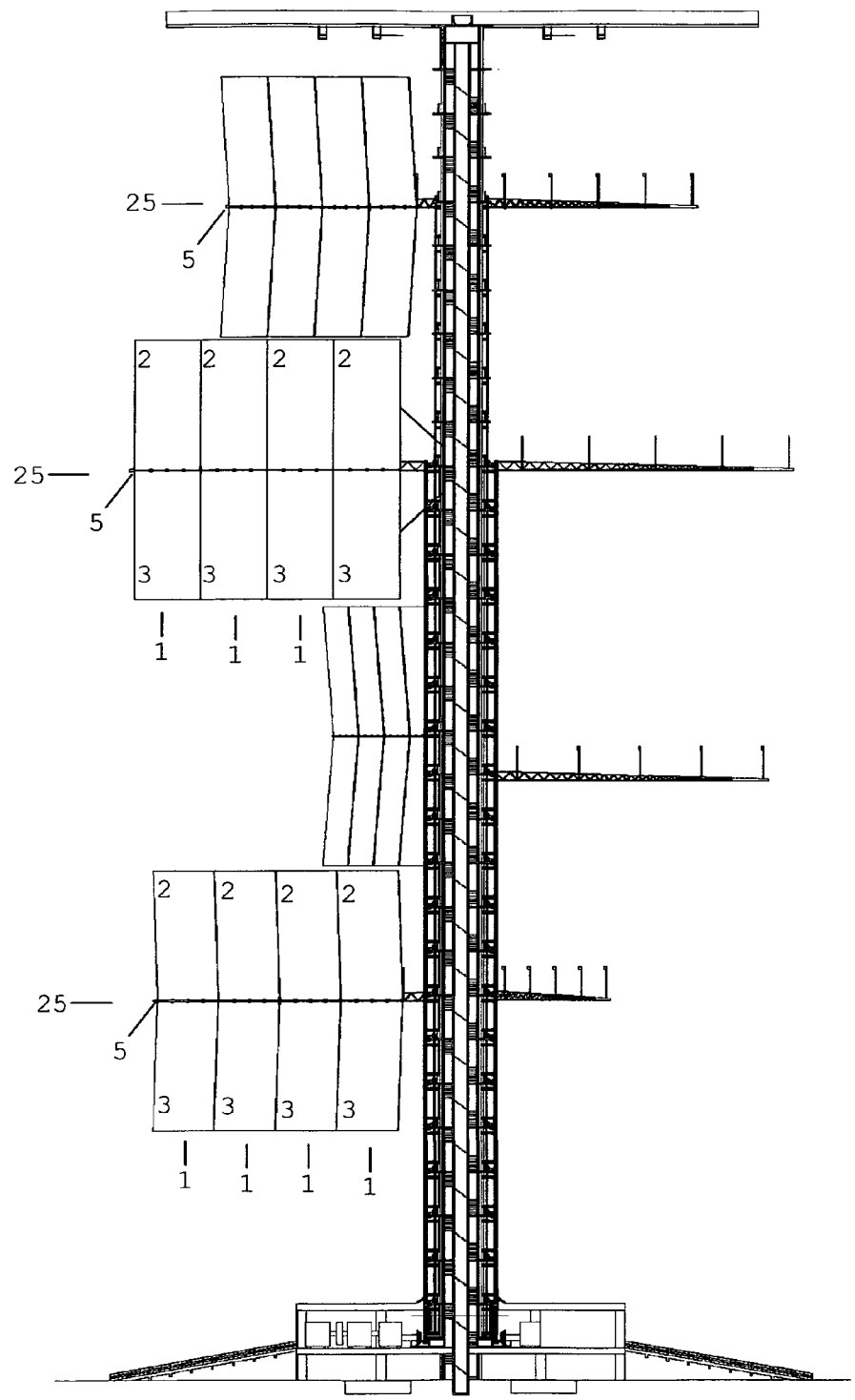
FIG. 50—section view of the tower of the fifth embodiment of the vertical wind turbine with the power generation concentrated at the base of the tower and the final course of the panels limited by the backstops system.
Figure 51:
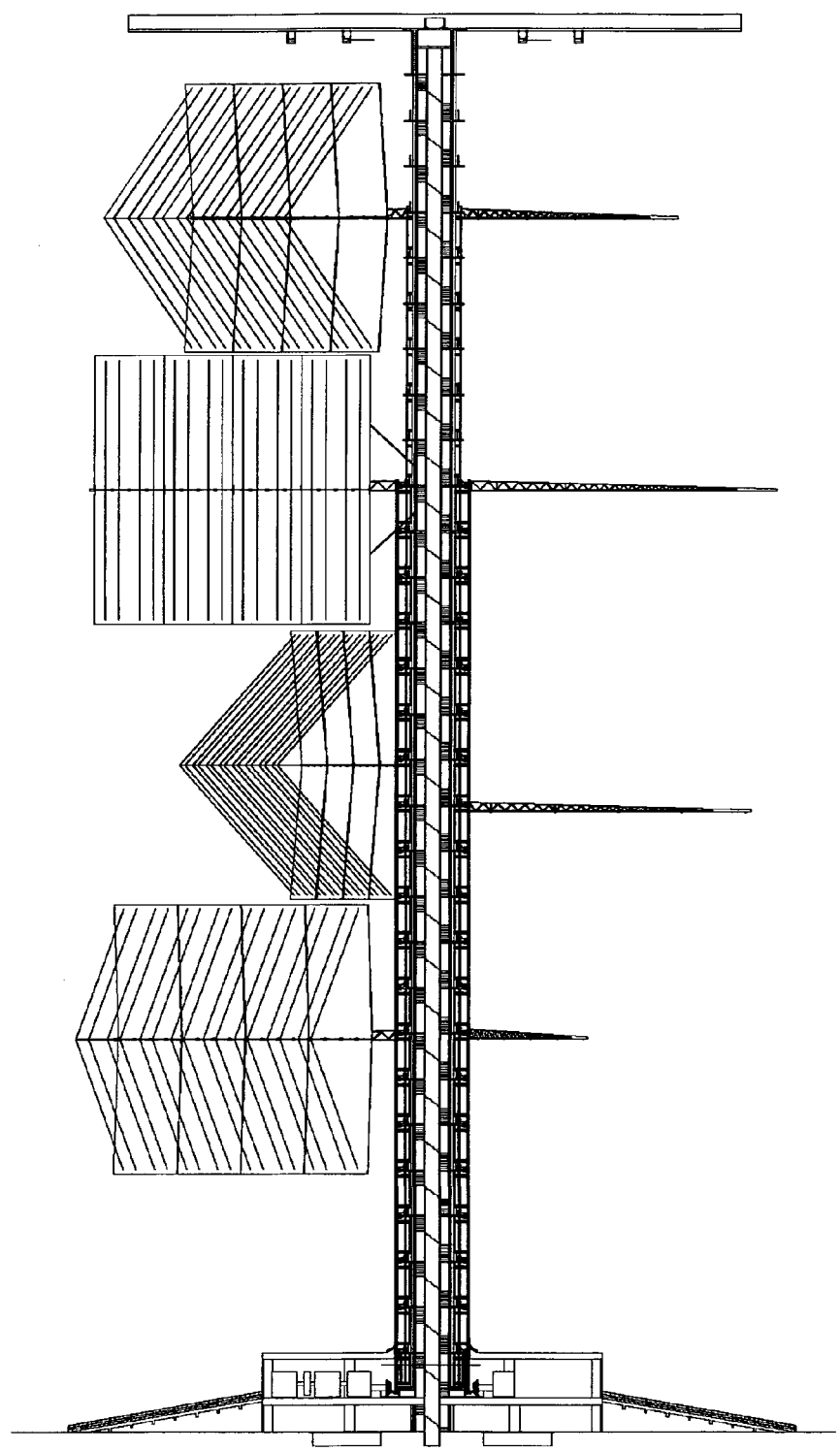
FIG. 51—section view of the tower of the fifth embodiment of the vertical wind turbine with the power generation concentrated at the base of the tower and the final course of the panels limited by the cables system.
Figure 52:
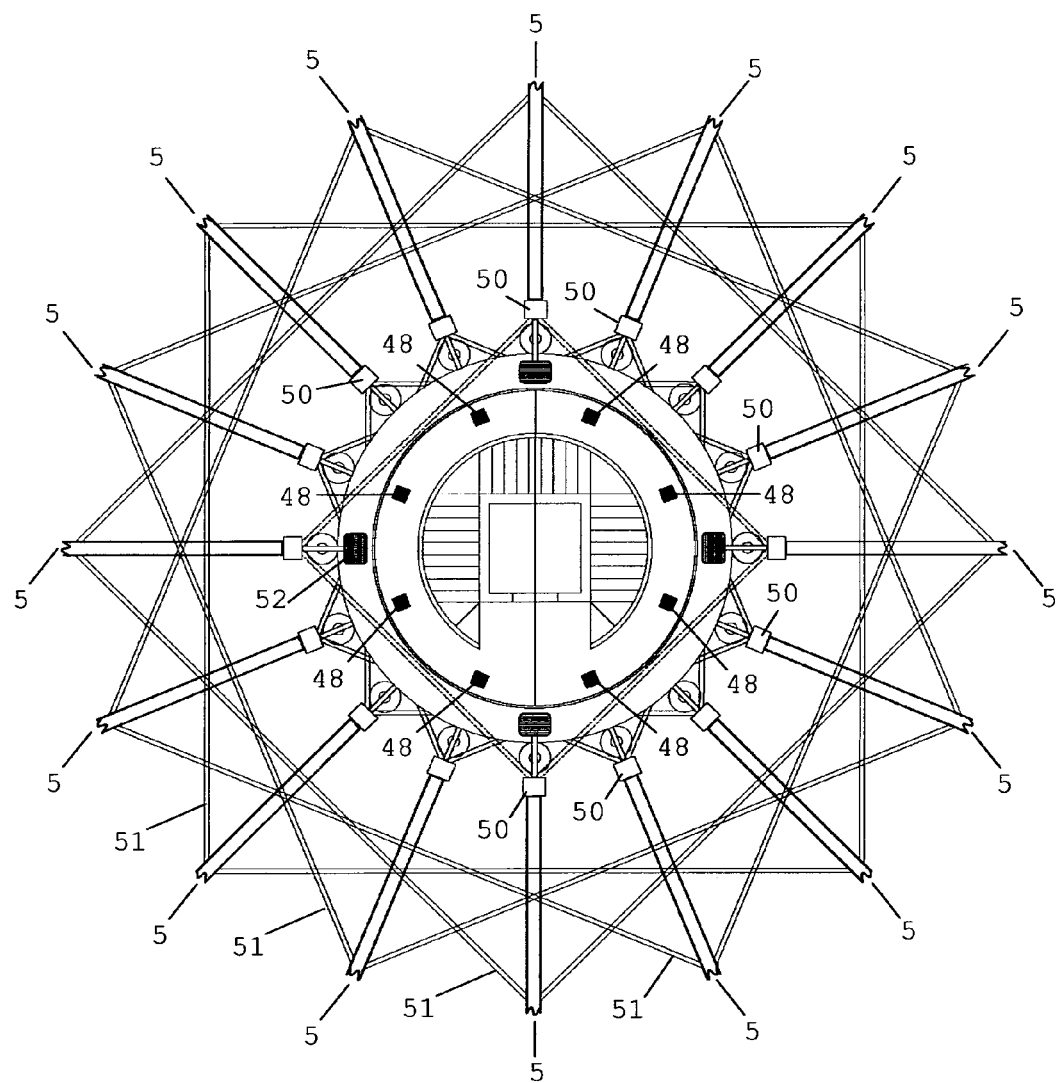
FIG. 52—superior view of the tower of the fifth embodiment of the vertical wind turbine in the D-D cut in FIG. 50, with the power generation concentrated at the base of the tower.
Figure 53:
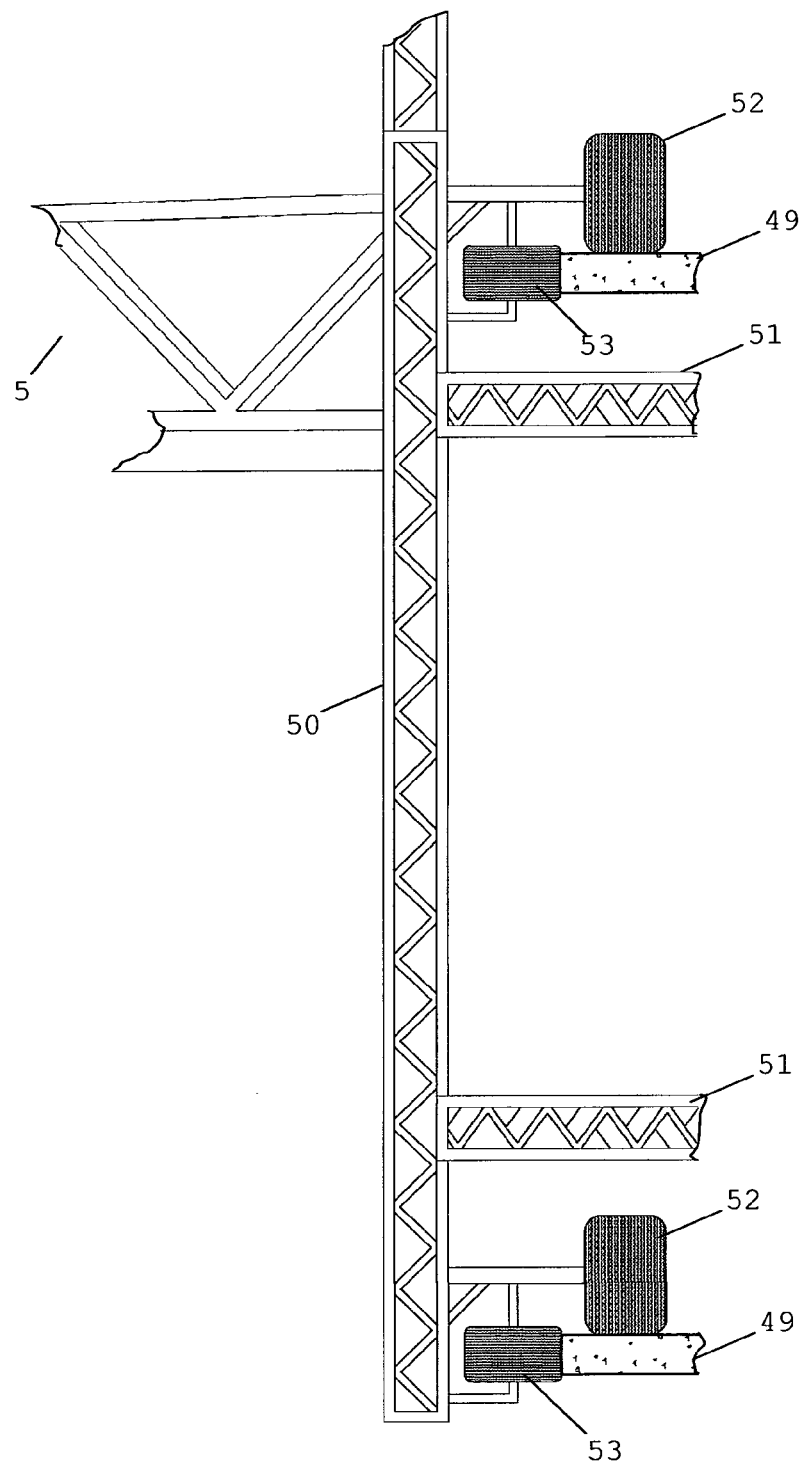
FIG. 53—detail view of the wheels system of the mobile metal structure of the tower of the fifth embodiment of the vertical wind turbine.
Figure 54:
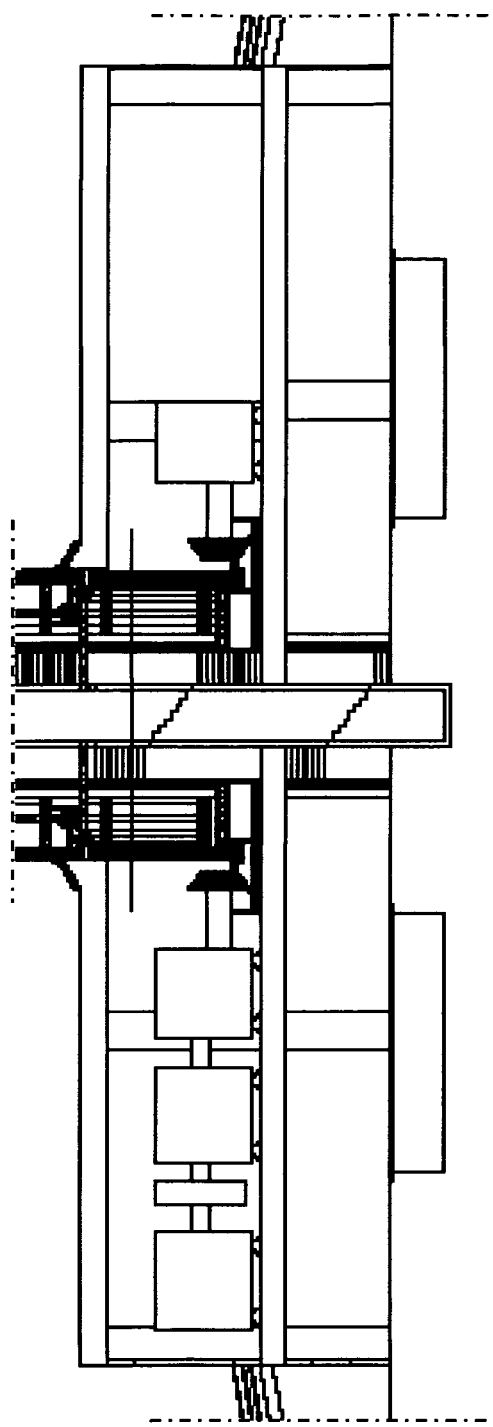
FIG. 54—an enlargement of the base of the tower shown in FIG. 51.

The FIGS. 14 to 16 demonstrate this first embodiment with the movement limiting system of the blades (2) and (3) of the panels (1) by backstops (6) and the FIGS. 17 to 19 demonstrate this first embodiment with the movement limiting system of the blades (2) and (3) of the panels (1) by cables (7).

Second Embodiment

Also, in this small version, as illustrated in the FIGS. 21 to 31, it may be presented with a different configuration in which the tubular axis (20), on which rotates the hollow cylindrical cover (22) with the sustaining axis or arms (5) and the panels (1) to capture the wind force, down almost until the floor exercising the function of a hollow mast fixed in a cabinet (29) of small height fixed to the ground and scaled with enough internal space to receive not only the tip of the spin axis (30) but also a rotation multiplier box (31), a generator (32), a battery (33) and a voltage converter (34) where The spin axis (30) downs inside the sustaining tubular axis (20) of the hollow cylindrical cover (22) and it is coupled by a elastic gasket (35) to the rotation multiplier box (31) that is coupled to a generator (32).

The battery (33) and the voltage converter (34) can be used in regions where the winds stop sometimes.

In this configuration the hollow cylindrical cover (22) does not have the external pulley (26), since the transmission of the rotation is done inside the post, and it can optionally receive arms with fixtures or luminaires (36).

This embodiment can be used to power small consumers and one or more lighting posts with a prior study of desired power for the scale of the size and the quantity of panels to the wind force capture as well as the appropriate generation set for the local necessity.

Optionally, instead the axis is down inside the mast or post, the hollow cylindrical cover (22) can down until the base provided with a ratchet to move the rotation multiplier box (31).

Third Embodiment

In larger embodiments, as illustrated in FIGS. 32 to 40, for medium and large potencies the system is mounted on a metal or concrete tower (37).

In this case, the hollow cylindrical cover will not be used. Instead this, a rotating metal structure (38) that comprises the turbine will be used.

On the top of the tower can be provided, as a first option, an aerogenerator (39) vertically fixed in the concrete or metal structure with its axis (40) facing up on which will be seated the rotating turbine built in metal structure having in its top level (41) the four axis or arms (5) with 90° between them that will be provided with one or more aerodynamic traction panels (1), already described above, in each axis or arm (5).

From the top of the turbine, that receive the arms of the top-level, down multiple metallic structural elements or columns (42) around the tower to form a new set of four arms, a second lower level, containing the wind force capture aerodynamic panels (1) forming an angle of 90° between themselves and 45° with the projection of the arms of the higher level.

This metallic structure is exclusively set to the spin axis of the aerogenerator, however, exist in the lower-level a caster or wheels system (43) that slide on the circular tower (37) to increase the stability of the structure.

Also there are casters or wheels (43) in metallic elements between the top and bottom levels so that the structure of the turbine does not suffer undue oscillatory movements.

Fourth Embodiment

As a second option to the third embodiment, as illustrated in FIGS. 41 to 49, the same system described above can be used, but, instead of the aerogenerator (39) be set at the top of the tower (37), an metal axis (44) seated on bearings (46) is placed, with the same proportions to receive the turbine and transmit this rotation until the base of the tower by an axis (44), that downs internally connecting to a rotating converter (47) fixed to the floor that will receive a medium or large generator.

This axis (44), in this long down trajectory, is formed by several elements interconnected by elastic gaskets (45).

The height of the tower and the size of the panels and the number of levels of panels will depend of the desired power.

Fifth Embodiment

For mega embodiments with large scale power generation, in which a single wind turbine tower may replace 30 or more helix aerogenerators of the state of the art, it is introduced a configuration in which a metallic mega structure rotates on a reinforced concrete mega structure and that uses the same aerodynamic panels model described above.

The mega structure provides two power generation options.

The first one, as illustrated in FIGS. 50 to 53, concentrates the whole generation in a large machines room that receives the sum of the entire torque force produced in all aerodynamic panels levels.

The second option, instead of unify the force of all levels into a single point of power reception to the generators, divides the power generation in levels or aerodynamic panels levels sets that work independently from each one unit of power generation.

Both options use the same system, that is composed by a mega structure in reinforced concrete be provided with pillars (48) forming circles interconnected by reinforced concrete circular platforms (49) as if it were disks with much bigger diameter compared to the circle formed by the pillars in order to receive in the borders of these platforms (49) the sliding materials, i.e., wheels (52) and (53) which will support the vertical elements or mobile pillars (50) interconnected each other by metal beams (51) forming a rigid set that, from a certain height, will receive the big scale arms (5) that will contain various aerodynamic traction panels already described previously.

In the first power generation option, in only one large machines room, that receives the sum of all the torque force produced by all aerodynamic panels levels, the rotational structure is linked from the top until the bottom through vertical elements (50) and horizontal structural elements (51) to transmit the sum of the rotational force of all levels so that, from the last level that contains wind force catch panels, the sum of these vertical elements (50) fixed to each other form a huge pipe down until the power generation room in the first high level where they are connected to a huge ratchet with several meters in diameter seated on sliding rotating elements and immersed in lubricating oil which will move diverse rotation converters and coupled generators.

The huge pipe formed by the vertical elements (50), from the last level of panels, down until the generation room, located on the first level of the concrete structure, once, in this configuration, are only used catch panels with more than 100 m of height, and also has several levels of superior (52) and lateral (53) rotary elements of support in the circular concrete platforms (49) so that to avoid that the whole rotating descent structure overload the sliding elements of the higher levels from the wind force catch panels levels promoting better load distribution and reduced oscillation of the rotating metal structure on the concrete structure.

On the ground level of the concrete tower have the access to the elevator, to the stairways and to the two ramps for the access of the trucks to the top level.

The top level has a coverage concrete slab of the machines room with a hole by where pass the rotating tubular structure formed by vertical elements. At this level there is no access to the stairs and to the elevator due to the large rotating tubular structure.

The concrete tower has its first two levels consisting by a rectangular or square building followed up to the top by a circular tower and in its top is provided with a beam of reinforced concrete with the same width of the diameter formed by the rotating arms, provided with a mono rail on its lower surface with hooks to the fixation cables to scaffolding to the assembly and maintenance of the metal structure.

In the second power generation option, the vertical metal elements shall transmit the force, i.e., in each two levels of panels in an independent way.

On each two levels of panels, in one of these platforms of these levels, are fixed to the mobile vertical pillars a ratchet which moves a rotating converter attached to a generator, fixed on the concrete platform, and so forth.

Thus, from the last level of wind force catch panels until the ground there are no more the descent vertical structure and so only the concrete tower, which also does not have the first generation room level of the previous configuration.

The cables of the generators down through a duct until the ground where is installed a control and electronic supervision room of the entire turbine.

The invention claimed is:

1. VERTICAL WIND TURBINE comprising: aerodynamic panels (1) which consist of two aerodynamic blades (2) and (3) with synchronized and interconnected movement through gears (4) and that open simultaneously and symmetrically one upwards and the other downwards by the action of the frontal wind and that close simultaneously and symmetrically from bottom to top and top to bottom, by the action of the wind at your back encountering each other as if they were a single aerodynamic horizontal surface, and the aerodynamic panels (1) are fixed to the axes or arms (5) of crosses (25) which rotate on an axis or vertical structure, the blades (2) and (3) of the aerodynamic panels (1) have an angulation on its borders both front, in the opposite side of the axis (5), as lateral, tabs (14), so as to allow them to open as soon as enter in the traction cycle and close when enter in the flat cycle to obtain the full use of the wind force in the 180° of the traction cycle and in the 180° of the inactive cycle, each axis or arm (5) have at least one aerodynamic panel (1), the gears (4), of the blades (2) and (3) of the aerodynamic panels (1), are involved by an oil box so as to improve the sync between the gears (4) and cancel the noise generated by the contact between the gears (4)

wherein the blades (2) and (3) of the aerodynamic panels (1) are, each one, fixed to a superior horizontal axis (9) and lower horizontal axis (10) respectively through securing tabs (11), and with bearings (12) on the axis ends housed in sidebars (13) that are fixed to a horizontal axis or arm (5), wherein the blades (2) and (3) of the aerodynamic panels (1) contain, in the centre of its extremities, opposite to the horizontal axes, electromagnetic coils that are energized by a supervision and control system to maintain the blades horizontally or flatted regardless of the wind direction in order to prevent operation during situations of storm or even to stop the turbine for maintenance, wherein the blades (2) and (3) of the aerodynamic panels (1) contain, in its vertex aperture angle or the meeting point between the two blades, a canvas or rubber flexible jacket in order to reduce the wind escape through its rotating fixing horizontal axis, wherein the blades (2) and (3) of the aerodynamic panels (1) have a control of the wind catchment area in each one of the blades from a set of aerodynamic panels with the simple sliding of a plate sliding over the blade in both upper and lower panel blade symmetrically to slide through the command of a servo motor on each panel blade to open or close holes increasing or decreasing the wind catchment area of each panel blade aerodynamically enabling the speed control and the torque of the turbine in areas where the wind speed oscillates a lot, wherein the blade (2) and (3) of the aerodynamic panels (1), when it opens symmetrically, due the work of the gears between them, with a counterweight effect, they become restricted almost in a vertical position through rubber stops fixed on bars attached to their arms to up and to down, or through elastic rope passing on a central axis that are between the panels with a pulley which gives passage to the rope which is fixed at the ends of the panels thus limiting the maximum opening, which also helps avoid noises when the blades reach its end of the course.

2. VERTICAL WIND TURBINE according to claim 1, wherein a first embodiment, with a tubular axis (20) of small caliber to be fixed at the top of a mast or post (21), on this axis rotates a hollow cylindrical cover (22) through bearings (23) and (24) provided with at least one level of crosses (25), where each cross has four metal axis or arms (5) with 90° between them in which shall be fixed at least one aerodynamic panel (1) for each axis or arm, said hollow cylindrical cover (22) occupies an extension equivalent to two thirds of the size of the tubular axis (20) and has on its base a pulley (26) that will operate a small generator (27) that is set on the tubular axis (20) just below of the hollow cylindrical cover (22), and the movement of the blades (2) and (3) of the panels (1) it is limited by the rubber stops (6) or by the elastic rope (7).

3. VERTICAL WIND TURBINE according to claim 2, wherein, in a second embodiment, the tubular axis (20), on which rotates the hollow cylindrical cover (22) with the sustaining axis or arms (5) and the panels (1) to capture the wind force, extends down almost until the ground exercising the function of a hollow mast fixed in a cabinet (29) of small height fixed to the ground and scaled with enough internal space to receive not only the tip of a spin axis (30) but also a rotation multiplier box (31), a generator (32), a battery (33) and a voltage converter (34) where the spin axis (30) is inside the sustaining tubular axis (20) of the hollow cylindrical cover (22) and it is coupled by an elastic gasket (35) to the rotation multiplier box (31) that is coupled to a generator (32).

4. VERTICAL WIND TURBINE according to claim 3, wherein the tubular axis (20) is equipped with fixtures or luminaires (36).

5. VERTICAL WIND TURBINE according to claim 3, wherein the hollow cylindrical cover (22) is provided with a ratchet to move the rotation multiplier box (31).

6. VERTICAL WIND TURBINE according to claim 1, wherein, in a third embodiment, a rotating metal structure (38) is mounted on the top of a metal or concrete tower, and, on the top of the tower (37), an aerogenerator (39) is vertically fixed in the concrete or metal tower with an axis (40) facing up on which will be seated the rotating metal structure having in its top level (41) four axis or arms (5) with 90° between them that will be provided with at least one aerodynamic traction panel (1) in each axis or arm (5), and from the top of the turbine, extend multiple metallic structural elements or columns (42) around the tower to form a new set of four arms, and, a second lower level, containing the wind force capture aerodynamic panels (1) forming an angle of 90° between themselves and 45° with the projection of the arms of the higher level, and the rotating metallic structure (38) is exclusively set to the spin axis (40) of the aerogenerator (39), and, in the lower-level a caster or wheels system (43) that slide on the tower (37) to increase the stability of the structure.

7. VERTICAL WIND TURBINE according to claim 1, wherein, in a fourth embodiment, a metal axis (44) seated on bearings (46) is placed, with the same proportions to receive the turbine and transmits this rotation to the base of a tower by the axis (44), that extends internally and connects to a rotating converter (47) fixed to the floor that will receive a medium or large generator.

8. VERTICAL WIND TURBINE according to claim 1, wherein, in a fifth embodiment, a metallic mega structure rotates on a reinforced concrete mega structure concentrating the whole generation in a large machine room that receives the sum of the entire torque force produced in all the aerodynamic panels.

9. VERTICAL WIND TURBINE according to claim 8, wherein, the mega structure in reinforced concrete is provided with pillars (48) forming circles interconnected by reinforced concrete circular platforms (49) as if it were disks with much bigger diameter compared to the circle formed by the pillars in order to receive in the borders of these platforms (49) wheels (52) and (53) which will support vertical elements or mobile pillars (50) interconnected each other by metal beams (51) forming a rigid set that, from a height, receive the arms (5) that contain various aerodynamic traction panels (1).

10. VERTICAL WIND TURBINE according to claim 8, the metallic mega structure is linked from the top to the bottom through vertical elements (50) and horizontal structural elements (51) to transmit the sum of the rotational force of all the panels so that, from a last level that contains wind force catch panels, the sum of these vertical elements (50) fixed to each other form a huge pipe down to the machine room in a first level where they are connected to a ratchet with several meters in diameter seated on sliding rotating elements and immersed in lubricating oil which will move diverse rotation converters and coupled generators that are bound into the single large machine room that receives the sum of all the torque force produced by all levels of aerodynamic panels (1).

11. VERTICAL WIND TURBINE according to claim 8, wherein, in the reinforced concrete mega structure, on the ground level, has access to an elevator, to stairways and to two ramps for the access of trucks to a top level, and in the top level is a coverage concrete slab of the machine room with a hole through which passes the metallic mega structure formed with vertical elements.

12. VERTICAL WIND TURBINE according to claim 8, wherein, the top of the reinforced concrete mega structure is provided with a beam of reinforced concrete with the same width as the diameter formed by rotating arms of the turbine, provided with a mono rail on its lower surface with hooks for the fixation of cables and scaffolding to the assembly for maintenance of the metallic mega structure.

13. VERTICAL WIND TURBINE according to claim 1, in a sixth embodiment, a metal mega structure rotates on a reinforced concrete mega structure with energy generation units distributed into levels and sets of the aerodynamic panels are on levels that work independently from each force generation unit through the distribution of generators in these levels.

14. VERTICAL WIND TURBINE according to claim 13, wherein, vertical metal elements transmit the force, in each two levels of panels in an independent way to generators installed in these levels through ratchets which move rotating converters attached to the generators, fixed on a concrete platform, and cables of the generators extend through a duct to the ground where is installed a control and electronic supervision room of the entire turbine.

\* \* \* \* \*